US007676368B2

(12) United States Patent
Shizuka et al.

(10) Patent No.: US 7,676,368 B2
(45) Date of Patent: Mar. 9, 2010

(54) INFORMATION PROCESSING APPARATUS AND METHOD, RECORDING MEDIUM, AND PROGRAM FOR CONVERTING TEXT DATA TO AUDIO DATA

(75) Inventors: Utaha Shizuka, Tokyo (JP); Satoshi Fujimura, Kanagawa (JP); Yasuhiko Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 2216 days.

(21) Appl. No.: 10/188,711

(22) Filed: Jul. 2, 2002

(65) Prior Publication Data

US 2003/0023443 A1 Jan. 30, 2003

(30) Foreign Application Priority Data

Jul. 3, 2001 (JP) ............................. 2001-201727

(51) Int. Cl.
*G10L 13/08* (2006.01)
*G10L 21/00* (2006.01)
*G10L 21/06* (2006.01)

(52) U.S. Cl. ........................ 704/260; 704/270; 704/271

(58) Field of Classification Search ..................... 704/2, 704/3, 6, 270.1, 260, 270–271
See application file for complete search history.

(56) References Cited

U.S. PATENT DOCUMENTS 5,555,343 A * 9/1996 Luther ........................ 704/260
5,884,262 A * 3/1999 Wise et al. ............... 704/270.1
6,018,710 A * 1/2000 Wynblatt et al. ............ 704/260
6,035,273 A * 3/2000 Spies ......................... 704/270
6,061,718 A * 5/2000 Nelson ....................... 709/206
6,085,161 A * 7/2000 MacKenty et al. .......... 704/270
6,144,938 A * 11/2000 Surace et al. ............... 704/257
6,553,341 B1 * 4/2003 Mullaly et al. ................. 704/9
6,801,931 B1 * 10/2004 Ramesh et al. .............. 709/206

(Continued)

FOREIGN PATENT DOCUMENTS

JP 04-175049 * 6/1992

(Continued)

OTHER PUBLICATIONS

USPTO Translation of Saito—JP 04-175049, Jul. 2004.*

*Primary Examiner*—Richemond Dorvil
*Assistant Examiner*—Eric Yen
(74) *Attorney, Agent, or Firm*—Oblon, Spivak, McClelland, Maier & Neustadt, L.L.P.

(57) ABSTRACT

The present invention is intended to perform text-to-speech conversion by replacing URLs and electronic mail addresses included in the text data of electronic mail by registered predetermined words. A mail watcher application control section executes the processing for converting electronic mail received by a MAPI mailer into speech data. The mail watcher application control section outputs URLs and electronic mail addresses included in the text data of electronic mail supplied from the MAPI mailer to a URL and mail address filter to replace them by registered predetermined names. Of the entered texts, the URL and mail address filter compares the URL or mail address included in the entered text with those registered in the URL and mail address table. If a the URL or mail address of the entered text is found matching, the URL and mail address filter replace it by the registered name and outputs it to the mail watcher application control section.

21 Claims, 59 Drawing Sheets

U.S. PATENT DOCUMENTS

| | | | | |
|---|---|---|---|---|
| 6,810,378 | B2 * | 10/2004 | Kochanski et al. | 704/258 |
| 6,813,604 | B1 * | 11/2004 | Shih et al. | 704/260 |
| 6,925,437 | B2 * | 8/2005 | Hayashi | 704/260 |
| 6,944,591 | B1 * | 9/2005 | Raghunandan | 704/235 |
| 2002/0013708 | A1 * | 1/2002 | Walker et al. | 704/260 |

FOREIGN PATENT DOCUMENTS

| | | |
|---|---|---|
| JP | 11-242620 | 9/1999 |
| JP | 11-272442 | 10/1999 |
| JP | 11-345244 | 12/1999 |
| JP | 11-353000 | 12/1999 |
| WO | WO 01/33549 A1 | 5/2001 |

* cited by examiner

PDA4

FIG.18

```
<!DOCTYPE HTML PUBLIC "-//W3C//DTD HTML 4.0 Transitional//EN">
<HTML><HEAD>
<META http-equiv=Content-Type content="text/html;charset=iso-2022-JP">
<META content="MSHTML 5.50.4134.600" name=GENERATOR>
<STYLE></STYLE>
</HEAD>
<BODY bgCoLor=#ffffff>
<DIV><FONT size=2>.$B!{!{MM  (B</FONT></DIV>
<DIV><FONT size=2>.$B$$$D$b$*@$OC$K$J$C$F$*$j$^$9!#.(B</FONT></DIV>
<DIV> </DIV>
<DIV><FONT size=2>
<BLOCKQUOTE dir=ltr
style="PADDING-RIGHT:0px; PADDING-LEFT: 5px; MARGIN-LEFT: 5px; BORDER-LEFT:
#000000 2px solid; MARGIN-RIGHT: 0px">
  <DIV><FONT size=2>.$B8f<R7?HV.(B<FONT
  size=4><STRONG>BA-.$B#1#2#3#4.(B#</STRONG></FONT>.$B$r.(B</FONT><FONT
size=2>.$B#1#0#0%;%C%H.(B</FONT></DIV>
  <DIV><FONT size=2>.$BH/Cm$7$^$9!#.(B</FONT></DIV></FONT></BLOCKQUOTE></DIV>
<DIV><FONT size=2></FONT> </DIV>
<DIV><FONT size=2>.$B$"$j$.$H$&$4$6$$$^$7$?!#.(B</FONT></DIV>
<DIV><FONT size=2>.$B>&IJ$NH/Aw$O!"#1=54VDxEY$+$+$j$^$9!#.(B</FONT></DIV>
<DIV><FONT size=2>.$B@A5a=q&O!".(B</FONT></DIV>
<DIV><FONT
size=2>.$BJLESAwIU$5$;$F$$$?$@$-$^$9!#.(B</DIV></FONT></BODY></HTML>
```

I (brackets lines "<HTML><HEAD>" through "</HEAD>")
J (brackets lines "<BODY bgCoLor=#ffffff>" through "</HTML>")
K (brackets the "<BLOCKQUOTE …>" block through "</BLOCKQUOTE></DIV>")

FIG. 19A

| NAME | URL |
|---|---|
| PAGE OF VAIA | http://www.vaia.ss.co.jp |
| YUHI SHINBUN | http://www.Yuhi.com |
| TOTO NET | http://www.ToTo.net |
| WEATHER FORECAST | http://www.weather.com |
| ⋮ | ⋮ |

FIG. 19B

| NAME | MAIL ADDRESS |
|---|---|
| Mr. TANAKA, HOME | tana@odd.ne.jp |
| Mr. TANAKA, OFFICE | h_tanaka@AAA.com |
| abc CORPORATION | info@abc.co.jp |
| Mr. SUZUKI | suzuki@bbb.com |
| ⋮ | ⋮ |

FIG. 19C

| PROTOCOL | NAME | URL |
|---|---|---|
| http | PAGE OF TEST | www.testsite.com |
| | YUHI SHINBUN | www.Yuhi.com |
| ftp | MY BANK | ftp.mybank.co.jp |
| ⋮ | | ⋮ |

| Name List | |
|---|---|
| NAME | URL |
| PAGE OF VAIA | http://www.vaia.ss.co.jp |
| YUHI SHINBUN | http://www.Yuhi.com |
| TOTO NET | http://www.ToTo.net |
| WEATHER FORECAST | http://www.weather.com |
| NITINITI BROADCAST | http://www.nitiniti-cast.com |
| AKKUN PAGE | http://www.akkun.ne.jp |

[ ADD ]  [ CHANGE ]  [ DELETE ]

~290a

Add Name

NAME
[                    ]

URL
[                    ]

[ OK ]  [ CANCEL ]

~290b

Change

NAME
[ PAGE OF VAIA ]

URL
[ http://WWW.VAIA.ss.co.jp ]

[ OK ]  [ CANCEL ]

```
<!DOCTYPE NETSCAPE-Bookmark-file-1>
<!-- This is an automatically generated file.
It will be read and overwritten.
Do Not Edit! -->
<TITLE>Bookmarks</TITLE>
<H1>Bookmarks</H1>
<DL><p>
  <DT><A HREF="http://www.eeeclopedia.com/" ADD_DATE="975305763"
LAST_VISIT="989293344"LAST_MODIFIED="975305763">ELECTRONIC ENCYCLOPEDIA</A>
  <DT><A HREF="http://www.***.com/" ADD_DATE="975305763" LAST_VI
SIT="989293344" LAST_MODIFIED="975305763">JITEN</A>
  <DT><A HREF="http://www.ss.net.or.jp/^k-naka/index.html" ADD_DATE=
"975305763" LAST_VISIT="989293344" LAST_MODIFIED="975305763">MARINE
 DICTIONARY</A>
</DL><p>
```

○ ○○○@×××  /Re:TODAY'S SCHEDULE

>>For private business, I will leave early at 16:00.
>>I am sorry to bother you when you are busy. Thank you.
>☆

Return-Path:<aaaaaa@jp. ××.com>
Delivered-To:○○-associates_co.bbbbbbbb@domail13.so-net.ne.jp
Received:(qmail 14590 invoked by alias);13 Apr 2001 11:02:58+0900
Delivered-To:alias-○○-associated_co.bbbbbbbb@○○-associates.co.jp
Received:(qmail 14586 invoked from network);13 Apr 2001 11:02:57+0900
Received:(from ns5.××.co.jp(@202.238.80.5)
by domail13.so-net.ne.jp with SMTP; 13 Apr 2001 11:02:57+0900
Received:from mail2.××.co.jp(gatekeeper8.××.co.jp[202.238.80.22])
by ns5.××.co.jp(R8)with ESMTP id f3D22v393379
for<bbbbbbbb@○○-associates.co.jp>;Fri.13 Apr 2001 11:02:57+0900
(JST)
Rceived:from mail2.××.co.jp(localhost[127.0.0.1])
by mail2.××.co.jp(R8)with ESMTP id f3D22vY07872
for <bbbbbbbb@○○-associates.co.jp>;Fri.13 Apr 2001 11:02:57+0900
(JST) 491 492
Rceived:from sjp01037.meis.××.co.jp(sjp01037.meis.×.co.jp[43.1.11.15])
by mail2.××.co.jp(R8)with ESMTP id f3D22vv07862
for <bbbbbbbb@○○-associates.co.jp>;Fri.13 Apr 2001 11:02:57+0900
(JST)
Received:from cjp25142.××.co.jp(CJP25142[43.22.113.129]by sip01037.meis.
××.co.jp with SMTP(Micro*Exch**Internet Mail Service Version)
5.5 2653.13)
id 2RRMTHFS;Fri.13 Apr 2001 11.02.56+0900
Message-Id<200104130202.AA01520@cjp25142.××.co.jp>
From:aaaaaa<aaaaaa@jp.××.com> 493
Date:Fri. 13 Apr 2001 11:02:28+0900
To:
=?ISO-2022-JP?B?GyRCNUgxSiFKMHBLXDIxOI1GQzV203ZMMz1qIUsbKEI=
?=
<bbbbbbbb@○○-associates.co.jp>
Subject:Re:00005340 &=?ISO-2022-JP?B?MDAwMDU4ODAbJEIkTjdvGyhC?=
In-Reply-To:<000801c0c316$78c8db60$1000a8c0@aterm> 494
References:<000801c0c316$78c8db60$1000a8c0@aterm>
MIME-Version:1.0
X-Mailer:AA-Mail32 Version 1.10
Content-Type:text/plain;charset=iso-2022-jp
495

F I G. 50
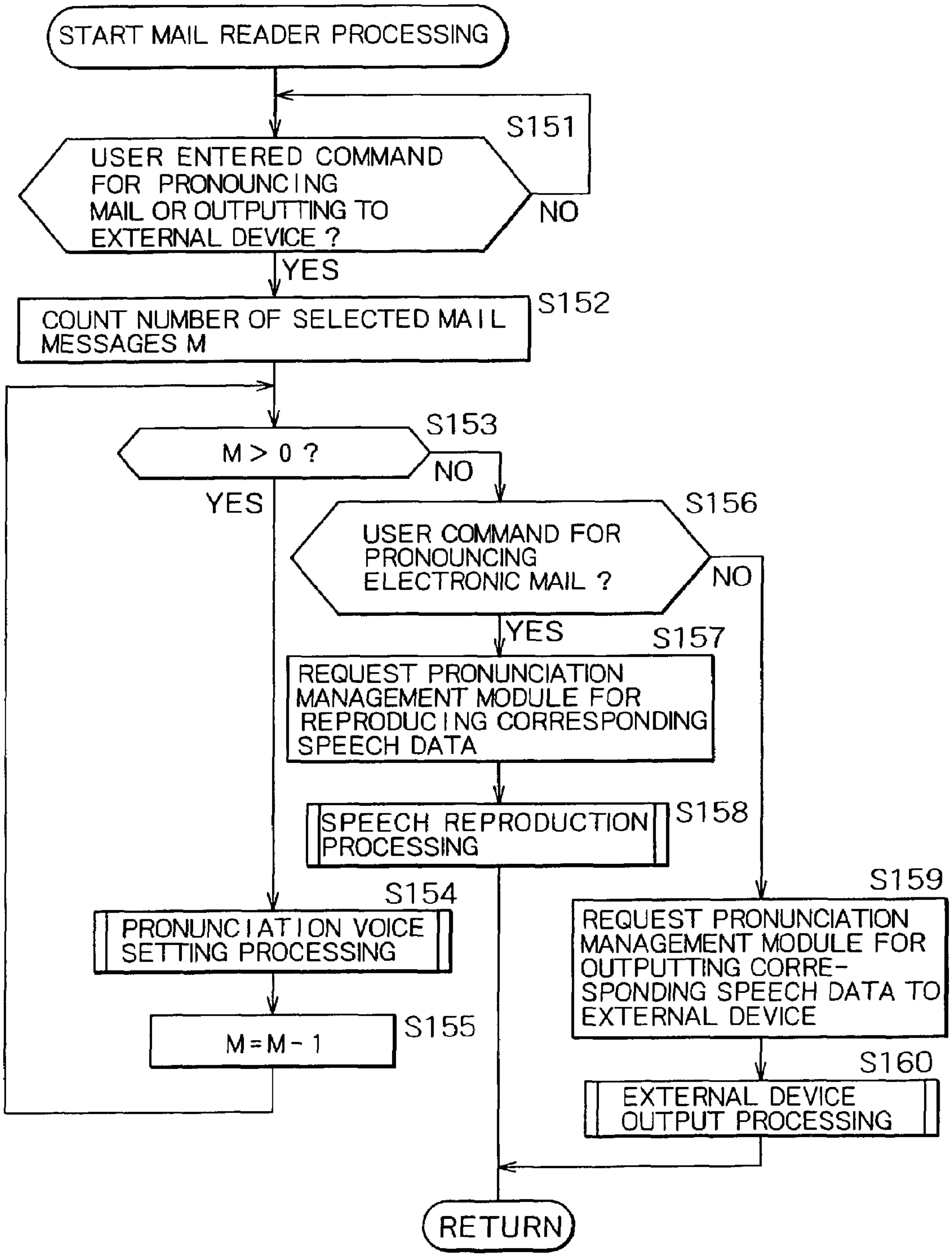

FIG. 52

```
<html>

L { <head>
    <meta http-equiv="Content-Type"
    content="text/html: charset=x-sjis">
    <meta name="GENERATOR" content="Micro**** Front**** Exp**** 2.0">
    <title> ENGLISH TOY BOX </title>
    </head>

M { <body bgcolor="#BDFFFF" link="#0000FF" vlink="#800080">

    <p align="center"><img src="b_shibas.gif" width="60" height="70"><font size="7"> ENGLISH TOY BOX </font><br>
    </p>

    <hr>

    <p align="center"> WELCOME! YOU ARE <img src="http://mc***.n***y.ne.jp/cgi-bin/counter.cgi?u=G***56&
    p=2&c=6"> -th VISITOR              </p>
    ≈

    <p align="center"> This page is link-free. <br>
    I will be pleased to recive your mail. </P>

    <p align="center"><img src="ojigi.19.gif" width="50" height="73"> Send you mail to... <a
    href="mailto:aaaa@bbbb.ne.jp</a></p>
    </body>
    </html>
```

INFORMATION PROCESSING APPARATUS AND METHOD, RECORDING MEDIUM, AND PROGRAM FOR CONVERTING TEXT DATA TO AUDIO DATA

BACKGROUND OF THE INVENTION

The present invention relates generally to an information processing apparatus and method, a recording medium, and a program. More particularly, the present invention relates to an information processing apparatus and method, recording apparatus, and a program which are suitably of use in converting text data into speech data by text-to-speech synthesis.

Technologies are known in which software performs text-to-speech synthesis on a text entered through the keyboard of a personal computer to read aloud the speech obtained by this processing. These technologies are applied to the browsing of Web pages, the utterance of electronic mail, and the utterance of user-specified text data.

However, if entered text data is converted directly into speech data, it presents a problem that URLs of Web pages and electronic mail addresses, for example, are read aloud as a string of characters, making it more difficult for users to understand than if the data were displayed as character information. Another problem is that, if the system is preset so as to convert text data into plausible Roman letters or characters to pronounce, such speech may be meaningless to the users.

SUMMARY OF THE INVENTION

It is therefore an object of the present invention to solve the above-mentioned problems by executing text-to-speech synthesis by replacing URLs of Web pages and electronic mail addresses by user-comprehensible words.

In carrying out the invention and according to one aspect thereof, there is provided an information processing apparatus comprising: text input means for entering text data; recording means for recording at least one piece of first information and second information corresponding to each piece of the first information; first detecting means for detecting a text matching the first information recorded in the recording means from the text data entered through the text input means; replacing means for replacing the first information detected by the first detecting means with the corresponding second information by referring to the first information and the second information recorded by the recording means; and speech data generating means for generating speech data corresponding to the text data by performing text-to-speech synthesis on the text data with the first information replaced with the second information by the replacing means.

The above-mentioned information processing apparatus, further comprises second detecting means for detecting predetermined third information from the text data entered through the text data input means. On the basis of text data before and after the third information detected by the second detecting means, the first detecting means detects from the text data the first information recorded to the recording means.

In the above-mentioned information processing apparatus, the third information is an “at” sign and the first information is an electronic mail address.

In the information processing apparatus, the third information is a colon sign and the first information is a URL (Uniform Resource Locator) of a Web site.

In the above-mentioned information processing apparatus, the first information is a URL of a Web site. The recording means records the first information for each protocol in a distinguishable manner, and, if a text matching the protocol is detected from the text data, the first detecting means refers to the first information having the corresponding protocol to execute detection processing.

The above-mentioned information processing apparatus, further comprises registration means for registering the first information and second information corresponding to the first information into the recording means.

The above-mentioned information processing apparatus, further comprises display control means for controlling a display window for a user to enter the first information and the second information corresponding to the first information. The registration means registers the first information and the second information entered by the user by referring to the display window to the recording means.

The above-mentioned information processing apparatus, further comprises transferring means for sending and receiving electronic mail. The transferring means records at least one electronic mail address and a registered name corresponding thereto. The registration means registers into the recording means the electronic mail address recorded in the transferring as the first information and the registered name as the second information.

The above-mentioned information processing apparatus, further comprises Web page browsing means for browsing a Web page. The Web page browsing means records at leans one URL and a registered name corresponding thereto. The registration means registers into the recording means the URL recorded in the transferring means as the first information and the registered name corresponding thereto as the second information.

In carrying out the invention and according to another aspect thereof, there is provided an information processing method comprising: a text input step for entering text data; a recording control step for controlling the recording of at least one piece of first information and second information corresponding to each piece of the first information; a detecting step for detecting a text matching the first information of which recording is controlled by the recording control step from the text data entered through the text input step; a replacing step for replacing the first information detected by the first detecting step with the corresponding second information by referring to the first information and the second information of which recording is controlled by the recording control step; and a speech data generating step for generating speech data corresponding to the text data by performing text-to-speech synthesis on the text data with the first information replaced with the second information by the replacing step.

In carrying out the invention and according to still another aspect thereof, there is provided a recording medium recording a computer-readable program comprising: a text input step for entering text data; a recording control step for controlling the recording of at least one piece of first information and second information corresponding to each piece of the first information; a detecting step for detecting a text matching the first information of which recording is controlled by the recording control step from the text data entered through the text input step; a replacing step for replacing the first information detected by the first detecting step with the corresponding second information by referring to the first information and the second information of which recording is controlled by the recording control step; and a speech data generating step for generating speech data corresponding to the text data by performing text-to-speech synthesis on the text data with the first information replaced with the second information by the replacing step.

In carrying out the invention and according to yet another aspect thereof, there is provided a program for making a computer execute processing including: a text input step for entering text data; a recording control step for controlling the recording of at least one piece of first information and second information corresponding to each piece of the first information; a detecting step for detecting a text matching the first information of which recording is controlled by the recording control step from the text data entered through the text input step; a replacing step for replacing the first information detected by the detecting step with the corresponding second information by referring to the first information and the second information of which recording is controlled by the recording control step; and a speech data generating step for generating speech data corresponding to the text data by performing text-to-speech synthesis on the text data with the first information replaced with the second information by the replacing step.

In the information processing apparatus and method and the program according to the present invention, text data is entered, at least one piece of first information and second information corresponding to each piece of the first information are recorded, text matching the recorded first information are detected from the entered text data, the recorded first information and second information are referred to replace the detected first information with the second information, and text-to-speech synthesis is executed by use of the text data with the first information replaced with the second information to generate speech data corresponding to the text data.

BRIEF DESCRIPTION OF THE DRAWINGS

These and other objects of the invention will be seen by reference to the description, taken in connection with the accompanying drawing, in which:

FIG. 18 is a diagram illustrating tags of electronic mail of HTML format;

FIGS. 19A, 19B and 19C are diagrams illustrating data registered in a URL and mail address table;

FIG. 22 is a diagram illustrating a bookmark file;

FIG. 37 is a diagram illustrating a header of electronic mail;

FIG. 50 is a flowchart describing mail reader processing;

FIG. 52 is a diagram illustrating a Web page source;

DETAILED DESCRIPTION OF PREFERRED EMBODIMENTS

This invention will be described in further detail by way of example with reference to the accompanying drawings.

Figure 1:
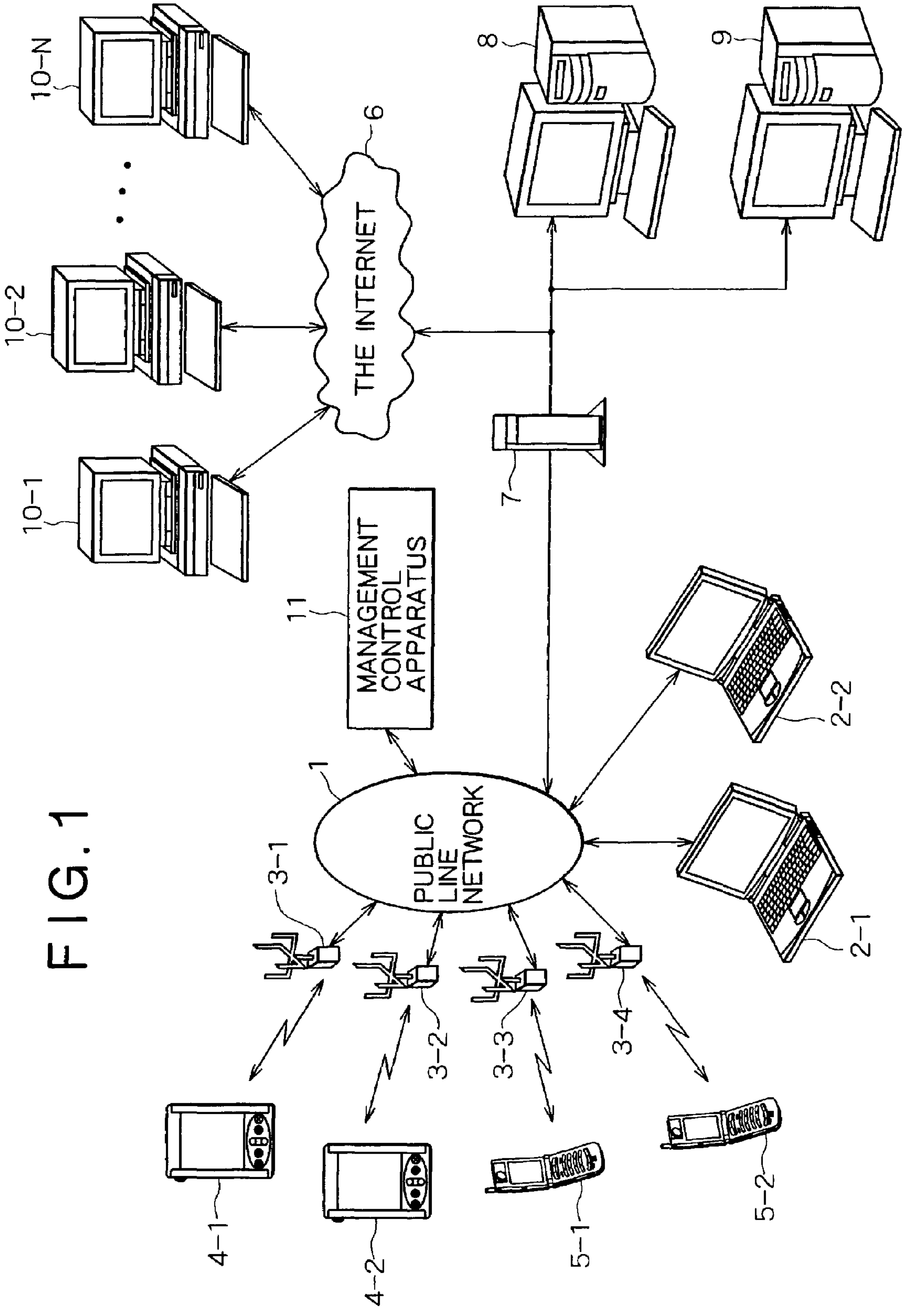
FIG. 1 is a schematic diagram illustrating the transfer of electronic mail and Web page data.

The following describes a network system for executing transmitting and receiving operations of electronic mail and Web page browsing with reference to FIG. 1.

A public line network 1 is connected to personal computers 2-1 and 2-2. The public line network 1 is also connected to PDAs 4-1 and 4-2 and camera-mounted digital mobile phones 5-1 and 5-2 through base stations 3-1 through 3-4, which are stationary wireless stations, arranged in cells obtained by dividing a communication service providing area into a desired size of area.

The base stations 3-1 through 3-4 wirelessly connects to the PDAs 4-1 and 4-2 and the camera-mounted digital mobile phones 5-1 and 5-2, which are mobile stations, by means of W-CDMA (Wideband Code Division Multiple Access) for example, and can perform high-speed data communication for transferring mass data at a rate of up to 2 Mbps with the PDAs 4-1 and 4-2 and the camera-mounted digital mobile phones 5-1 and 5-2 by use of 2 GHz frequency band.

Because the PDAs 4-1 and 4-2 and the camera-mounted digital mobile phones 5-1 and 5-2 can transfer mass data with the base stations 3-1 through 3-4 at high speeds by W-CDMA, these mobile stations may execute various data communication operations including not only speech communication but also the transfer of electronic mail, the browsing simplified home pages, and the transfer of images.

The base stations 3-1 through 3-4 are also connected to the public line network 1 by a wired line. The public line network 1 is connected to the Internet 6, subscriber wired terminal devices, computer networks, and intranet for example, not shown.

An access sever 7 of an Internet service provider is connected to the public line network 1 and to a content server 8 and an electronic mail server 9 of the Internet service provider.

The content server 8 provides content such as a simplified home page as a file based on HTML (Hypertext Markup Language) or compact HTML in response to the requests from the subscriber wired terminal devices, the PDAs 4-1 and 4-2, the camera-mounted digital mobile phones 5-1 and 5-2, and the personal computers 2-1 and 22.

The electronic mail server 9 manages the transfer of electronic mails. The electronic mail server 9 is constituted by an SMTP server for transmission and a POP server for reception. The mail transmitted from the SMTP server is not delivered directly to the POP server of the recipient but passes many servers on the Internet 6 before reaching the POP server of the recipient. The POP server of the receiving side temporarily stores the received electronic mail in its mail box. The user who wants to receive electronic mail receives it by accessing the electronic mail server 9 used every time electronic mail arrives by use of the PDA 4-1 or 4-2, the camera-mounted digital mobile phone 5-1 or 5-2, or the personal computer 2-1 or 2-2.

The Internet 6 is connected to many WWW (World Wide Web) servers 10-1 through 10-N. The WWW servers 10-1 through 10-N are accessed from the subscriber wired terminal apparatus, the PDAs 4-1 and 4-2, the camera-mounted digital mobile phones 5-1 and 5-2, and the personal computers 2-1 and 2-2 in accordance with TCP (Transmission Control Protocol/IP (Internet Protocol).

The PDAs 4-1 and 4-2 and the camera-mounted digital mobile phones 5-1 and 5-2 communicate with the base stations 3-1 through 3-4 with a simplified transport protocol of 2 Mbps and make communication from the base stations 3-1 through 3-4 to the Internet 6 and the WWW servers 10-1 through 10-N with TCP/IP.

A management control apparatus 11 is connected to the subscriber wired terminal apparatus, the PDAs 4-1 and 4-2, the camera-mounted digital mobile phones 5-1 and 5-2 and the personal computers 2-1 and 2-2 via the public line network 1 to execute certification processing and charge processing on the subscriber wired terminal apparatus, the PDAs 4-1 and 4-2, the camera-mounted digital mobile phones 5-1 and 5-2 and the personal computers 2-1 and 2-2.

In what follows, the personal computers 2-1 and 2-2 are generically referred to as a personal computer 2 unless otherwise required. The base stations 3-1 through 3-4 are generically referred to as a base station 3 unless otherwise required. The PDAs 4-1 and 4-2 are generically referred to as a PDA 4 unless otherwise required. The camera-mounted digital mobile phones 5-1 and 5-2 are generically referred to as a camera-mounted digital mobile phone 5 unless otherwise required.

Referring to FIGS. 2 through 5, there are shown external views of the personal computer 2.

Figure 2:
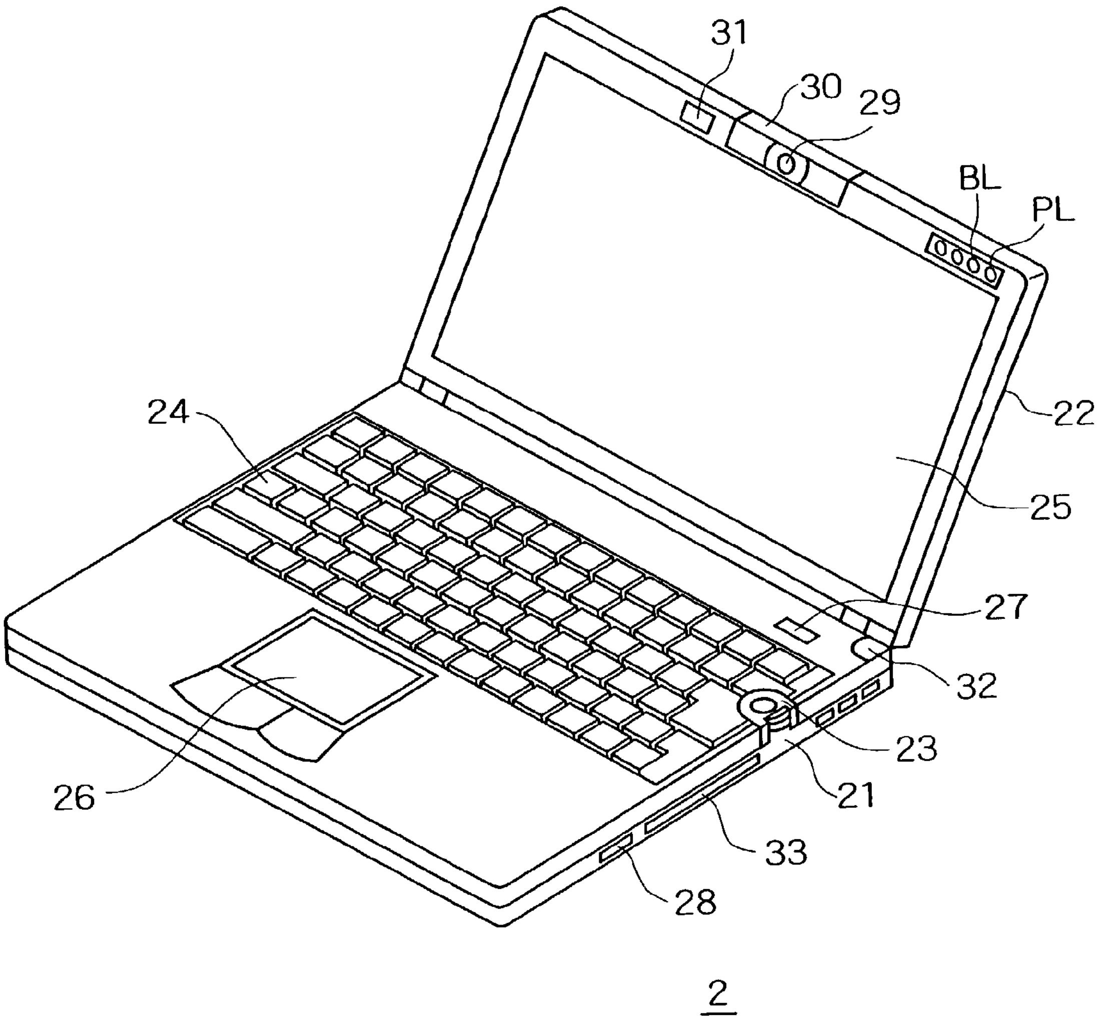
FIG. 2 is a top perspective view illustrating a personal computer shown in FIG. 1.
Figure 3:
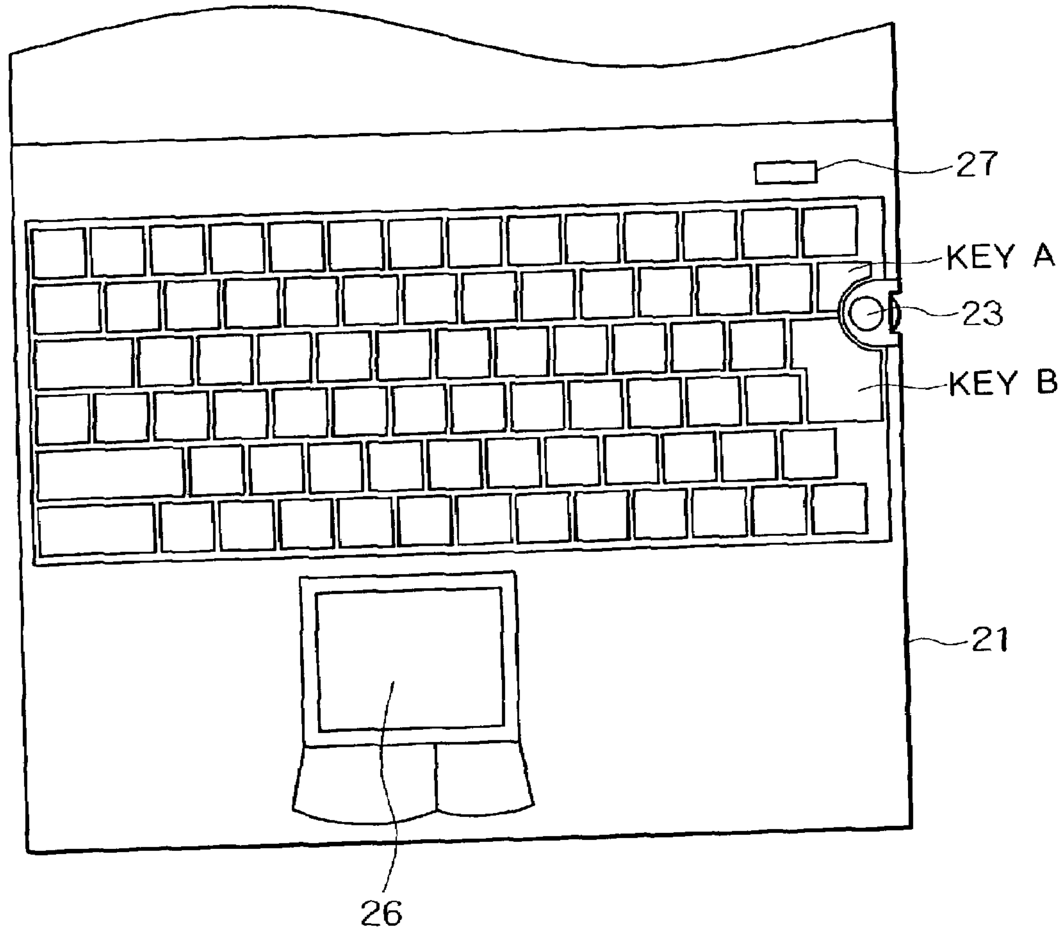
FIG. 3 is a top view illustrating the body of the personal computer shown in FIG. 1.
Figure 4:
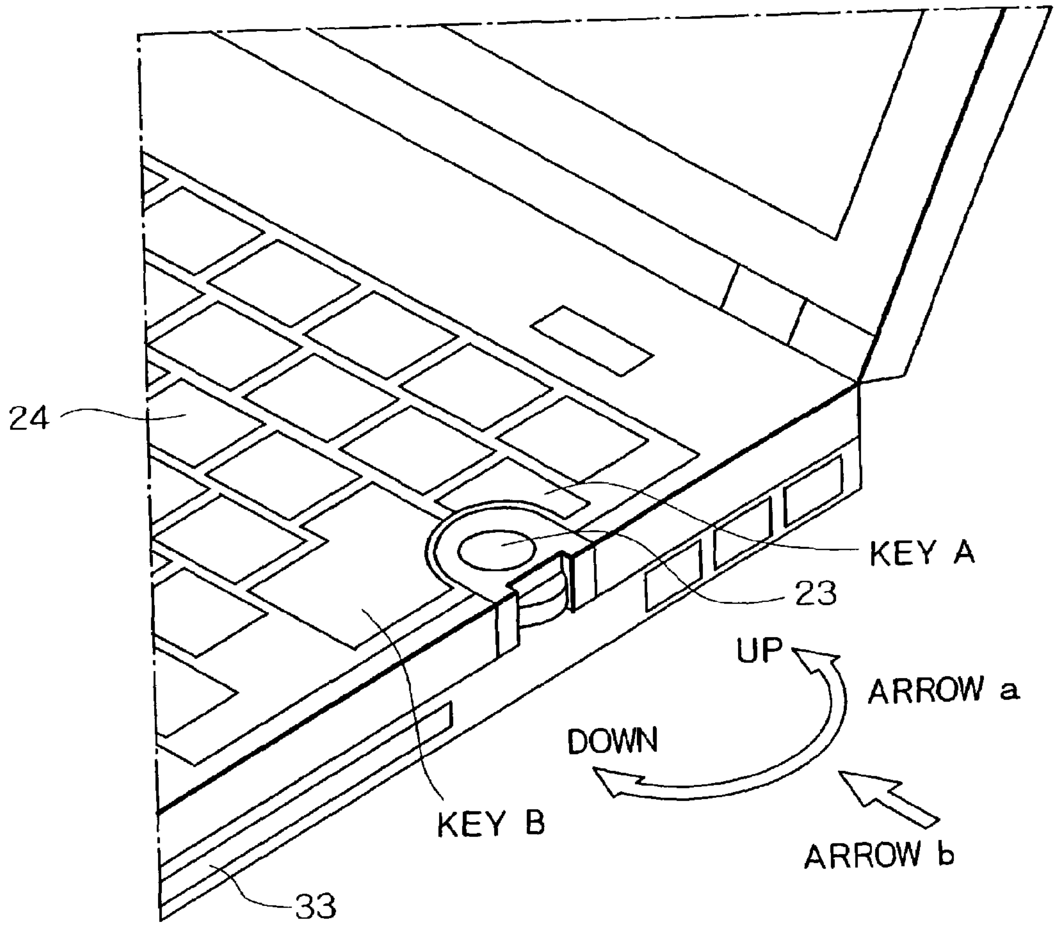
FIG. 4 is an expanded view illustrating a portion around a jog dial of the personal computer shown in FIG. 1.
Figure 5:
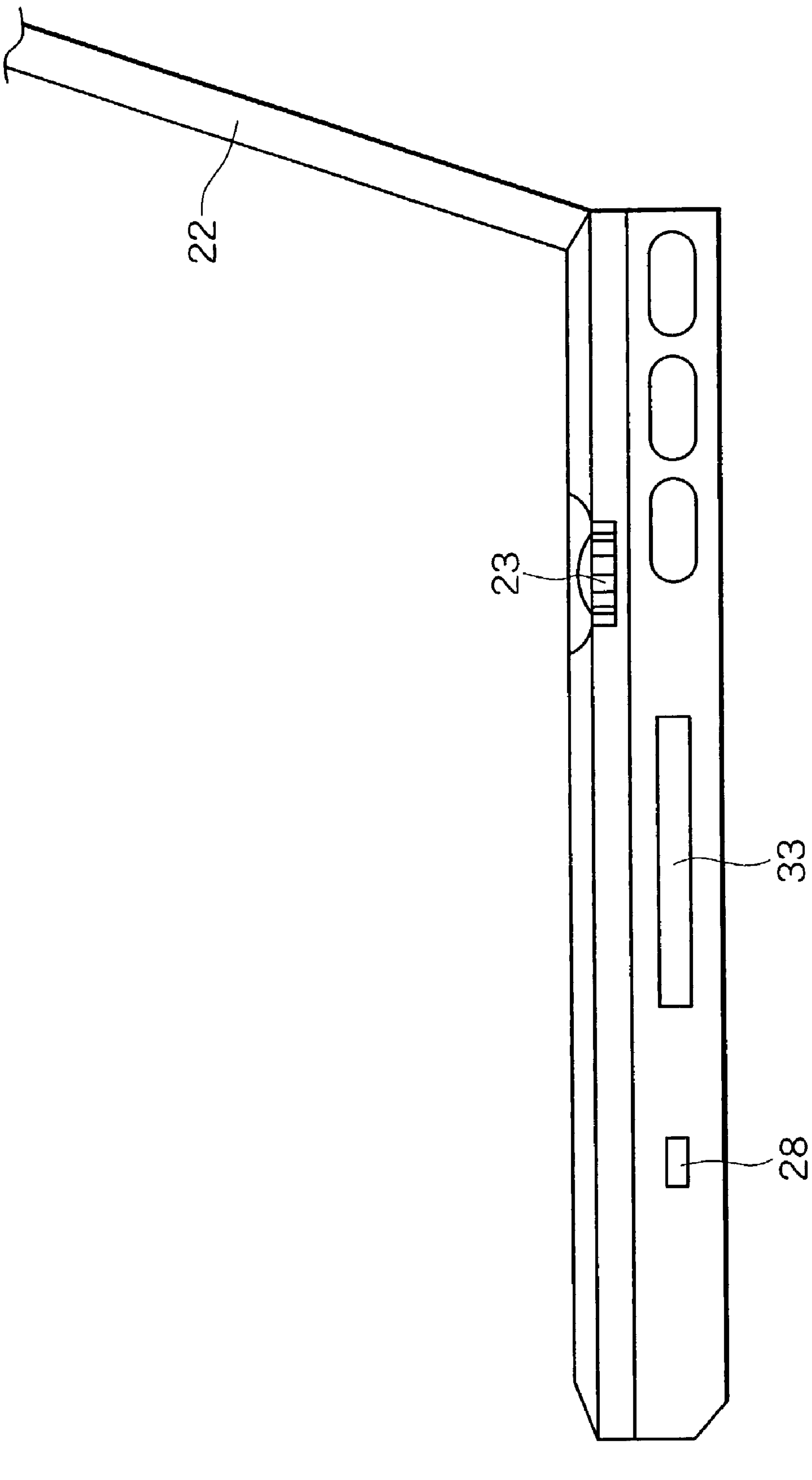
FIG. 5 is a right-side view illustrating the configuration of the right side of the personal computer shown in FIG. 1.

The personal computer 2 basically comprises a main body 21 and a display section 22 which is pivotally fixed to the main body 21. FIG. 2 is an external perspective view of the personal computer 2 with the display section 22 in an open position relative to the main body 21. FIG. 3 is a top view of the main body 21. FIG. 4 is an expanded view of a jog dial 23 to be described later which is arranged on the main body 21. FIG. 5 is a side view of the jog dial 23 arranged on the main body 21.

The main body 21 is arranged on the upper surface thereof with a keyboard 24 which is operated when entering various characters and symbols, a touchpad 26 namely a pointing device which is operated when moving a pointer (or a mouse cursor) displayed on an LCD 25, and a power switch 27. In addition, the jog dial 23, an IEEE (Institute of Electrical and Electronics Engineers) 1394 port 28, and so on are arranged on one side of the main body 21. It should be noted that a stick-type pointing device may be arranged instead of the touchpad 26.

The display section 22 is arranged on the front side thereof with the LCD (Liquid Crystal Display) 25 for displaying images, and at the upper right portion thereof with a power light PL, a battery light BL, a message light ML (not shown) and other indicator lights constituted by LED as required. Further, the display section 22 is arranged in the upper center thereof with an imaging section 30 having a CCD video camera 29 containing a CCD (Charge Coupled Device) and a microphone 31. The main body 21 is arranged at the upper right thereof with a shutter button 32 for operating the CCD video camera 29 as shown in FIG. 2.

The imaging section 30 is pivotally fixed to the display section 22. For example, the imaging section 30 is pivotally moved by the operation of the user from a position at which the CCD video camera 29 can image the user himself operating the personal computer 2 to a position at which the CCD video camera 29 can image an object in the direction of the sight line of the user operating the personal computer 2.

The jog dial 23 is arranged between key A and key B arranged on the right side of the keyboard 24 on the main body 21 as shown in FIG. 3 such that the top of the jog dial 23 comes approximately to the same height as the top of these keys. The jog dial 23 executes predetermined processing (for example, screen scroll) in correspondence with a rotational operation indicated by arrow a shown in FIG. 4 and predetermined processing (for example, entering icon selection) in correspondence with a linear operation indicated by arrow b shown in the same figure.

The IEEE 1394 port 28 has a structure based on the IEEE 1394 port standard and is connected with a cable based on this standard.

Figure 6:
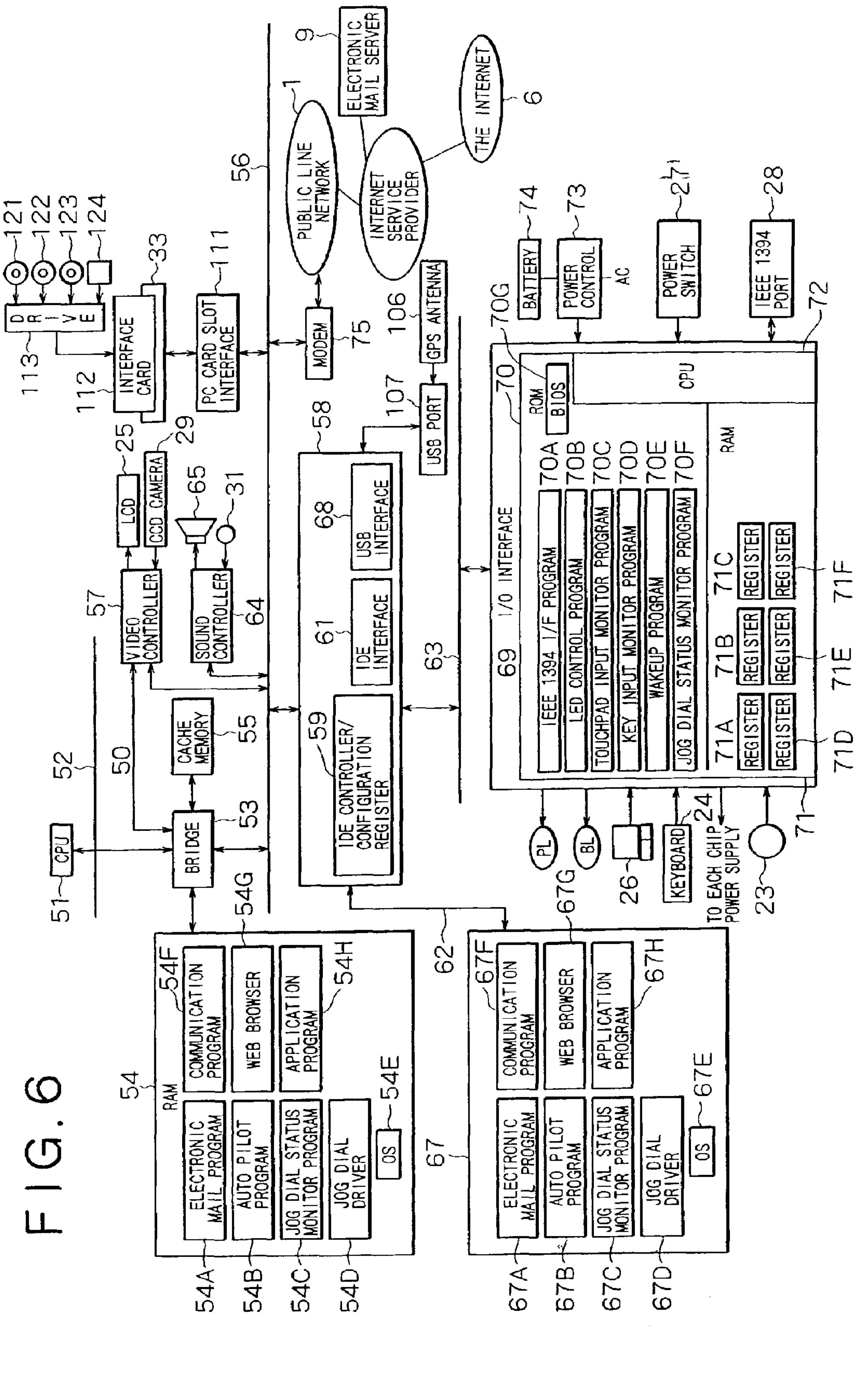
FIG. 6 is a block diagram illustrating an exemplary internal configuration of the personal computer shown in FIG. 1.

The following describes an exemplary internal configuration of the personal computer 2 with reference to FIG. 6.

A central processing unit (CPU) 51 is constituted by a Pentium (trademark) processor of Intel Corporation for example and connected to the host bus 52. The host bus is connected to a bridge 53 (a so-called north bridge). The bridge 53 has an AGP (Accelerated Graphics Port) 50 and is connected to a PCI (Peripheral Component Interconnect/Interface) bus 56.

The bridge 53 is constituted by a 440BX, which is an AGP host bridge controller of Intel Corporation for example, and controls the CPU 51 and a RAM (Random Access Memory) (a so-called main memory) 54. In addition, the bridge 53 controls a video controller 57 via the AGP 50. It should be noted that the bridge 53 and a bridge (so-called south bridge or PCI-ISA bridge) 58 constitute a so-called chip set.

The bridge 53 is also connected to a cache memory 55. The cache memory 55 is constituted by a memory which can perform read/write operations faster than the RAM 54 such as SRAM (Static RAM) and caches (or temporarily stores) the programs and data to be used by the CPU 51.

It should be noted that the CPU 51 incorporates a primary cache memory which operates faster than the cache memory 55 and is controlled by the CPU 51 itself.

The RAM 54 is constituted by a DRAM (Dynamic RAM) for example and stores the programs to be executed by the CPU 51 and the data necessary for the CPU 51 to operate. To be more specific, the RAM 54 stores, for example, an electronic mail program 54A, an auto pilot program 54B, a jog dial status monitor program 54C, a jog dial driver 54D, an operating system program (OS) 54E, a communication program 54F, a Web browser 54G, and other application programs 54H (including a mail watcher application, a Web reader application, a mail reader application, and text pronunciation application to be described later) which are loaded from an HDD 67 at the predetermined timing.

The electronic mail program 54A transfers communication text (electronic mail) via a modem 75, the public line network 1, the Internet service provider, the electronic mail server 9, and the Internet 6.

The auto pilot program 54B sequentially starts a plurality of preset processing operations (or programs) in a predetermined sequence for communication processing.

The jog dial status monitor program 54C receives information from each of the above-mentioned application programs indicating whether or not it is compatible with the jog dial 23. If the application program is found compatible with the jog dial 23, then the jog dial status monitor program 54C displays information telling what can be done by operating the jog dial 23 onto the LCD 25.

Also, the jog dial status monitor program 54C detects an event of the jog dial 23 (a rotation in the direction of arrow a shown in FIG. 4 or a pushing in the direction of arrow b shown in FIG. 4 for example) and executes the processing corresponding to the detected event. The jog dial driver 54D executes various functions in response to the operation of the jog dial 23.

The OS (Operating System) 54E is a program for controlling the basic operations of the computer and typically Windows (trademark) 95 or 98 of Microsoft Corporation or Mac OS (trademark) of Apple Computer Inc. for example.

The communication program 54F executes the processing for pier-to-pier communication and, at the same time, controls the electronic mail program 54A to establish the communication connection for this processing, thereby sending electronic mail attached with the IP address of the personal computer 2 to the mate of communication and getting the IP address of the mate from predetermined electronic mail received from the mate.

Also, the communication program 54F controls the Web browser 54G to perform the communication based on the functionality of the Web browser 54G.

The Web browser 54G, under the control of the communication program 54F, executes the processing for browsing the data of a predetermined Web page (to be displayed on the display section 22).

The application program 54H includes various application programs such as the mail watcher application, the Web reader application, the mail reader application, and text pronunciation application to be described later.

The video controller 57 is connected to the bridge 53 through the AGP 50 and receives the data (such as image data and text data) supplied from the CPU 51 through the AGP 50 and the bridge 53, generates image data corresponding to the received data, and stores the generated data or the received data directly into an incorporated video memory. The video controller 57 causes the LCD 25 of the display section 22 to display the image corresponding to the image data stored in the video memory.

Also, the video controller 57 supplies the video data supplied from the CCD video camera 29 to the RAM 54 through the PCI bus 56.

The PCI bus 56 is connected to the sound controller 64. The sound controller 64 captures an audio signal from the microphone 31, generates data corresponding to the captured signal, and outputs the generated data to the RAM 54. Also, the sound controller 64 drives the speaker 65 to sound the audio signal.

The PCI bus 56 is also connected to the modem 75. The modem 75 is connected to the public line network 1 and executes the communication processing via the public line network 1 or the Internet 6.

A PC card slot interface 111, connected to the PCI bus 56, supplies the data supplied from an interface card 112 loaded in a slot 33 to the CPU 51 or the RAM 54 and outputs the data supplied from the CPU 51 to the interface card 112. A drive 113 is connected to the PCI bus 56 via the PC card slot interface 111 and the interface card 112.

The drive 113 reads data from a magnetic disc 121, an optical disc 122, a magneto-optical disc 123, or a semiconductor memory 124 (including a Memory Stick (trademark) to be described with reference to FIG. 7) loaded and supplies the retrieved data to the RAM 54 through the interface card 112, the PC card slot interface 111, and the PCI bus 56. Also, the drive 113 can stores the data generated by the processing of the CPU 51 (for example, the audio data to be generated by the processing to be described later) into the magnetic disc 121, the optical disc 122, the magneto-optical disc 123, or the semiconductor memory 124 (the Memory Stick 131) loaded on the drive 113.

It should be noted that a Memory Stick slot may be separately arranged in which the Memory Stick 131 is directly loaded without using the interface card 112 and the drive 113.

Consequently, since the personal computer 2 is configured to load the Memory Stick 131, the personal computer 2 can share data with other electronic devices (for example, the PDA 4 and the camera-mounted digital mobile phone 5 or a mobile music reproducing apparatus 271 to be described later with reference to FIG. 14) through the Memory Stick 131.

Further, the PCI bus 56 is connected to the bridge 58 (a so-called south bridge). The bridge 58 is constituted by the PIIX4E of Intel Corporation for example and incorporates an IDE (Integrated Drive Electronics) controller/configuration register 59, IDE interface 61, and a USB interface 68. The bridge 58 controls various I/O (Input/Output) operations such as controlling of the devices connected to the IDE bus 62 or the devices connected through an ISA/EIO (Industry Standard Architecture/Extended Input Output) bus or an I/O interface 69, for example.

The IDE controller/configuration register 59 is constituted by two IDE controllers, a so-called primary IDE controller and a so-called secondary IDE controller, and a configuration register (each not shown).

The primary IDE controller is connected to a HDD 67 through the IDE bus 62. The secondary IDE controller is electronically connected to IDE devices such as a CDROM drive and a HDD not shown when they are loaded on another IDE bus.

The HDD 67 stores an electronic mail program 67A, an auto pilot program 67B, a jog dial status monitor program 67C, a jog dial driver 67D, an OS 117E, a communication program 67F, a Web browser 67G, and other application programs 67H, for example.

The electronic mail program 67A through the application programs 67H stored in the HDD 67 are loaded in the RAM 54 as required.

An ISA/EIO bus 63 is connected to the I/O interface 69. The I/O interface 69 is constituted by an embedded controller in which a ROM 70, a RAM 71, and a CPU 72 are interconnected.

The ROM 70 stores beforehand an IEEE 1394 interface program 70A, a LED control program 70B, a touchpad input monitor program 70C, a key input monitor program 70D, a wakeup program 70E, and a jog dial status monitor program 70F, for example.

The IEEE 1394 interface program 70A transfers data based on the IEEE 1394 standard (the data stored in packets) through the IEEE 1394 port 28. The LED control program 70B controls the on/off operation of a power light PL, a battery light BL, and a message light ML and other indicator lights constituted by LED provided as required. The touchpad input monitor program 70C monitors the input operation done on the touchpad 26 by the user.

The key input monitor program 70D monitors the input operation done on the keyboard 24 and other key switches. The wakeup program 70E checks whether or not a predetermined time has been reached on the basis of the data indicative of current time supplied from a timer circuit (not shown) in the bridge 58. When the predetermined time has been reached, the wakeup program 70E controls the power supply to each chip constituting the personal computer 2 to start predetermined processing (or predetermined programs) or the like. The jog dial status monitor program 70F always monitors whether or not the rotary encoder of the jog dial 23 has been operated or the jog dial 23 has been pushed.

The ROM 70 also stores a BIOS (Basic Input/Output System) 70G. The BIOS 70G controls the transfer of data between the OS or application programs and peripheral devices (the touchpad 26, the keyboard 24, the HDD 67 and so on).

The RAM 71 has registers for LED control, touchpad input status, key input status, or time setting, a jog dial status monitoring I/O register, an IEEE 1394 I/F register or the like as registers 71A through 71F. For example, when the jog dial 23 is pushed to start the electronic mail program 54A, a predetermined value is stored in the LED control register, thereby controlling the turn-on of the message light ML according to the stored value. When the jog dial 23 is pressed, a predetermined operation key flag is stored in the key input status register. A predetermined time is set to the setting time register in correspondence with the operation of the keyboard 24 for example by the user.

The I/O interface 69 is also connected to the jog dial 23, the touchpad 26, the keyboard 24, the IEEE 1394 port 28, and the shutter button 32 through connectors, not shown, outputting signals corresponding to the operations of the jog dial 23, the touchpad 26, the keyboard 24, and the shutter button 32 to the ISA/EIO bus 63. Also, the I/O interface 69 controls the data transfer with the devices connected via the IEEE 1394 port 28. Further, the I/O interface 69 is connected to the power light PL, the battery light BL, the message light ML, the power control 73, and other lights constituted by LEDs.

The power control 73 is connected to an incorporated battery 74 or an AC power supply, supplying power to component of the personal computer 2 and, at the same time, controls the charging of the incorporated battery 74 or a second battery of each peripheral device. In addition, the I/O interface 69 monitors the power switch 27 which is operated to turn on/off the power supply.

When the power is in off state, the I/O interface 69 executes the IEEE 1394 interface program 70A through the jog dial status monitor program 70F by means of an internal power supply. Namely, the IEEE 1394 interface program 70A through the jog dial status monitor program 70F are always in operation.

Consequently, even when the power switch 27 is off and therefore the CPU 51 is not executing the OS 54E, the I/O interface 69 executes the jog dial status monitor program 70F, so that, if the jog dial 23 is pushed in power save state or power-off state, the personal computer 2 starts the processing of predetermined software programs or script files.

Thus, in the personal computer 2, the jog dial 23 has a programmable power key (PPK) capability, making it unnecessary to arrange a dedicated key.

Figure 7:
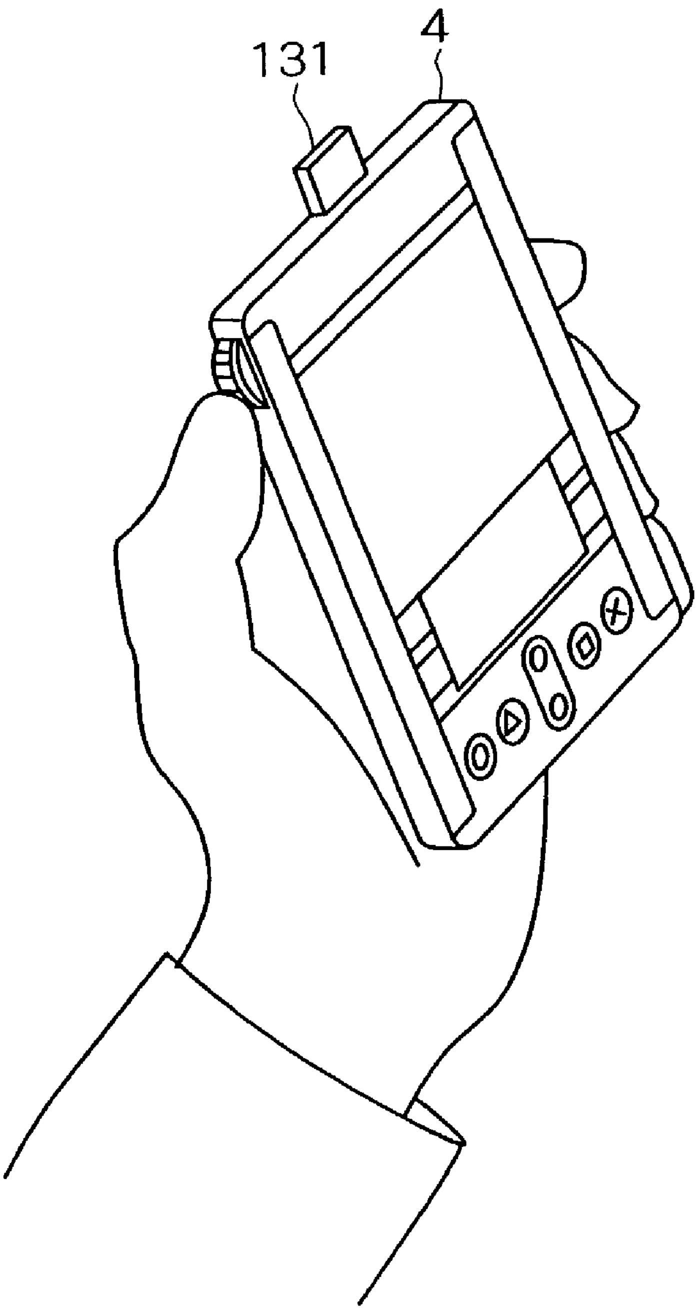
FIG. 7 is a perspective view illustrating an external view of a PDA.
Figure 8:
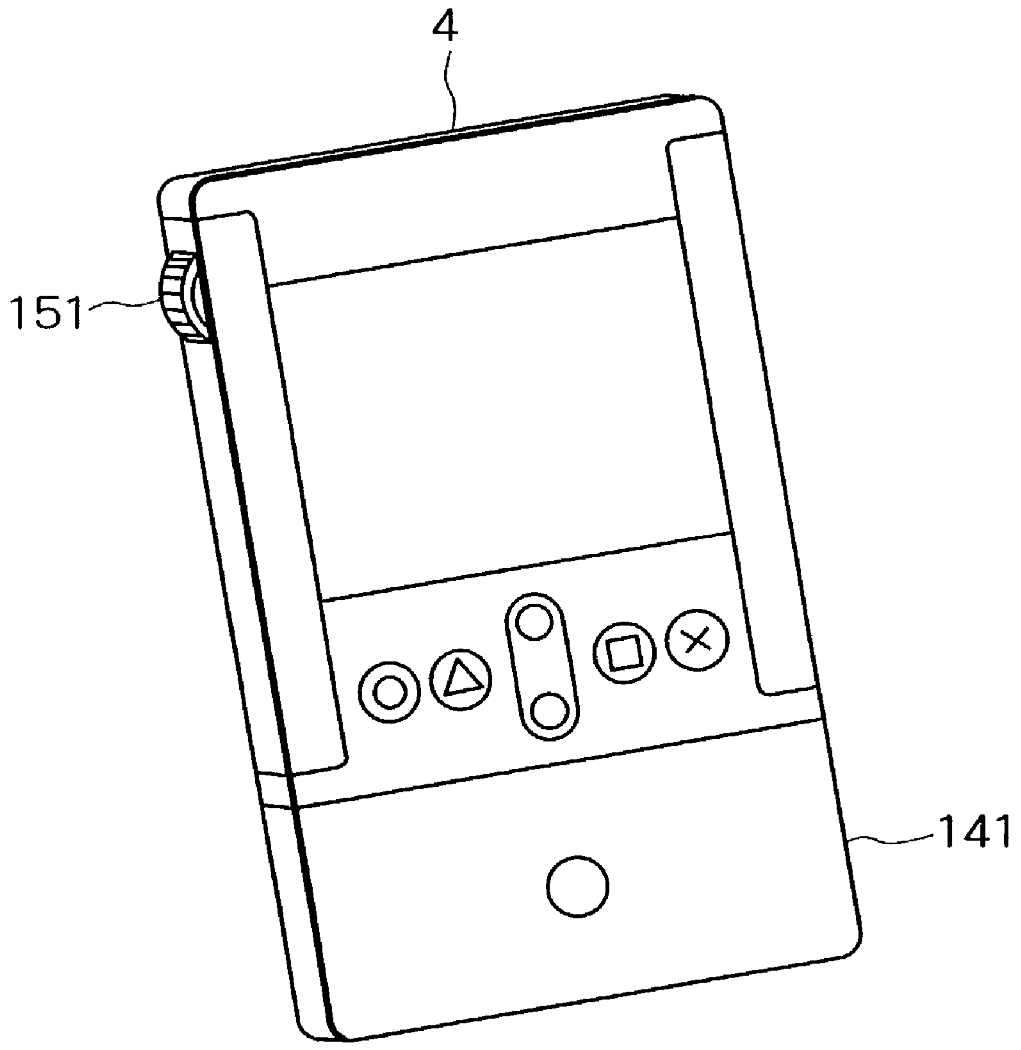
FIG. 8 is a perspective view illustrating an external view of the PDA loaded on a cradle.
Figure 9:
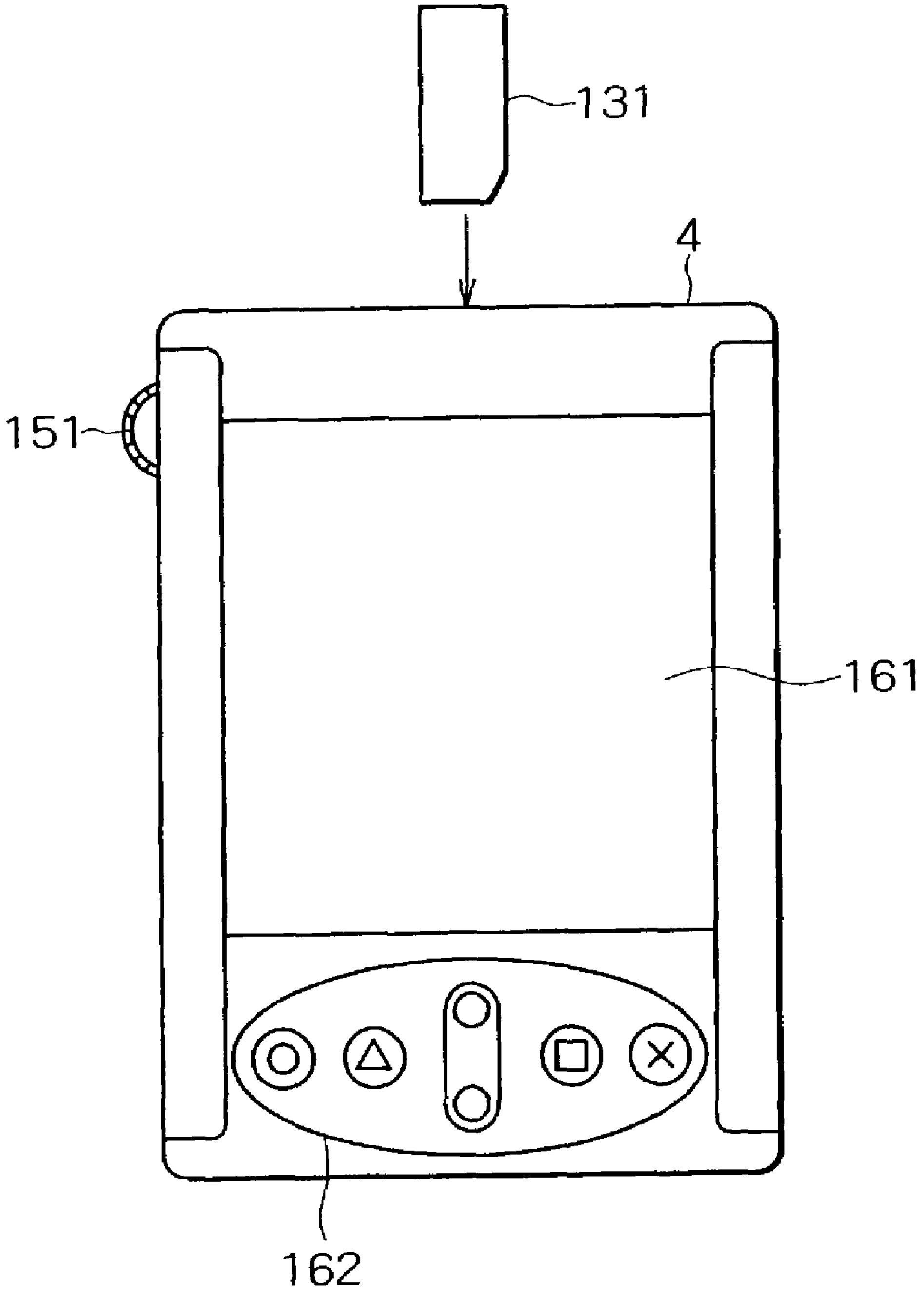
FIG. 9 is a top view illustrating an external view of the PDA.

FIGS. 7 through 9 show external views of the PDA 4. FIG. 7 is a perspective view of the PDA 4 held in the user's hand. FIG. 8 is a perspective view of the PDA 4 loaded in its cradle 141. FIG. 9 is a top view of the PDA 4.

The case of the PDA 4 is formed so that it can be held and operated by a single hand. The PDA 4 is arranged at its top a slot in which the Memory Stick 131 incorporating a semiconductor memory is loaded.

The Memory Stick 131 is one type of flash memory card, which was developed by Sony Corporation, the applicant hereof. With the Memory Stick 131, a flash memory element, which is a kind of EEPROM (Electrically Erasable and Programmable Read Only Memory), is housed in a plastic case 21.5 mm long×50 mm wide, 2.8 mm thick. EEPROM is a nonvolatile memory in which data can be rewritten and eliminated electrically. Various data such as image, voice, and music can be written and read via a 10-pin terminal.

The Memory Stick 131 employs a unique serial protocol which ensures the compatibility of a target device with the changed specifications of the built-in flash memory due to increase in storage capacity. This unique serial protocol realizes high-speed operations of a maximum write rate of 1.5 MB/second and a maximum read rate of 2.45 MB/second. The Memory Stick 131 has an erroneous delete prevention switch for high operational reliability.

As shown in FIG. 8, the PDA 4 is loaded in the cradle so that the bottom surface of the PDA 4 comes in contact with the upper surface of the cradle 141. The PDA 4 is arranged at the bottom thereof with a USB (Universal Serial Bus) port (not shown) for example for connecting the PDA 4 with the cradle 141. The cradle 141 is a docking station for connecting the PDA 4 with the personal computer 2 in a wired manner to update the data stored therein to the latest data (namely, synchronize the data by so-called hot sync).

The PDA 4 also has a display section 161, a keypad 162, and a jog dial 151 for example.

The display section 161 is constituted by a thin display device such as LCD and displays images such as an icon, a thumbnail and a text. The display section 161 is arranged at the upper side thereof with a touchpad. By touching the touchpad with finger or pen, the user can enter predetermined data or predetermined operation commands into the PDA 4.

The keypad 162 is constituted by input keys and so on, from which the user selects icons and thumbnails displayed on the display section 161.

The jog dial 151, when rotated or pushed, enters the selection of an icon or thumbnail displayed on the display section 161.

Figure 10:
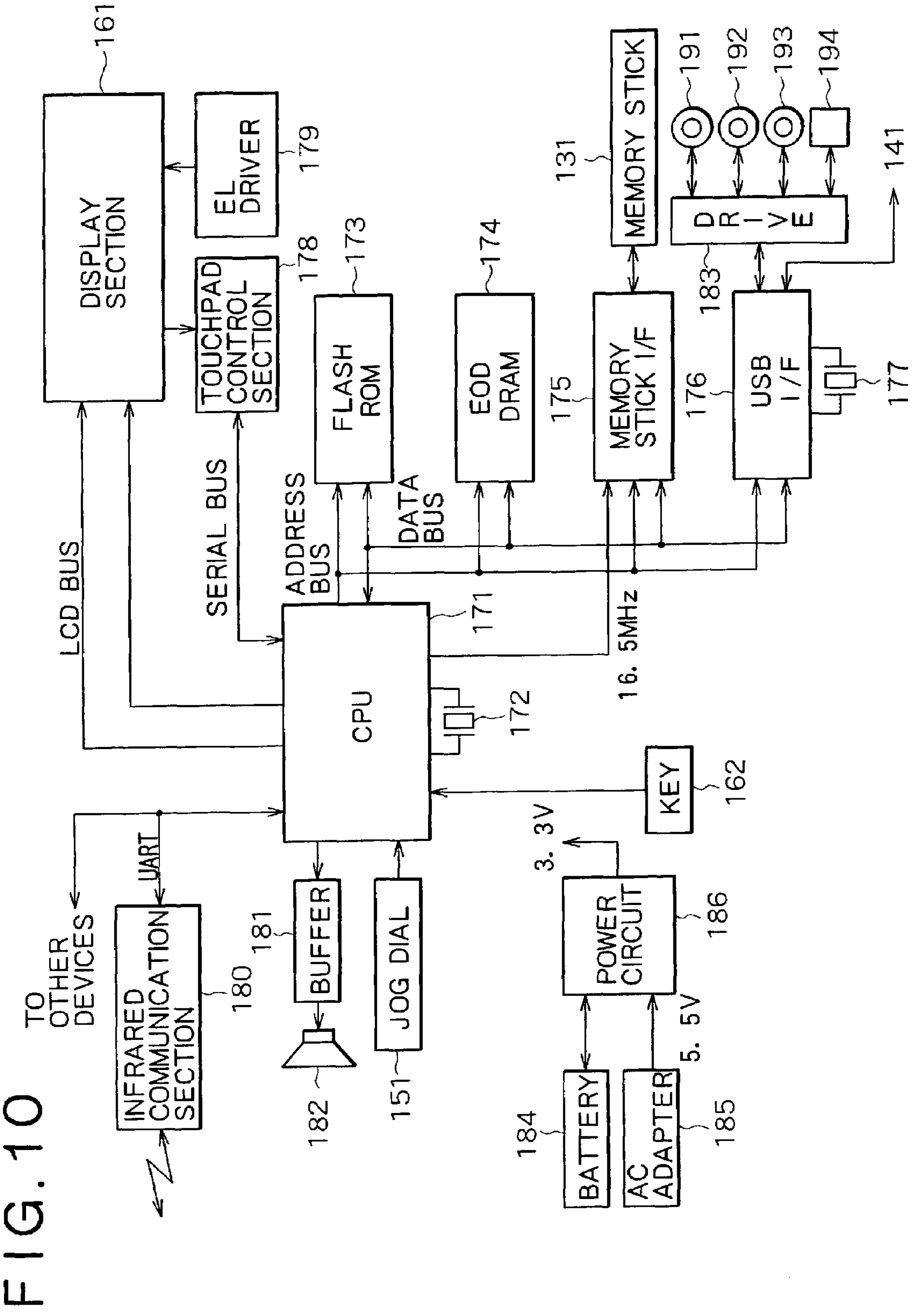
FIG. 10 is a block diagram illustrating an internal configuration of the PDA.

The following describes the internal configuration of the PDA 4 with reference to FIG. 10.

A CPU 171 executes, in synchronization with a clock signal supplied from an oscillator 172, various programs such as the operating system and application programs stored in a flash ROM (Read Only Memory) 173 or an EDO DRAM (Extended Data Out Dynamic Random Access Memory) 174.

The flash ROM 173 is constituted by a flash memory, which is one of EEPROM (Electrically Erasable Programmable Read Only Memory) and, generally, stores the basically fixed data among the programs and computation parameter to be used by the CPU 171. The EDO DRAM 174 stores the programs to be used in the execution of the CPU 171 and the parameters which dynamically change in their execution.

A Memory Stick interface 175 retrieves data from the Memory Stick 131 loaded in the PDA 4 and writes the data supplied from the CPU 171 to the Memory Stick 131.

Therefore, because the PDA 4 is configured so that the 131 can be loaded, the PDA 4 can share data with other electronic devices (for example, the personal computer 2, the camera-mounted digital mobile phone 5, and the mobile music reproducing apparatus 271 to be described later with reference to FIG. 14) through the Memory Stick 131.

The USB interface 176 enters, in synchronization with a clock signal supplied from the oscillator 177, data and programs from a drive 183, which is a connected USB device, and supplies the data supplied from the CPU 171 to the drive 183. The USB interface 176 enters, in synchronization with a clock signal supplied from the oscillator 177, data or programs from the cradle 141, which is a connected USB device, and supplies the data supplied from the CPU 171 to the cradle 141.

The USB interface 176 is also connected to the drive 183. The drive 183 retrieves data or programs from a loaded magnetic disc 191, a loaded optical disc 192, a loaded magneto-optical disc 193, or a loaded semiconductor memory 194 and supplies the retrieved data or programs to the connected CPU 171 or EDO DRAM 174 through the USB interface 176. Also, the drive 183 records the data or programs supplied from the CPU 171 to the loaded magnetic disc 191, the loaded optical disc 192, the loaded magneto-optical disc 193, or the loaded semiconductor memory 194.

The flash ROM 173, the EDO DRAM 174, the Memory Stick interface 175, and the USB interface 176 are connected to the CPU 171 through an address bus and a data bus.

The display section 161 receives data from the CPU 171 through an LCD bus and displays the images, characters or the like corresponding to the received data. The touchpad control section 178, when the touchpad arranged on the top side of the display section 161 is operated, receives from the display section 161 the data corresponding to the operation (for example, the coordinates of the touch) and supplies a signal corresponding to the received data to the CPU 171 through a serial bus.

An EL (Electroluminescence) driver 179 drives an electroluminescence element arranged on the rear of the liquid crystal section of the display section 161 to control the brightness of the display on the display section 161.

An infrared communication section 180 sends data received from the CPU 171 to other devices, not shown, through infrared medium via a UART (Universal Asynchronous Receiver Transmitter) and supplies data received from other devices through infrared medium to the CPU 171. Namely, the PDA 4 can communicate with other devices through the UART.

A speech reproducing section 182 is constituted by a speaker and an audio data decoding circuit for example and decodes the audio data stored beforehand or the audio data received via the Internet 6, reproduces the decoded data, and outputs a speech. For example, the speech reproducing section 182 reproduces the speech data supplied from the CPU 171 via a buffer 181 to output a speech corresponding to the reproduced speech data.

The keypad 162 is constituted by input keys and so on and operated by the user when entering various commands into the CPU 171.

The jog dial 151 supplies the data corresponding to a rotary operation or a pushing operation toward the main body.

The power supply circuit 186 converts a power voltage supplied from a loaded battery 184 or an AC (Alternating Current) adapter 185 into the voltage suitable for the circuits including the CPU 171 through the audio reproducing section 182 and supplies the voltage thereto.

Figure 11:
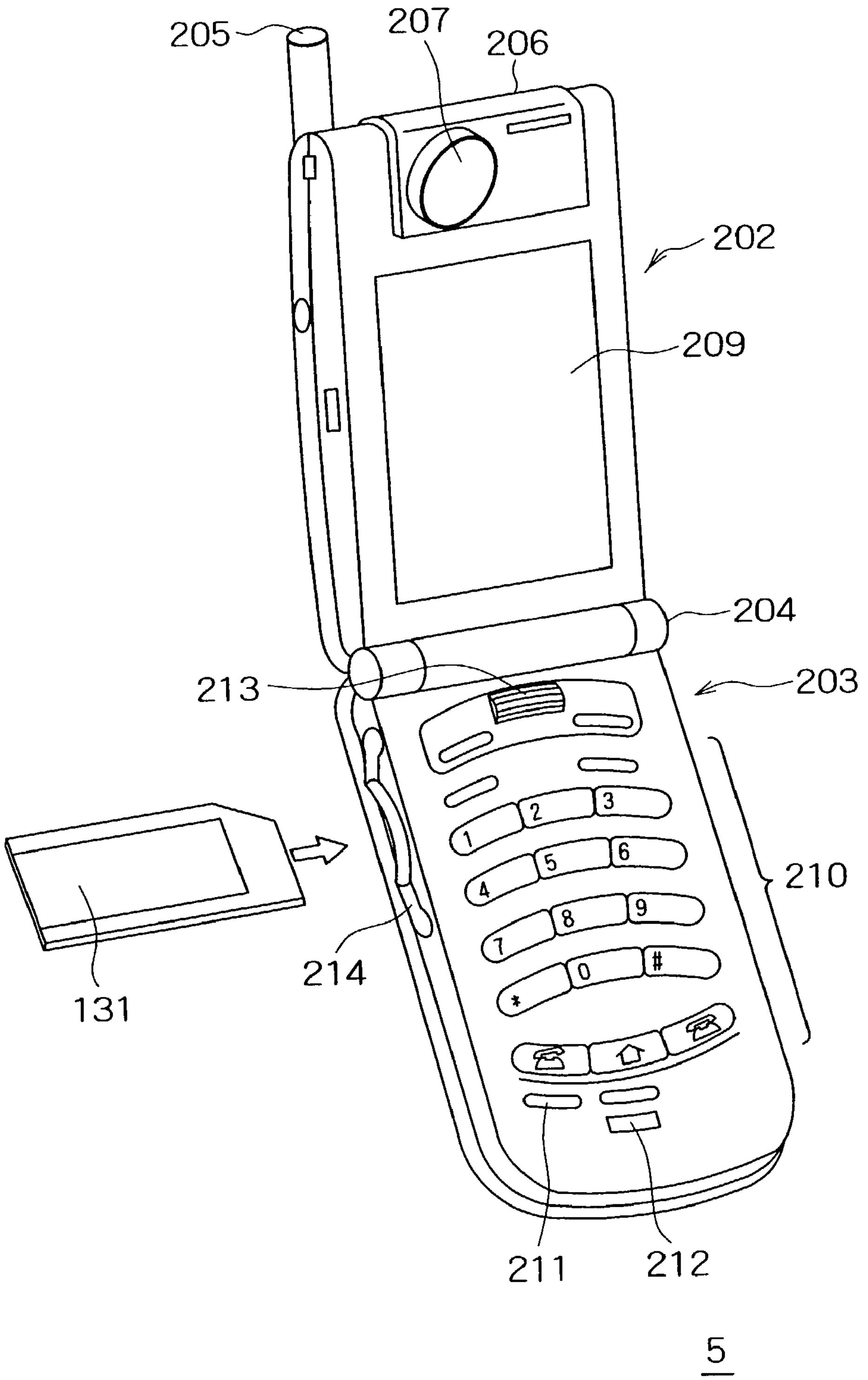
FIG. 11 is an external view of a camera-mounted digital mobile phone.

The following describes the external configuration of the camera-mounted digital mobile phone 5. As shown in FIG. 11, the camera-mounted digital mobile phone 5 is constituted by a display section 202 and a main body 203 which are pivotally fixed to each other with a hinge section 204 at the center thereof.

The display section 202 has an antenna 205 at the upper left side, which is withdrawal or retractable, for transferring operations. The camera-mounted digital mobile phone 5 transmits and receives radio waves to and from the base station 3-1 through 3-4, which are fixed radio stations, via the antenna 205.

Also, the display section 202 has a camera section 206 which is pivotable at the upper center in a range of about 180 degrees. The camera-mounted digital mobile phone 5 images desired objects by means of a CCD camera 207 of the camera section 206.

Figure 12:
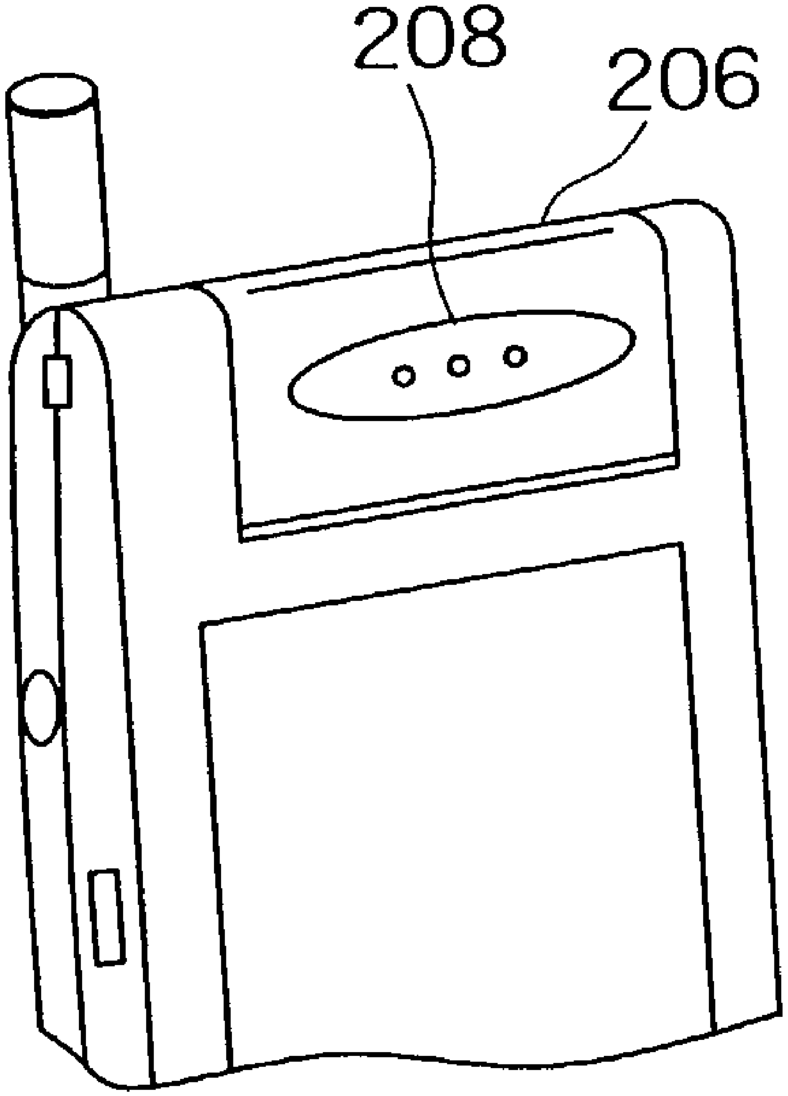
FIG. 12 is an external view illustrating the camera section of the camera-mounted digital mobile phone.

When the camera section 206 is rotated by the user about 180 degrees to be positioned, the displays section 202 is positioned with a speaker 208 arranged at the rear center of the camera section 206 positioned to the front side as shown in FIG. 12. Consequently, the camera-mounted digital mobile phone 5 is switched to the normal telephone-call state.

In addition, a liquid crystal display 209 is arranged on the front side of the display section 202. The liquid crystal display 209 displays the contents of electronic mail, a simplified home page, and the images taken by the CCD camera 207 of the camera section 206 in addition to a radio wave receiving state, a remaining battery power, the name and telephone numbers of the mates of communication registered as a telephone directory, and a mail sending log for example.

On the other hand, the main body 203 is arranged on the one surface thereof with numeric keys "0" through "9," a call key, a redial key, an end/power key, a clear key, an electronic mail key, and other operator keys 210. Various commands corresponding to the operations done on the operator keys 210 are entered in the camera-mounted digital mobile phone 5.

Below the operator keys 210 of the main body 203, a voice-memorandum button 211 and a microphone 212 are arranged. When the voice-memorandum button 211 is operated the camera-mounted digital mobile phone 5 records the voice of the mate of communication during talk. The camera-mounted digital mobile phone 5 picks up the voice of the user during talk through the microphone 212.

In addition, a rotary jog dial 213 is arranged above the operator keys 210 of the main body 203 such that the jog dial 213 slightly projects from the surface of the main body 203. In accordance with a rotary operation of the jog dial 213, the camera-mounted digital mobile phone 5 scrolls a telephone directory or electronic mail displayed on the liquid crystal display 209, turns the pages of a simplified home page, feeds images, and performs various other operations.

For example, when a desired telephone number is selected by the user from a plurality of telephone numbers in a telephone directory displayed on the liquid crystal display 209 in accordance with the rotary operation done by the user on the jog dial 213 and the jog dial 213 is pushed toward the main body 203 by the user, the main body 203 enters the selected telephone number and automatically originate a call for the entered telephone number.

It should be noted that the main body 203 is loaded with a battery pack, not shown, on the rear side thereof. When the end/power key is turned on, the power is supplied from this battery pack to each circuit to make the camera-mounted digital mobile phone 5 ready for operation.

The main body 203 is arranged on the upper left side thereof with a Memory Stick slot 214 for loading a detachable Memory Stick 131. When the voice-memorandum button 211 is pressed, the camera-mounted digital mobile phone 5 records the voice of the mate of communication during talk into the Memory Stick 131. In accordance with an operation done by the user, the camera-mounted digital mobile phone 5 records electronic mail, a simplified home page, an image captured by the CCD camera 207, or the speech data generated by the processing to be described later into the loaded Memory Stick 131.

Therefore, because the camera-mounted digital mobile phone 5 is configured so as to load the Memory Stick 131, camera-mounted digital mobile phone 5 can share data with other electronic devices (for example, the personal computer 2, the PDA 4, and the mobile music reproducing apparatus to be described later) via the Memory Stick 131.

Figure 13:
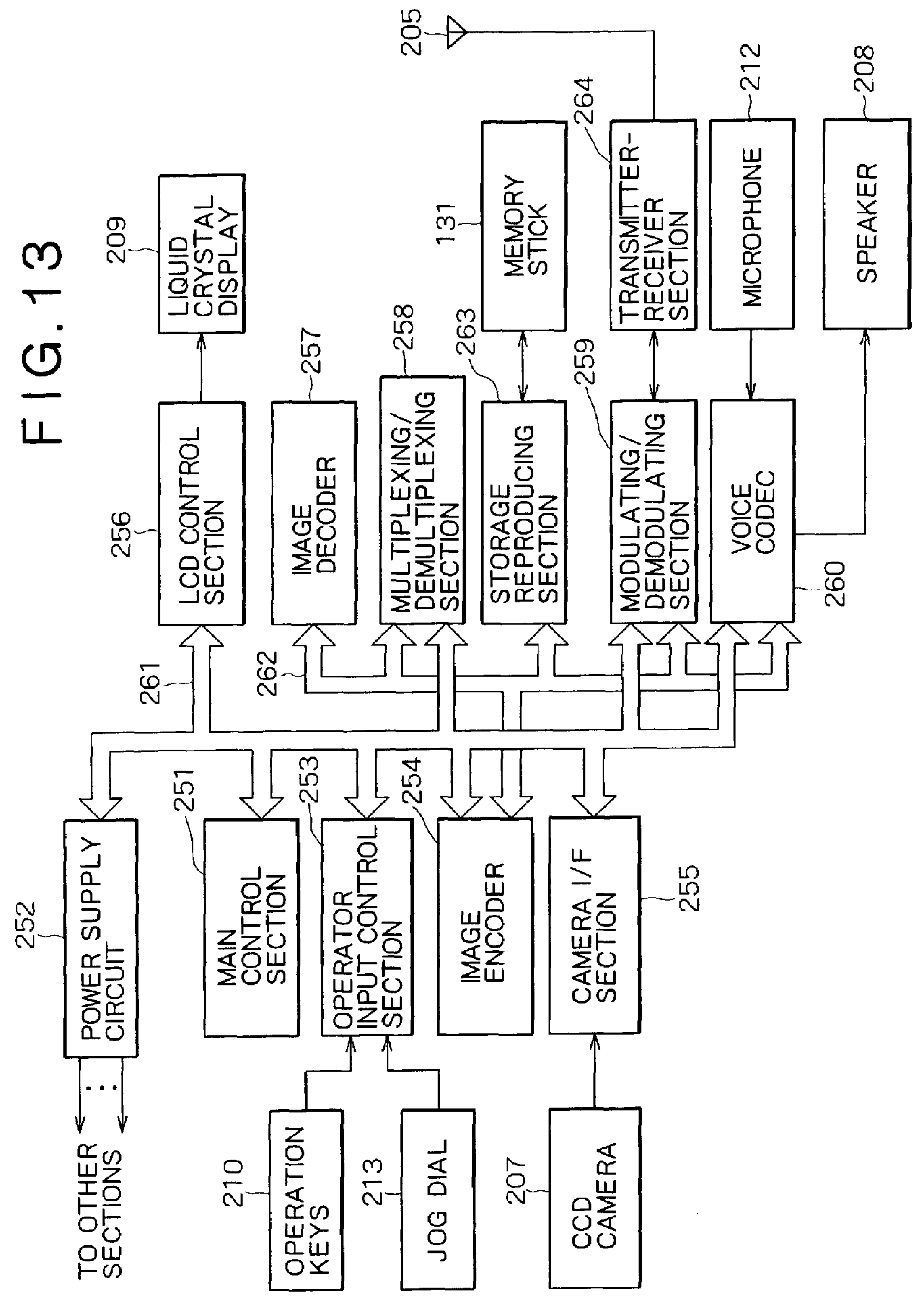
FIG. 13 is a block diagram illustrating a configuration of the camera-mounted digital mobile phone.

FIG. 13 shows a block diagram illustrating an internal configuration of the camera-mounted digital mobile phone 5.

As shown in FIG. 13, the camera-mounted digital mobile phone 5 has a main control section 251 for totally controlling the components of the display section 202 and the main body 203, in which a power supply circuit 252, an operator input control section 253, an image encoder 254, a camera I/F (interface) section 255, an LCD control section 256, a multiplexing/demultilpexing section 258, a modulating/demodulating section 259, and a voice codec 260 are interconnected with each other via a main bus 261, and the image encoder 254, the image decoder 257, the multiplexing/demultiplexing section 258, a storage reproducing section 263, the modulating/demodulating section 259, and the voice codec 260 are interconnected with each other via a synchronous bus 262.

The power supply circuit 252, when the end/power key is turned on by the user, supplies the power from the battery pack to each circuit to make the camera-mounted digital mobile phone 5 ready for operation.

Under the control of the main control section 251 composed of a CPU, a ROM, a RAM, and so on, the camera-mounted digital mobile phone 5 converts, in the telephone-call mode, a voice signal picked up by the microphone 212 into digital speech data through the codec 260. Then, the camera-mounted digital mobile phone 5 performs spread spectrum processing on the digital speech data through the modulating/demodulating section 259, performs digital-to-analog conversion and frequency conversion on the resultant voice signal through the transmitter/receiver section 264, and sends the resultant voice signal through the antenna 205.

In the phone-call mode, the camera-mounted digital mobile phone 5 amplifies a signal received at the antenna 205 through a transmitter/receiver section 264 to perform frequency conversion and analog-to-digital conversion on the received signal, performs inverse-spread spectrum processing on the resultant signal through the modulating/demodulating section 259, and converts the resultant signal into an analog voice signal through the voice codec 260. Then, the camera-mounted digital mobile phone 5 outputs a voice corresponding to this analog voice signal to the speaker 208.

In addition, when sending electronic mail in the data communication mode, the camera-mounted digital mobile phone 5 sends the text data of the electronic mail entered from the operator keys 210 and the jog dial 213 to the main control section 251 via the operator input control section 253.

The main control section 251 performs spread spectrum processing on the text data through the modulating/demodulating section 259 and performs digital-to-analog conversion and frequency conversion on the resultant signal through the transmitter/receiver section 264, and sends the resultant signal to the base station 3 via the antenna 205.

On the other hand, when receiving electronic mail in the data communication mode, the camera-mounted digital mobile phone 5 performs inverse-spread spectrum processing on a signal received from the base station 3 via the antenna 205 through the modulating/demodulating section 259 to restore the original text data and outputs the original data to the LCD control section 256. The LCD control section 256 controls the liquid crystal display 209 to display the received electronic mail.

In the camera-mounted digital mobile phone 5, the electronic mail received in accordance with the operation done by the user or the electronic mail converted into speech data by the processing to be described later may be recorded in the Memory Stick 131 via the storage reproducing section 263.

When sending image data in the data communication mode, the camera-mounted digital mobile phone 5 supplies the image data captured by the CCD camera 207 to the image encoder 254 via a camera interface section 255.

When not sending image data, the camera-mounted digital mobile phone 5 may directly display the image data captured by the CCD camera 207 onto the liquid crystal display 209 via the camera interface section 255 and the LCD control section 256.

The image encoder 254 converts the image data supplied from the CCD camera 207 into encoded image data by compression by predetermined encoding algorithm such as MPEG2 (Moving Picture Experts Group 2) or MPEG4 and sends the compressed image data to the multiplexing/demultiplexing section 258.

At the same time, the camera-mounted digital mobile phone 5 sends a voice signal picked up by the microphone 212 during imaging by the CCD camera 207 to the multiplexing/demultiplexing section 258 as digital speech data via the voice codec 260.

The multiplexing/demultiplexing section 258 multiplexes the encoded image data supplied from the image encoder 254 with the speech data supplied from the voice codec 260 by a predetermined algorithm, performs spread spectrum processing on the resultant multiplexed data through the modulating/demodulating section 259, performs digital-to-analog conversion and frequency conversion through the transmitter/receiver section 264, and transmits the resultant data via the antenna 205.

On the other hand, when receiving moving image file data linked to a simplified home page for example in the data communication mode, the camera-mounted digital mobile phone 5 performs inverse-spread spectrum processing on a signal received from the base station by the modulating/demodulating section 259 via the antenna 205 and sends the resultant multiplexed data to the multiplexing/demultiplexing section 258.

The multiplexing/demultiplexing section 258 demultiplexes the multiplexed data into encoded image data and speech data and supplies the encoded image data to the image decoder 257 and the speech data to the voice coded 260 via the synchronous bus 262.

The image decoder 257 decodes encoded image data by a decoding algorithm corresponding to a predetermined encoding algorithm such as MPEG2 or MPEG4 to generate reproduction moving image data and supplies the generated data to the liquid crystal display 209 via the LCD control section 256 to display the data. Consequently, the camera-mounted digital mobile phone 5 displays the moving image data included in the moving image file linked to a simplified home page for example.

At the same time, the voice codec 260 converts the speech data into an analog voice signal and supplies this signal to the speaker 208 and the data is outputted from the speaker. Consequently, the camera-mounted digital mobile phone 5 reproduces the speech data included in the moving picture file linked to a simplified home page for example.

In the case, as with the case of electronic mail, the camera-mounted digital mobile phone 5 may record the data such as a received simplified home page or the text data of a simplified home page or the like converted into speech data by the processing to be described later into the Memory Stick 131 through the storage reproducing section 263 by the operation of the user.

Figure 14:
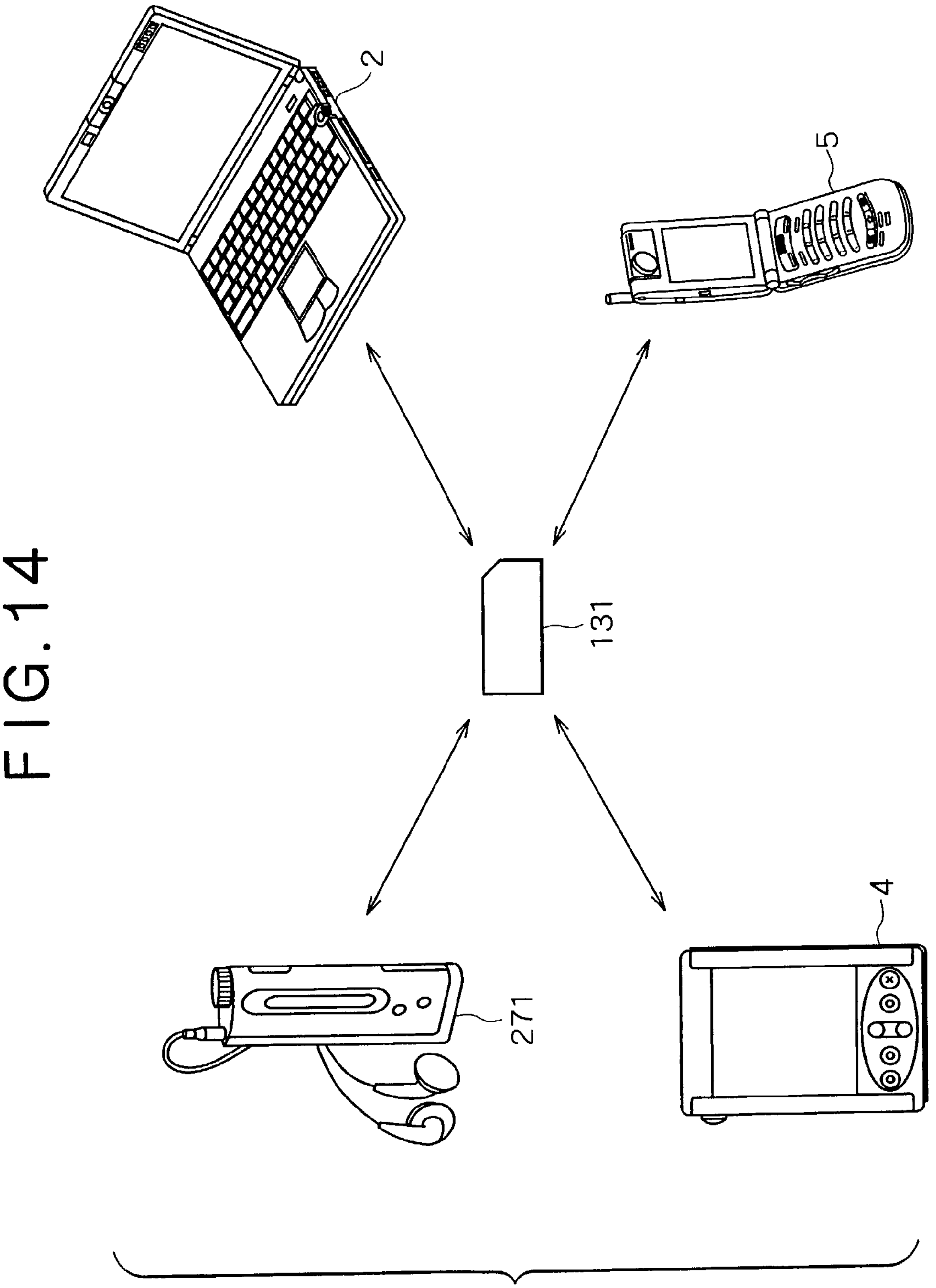
FIG. 14 is a schematic diagram illustrating information sharing by use of a Memory Stick.

Namely, as shown in FIG. 14, information sharing is realized by means of the Memory Stick 131 among the personal computer 2, the PDA 4, the camera-mounted digital mobile phone 5, and mobile music reproducing apparatus 271 in which the Memory Stick 131 is loadable and speech data recorded in Memory Stick 131 can be reproduced. For example, the data generated by the personal computer 2, the PDA 4, or the camera-mounted digital mobile phone 5 may be recorded to the Memory Stick 131 for reproduction by the mobile music reproducing apparatus 271.

With reference to FIG. 14, the information sharing by means of the Memory Stick 131 is described. It will be apparent that information sharing may be realized if the personal computer 2, the PDA 4, the camera-mounted digital mobile phone 5, and the mobile music reproducing apparatus 271 are interconnected in a wired or wireless manner for data transfer.

Figure 15:
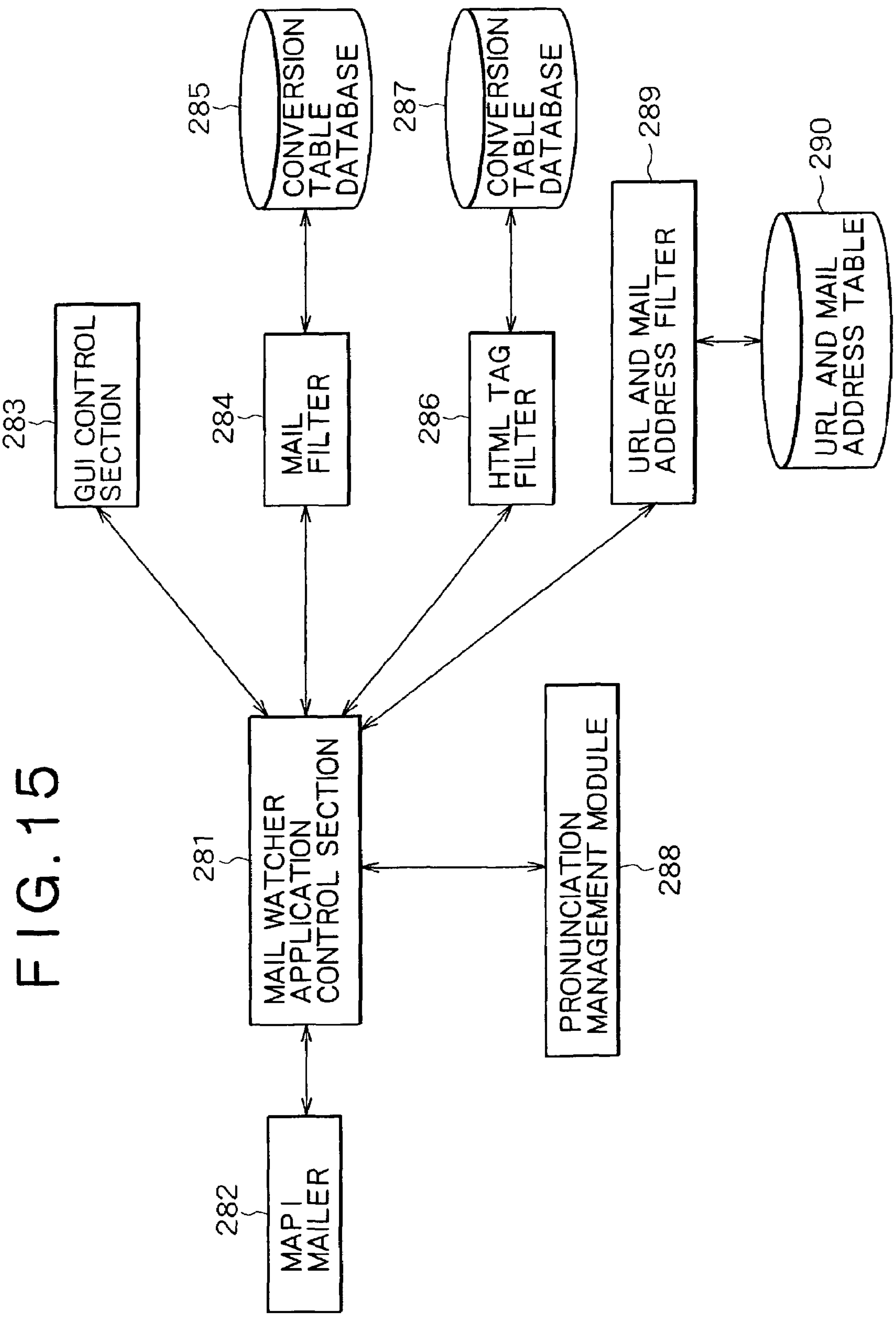
FIG. 15 is a block diagram illustrating a functional relationship when a mail watcher application is started.

FIG. 15 shows a functional block diagram illustrating the processing to be performed in the personal computer 2 when the mail watcher application among the application programs 67H recorded to the HDD 67 is loaded into the RAM 54 for execution by the CPU 51 described with reference to FIG. 6.

A mail watcher application control section 281 reads electronic mail data from a MAPI mailer 282 (corresponding to the electronic mail program 67A in FIG. 6) based on MAPI (Messaging Application Program Interface), which is a standard system interface for electronic messaging application standardized by Microsoft Corporation as one of WOSA (Windows® Open System Architecture) and performs various processing operations on the basis of the user settings supplied from a GUI (Graphical User Interface) control section 283.

It should be noted that, when the mail watcher application control section 281 starts executing the processing, the MAPI mailer 282 may not have been started beforehand (namely, may not have been loaded into the RAM 54 and executed by the CPU 51).

In accordance with control by the mail watcher application control section 281, the GUI control section 283 controls the GUI display of the dialog boxes for performing the various settings of the mail watcher application to be described later and the display windows and, at the same time, generates signals indicative of the contents of the operator input executed for the displayed GUI, supplying the generated signals to the mail watcher application control section 281.

A mail filter 284 filters the electronic mail of text format supplied from the mail watcher application control section 281 on the basis of a conversion table stored in a conversion table database 285.

The conversion table database 285 stores such symbols to be added, when returning received electronic mail or transferring electronic mail, to indent portions in order to indicate quotations in the body of electronic mail as ">", "|", and ":" for example.

Figure 16:
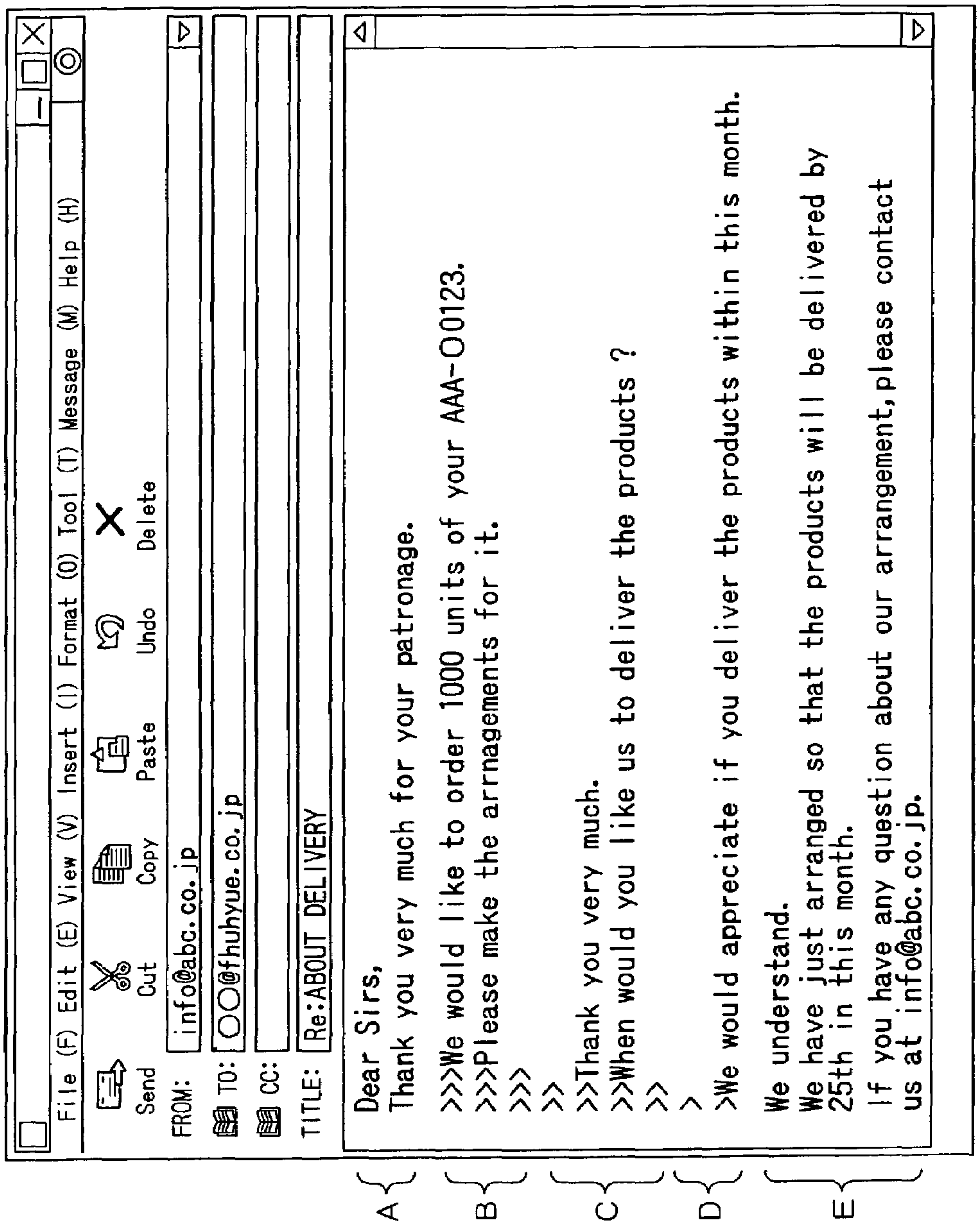
FIG. 16 is a diagram illustrating electronic mail of text format.

On the basis of the symbols to be added to each line of supplied electronic mail and the number of symbols, the mail filter 284 classifies the received mail body by marking for example into portions written by the same person. For example, if an electronic mail message shown in FIG. 16 is supplied, the mail filter 284 divides the body into text A which is the first portion (in this example, a portion written by the sender) of the electronic mail body, text B (a quoted sentence) different from text A, text C (the number of quotations is different from that of text B) different from text B, text D (the number of quotations is different from that of text C) different from text C, and text E (in this example, a portion written by the sender) different from text D.

An HTML (Hyper Text Markup Language) tag filter 286 filters the electronic mail written in HTML supplied from the mail watcher application control section 281 on the basis of the conversion table stored in the conversion table database 287.

Figure 17:
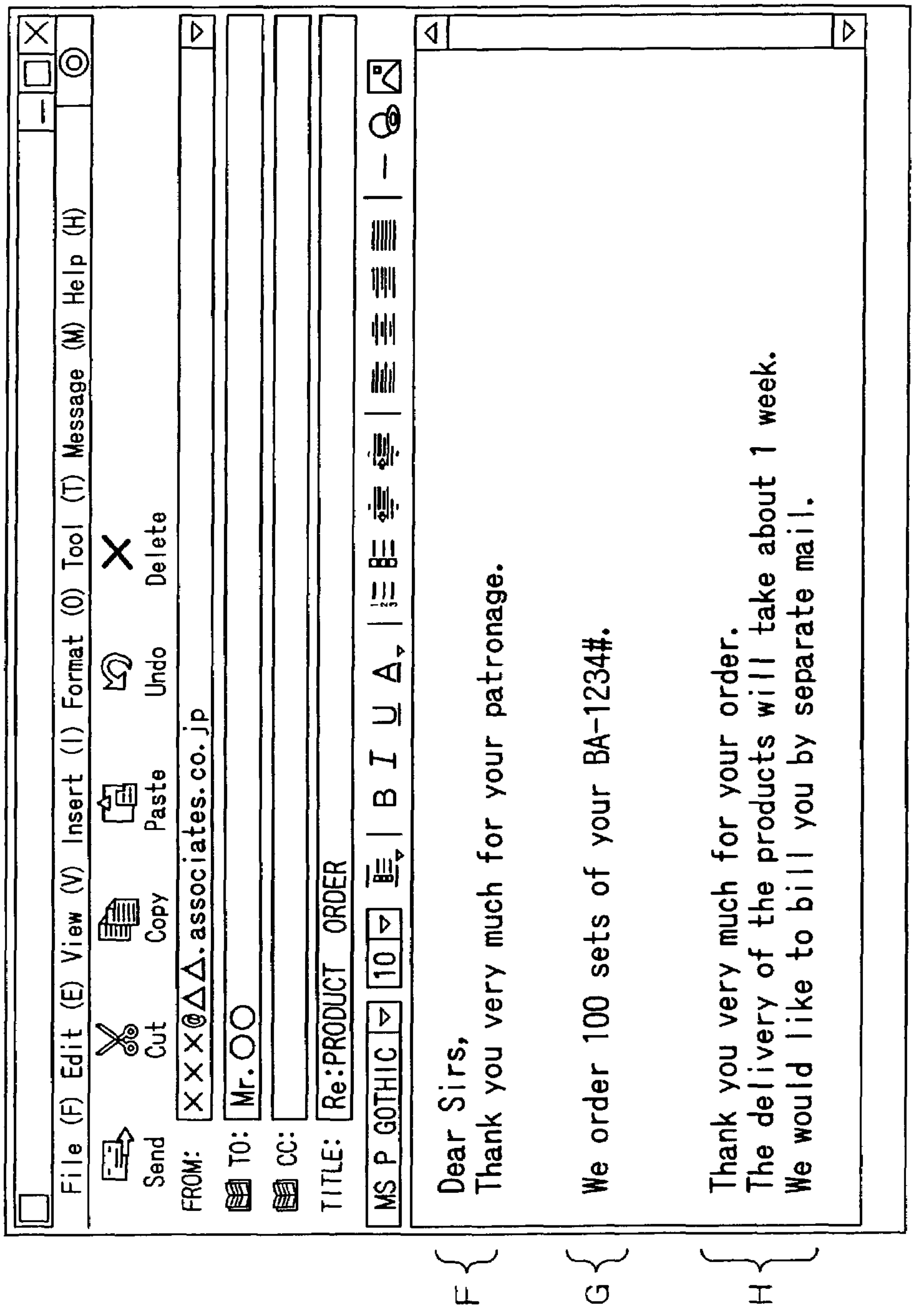
FIG. 17 is a diagram illustrating electronic mail of HTML format.

FIG. 17 shows an example of electronic mail written in HTML. FIG. 18 shows the source of the electronic mail written in HTML shown in FIG. 17. Unlike electronic mail written in text, electronic mail written in HTML may be modified in various manners; for example, change of background colors, use of image data on background, and setting character fonts like coloring fonts to be highlighted, enlarging character points, bolding characters, and italicizing character, for example.

In the electronic mail source shown in FIG. 18, the portion enclosed by <HTML> and </HTML> indicates the entirety of an electronic mail message written in HTML. The portion (indicated by I in the figure) enclosed by <HEAD> and </HEAD> indicates the header.

The portion enclosed by <BODY bgColor=#ffffff> and </BODY> is the body of the electronic mail message. bgcolor=#ffffff indicates the background color of the body. In the body, the portion enclosed by <DIV> and </DIV> indicates one line of the body. In the body, the portion starting with <BLOCKQUOTE dir=ltr . . . 0px"> and subsequently indented with <DIV> (the portion indicated by K in the figure) indicates a quoted sentence, namely the portion indicated by G in FIG. 17. <BLOCKQUOTE dir=ltr . . . 0px"> indicates a HTML tag for displaying a quotation (straight line) added to the indented portion in the portion indicated by G in FIG. 17.

The HTML tag filter 286 refers to HTML tags (the descriptions enclosed by < >) and, on the basis of the conversion table stored in the conversion table database 287, may make a division, for example, between body and header and further between quoted sentence and non-quoted portion (including a portion in which quoted sentences overlap), divide the quoted sentence and the non-quoted portion into lines, and add predetermined information for example for making distinction between the quoted sentence and the non-quoted portion (including a portion in which quoted sentences overlap), thereby executing the processing of converting these quoted and non-quoted portions into the data which can be processed by a pronunciation management module 288. For the conversion processing, another method may be used by changing the conversion table stored in the conversion table database 287.

In the above-mentioned example, electronic mail is written in text or HTML. It will be apparent that the above-mentioned configuration may also be applied to electronic mail which is written in other markup languages than HTML by preparing a corresponding conversion table in the conversion table database 287.

The pronunciation management module 288 may convert entered text data into speech data, reproduce the speech data, and record the speech data to external devices, of which details will be described later with reference to FIG. 23.

A URL and mail address filter 289 refers to the data registered in a URL and mail address table 290 and, if a matching URL or a matching mail address is found in the registered data, then converts the matching URL or mail address into a registered name.

FIG. 19 shows the data registered in the URL and mail address table 290. FIG. 19A shows a URL table. The URL table lists URLs and the names corresponding thereto. FIG. 19B shows a mail address table. The mail address table lists mail addresses and the names corresponding thereto.

As shown in FIG. 19C for example, the URL table may list the URLs and their names by classifying by protocols such as "http" and "ftp." Registering the URLs and their names in a classified manner allows shortening of the time necessary for the text data matching processing, which is described later (URL processing 2 also to be described later).

With reference to FIGS. 19A to 19C, the description is made with both the URLs and the mail addresses registered in the single URL and mail address table 290. It will be apparent that the URLs and the mail addresses may be registered in different tables.

Figure 20A:
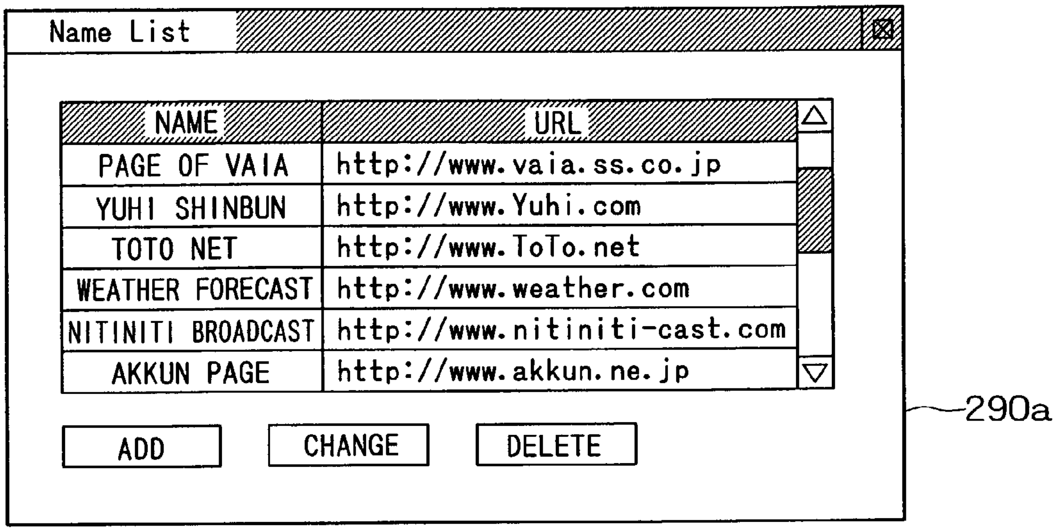
FIGS. 20A, 20B and 20C are diagrams illustrating GUI for registering data into a URL and mail address table.

The data registered in the URL and mail address table 290 described with reference to FIGS. 19A to 19C may be registered, changed, or deleted by the user as required by displaying a name list window 290*a* shown in FIG. 20A by the processing of GUI control section 283.

Figure 20B:
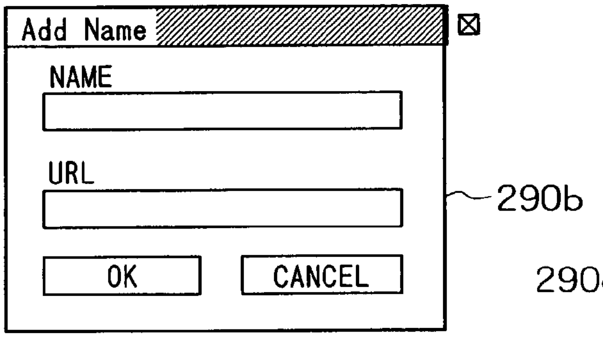

For example, to newly register URLs, the user operates the add button in the name list window 290*a* to display a name adding window 290*b* shown in FIG. 20B, enters the name and URL in the corresponding text box, and presses the OK button. To change the contents of a registered URL, the user operates the change button in the name list window 290*a* to display a change window 290*c* shown in FIG. 20C, changes the currently registered name and URL shown in the text box beforehand, and presses the OK button. To delete a registered URL, the user selects the desired URL in the name list window 290*a* and operates the delete button.

In the above-mentioned example, the registration of URLs has been described. This processing holds the same with the registration of names of the mail addresses.

Figure 21:
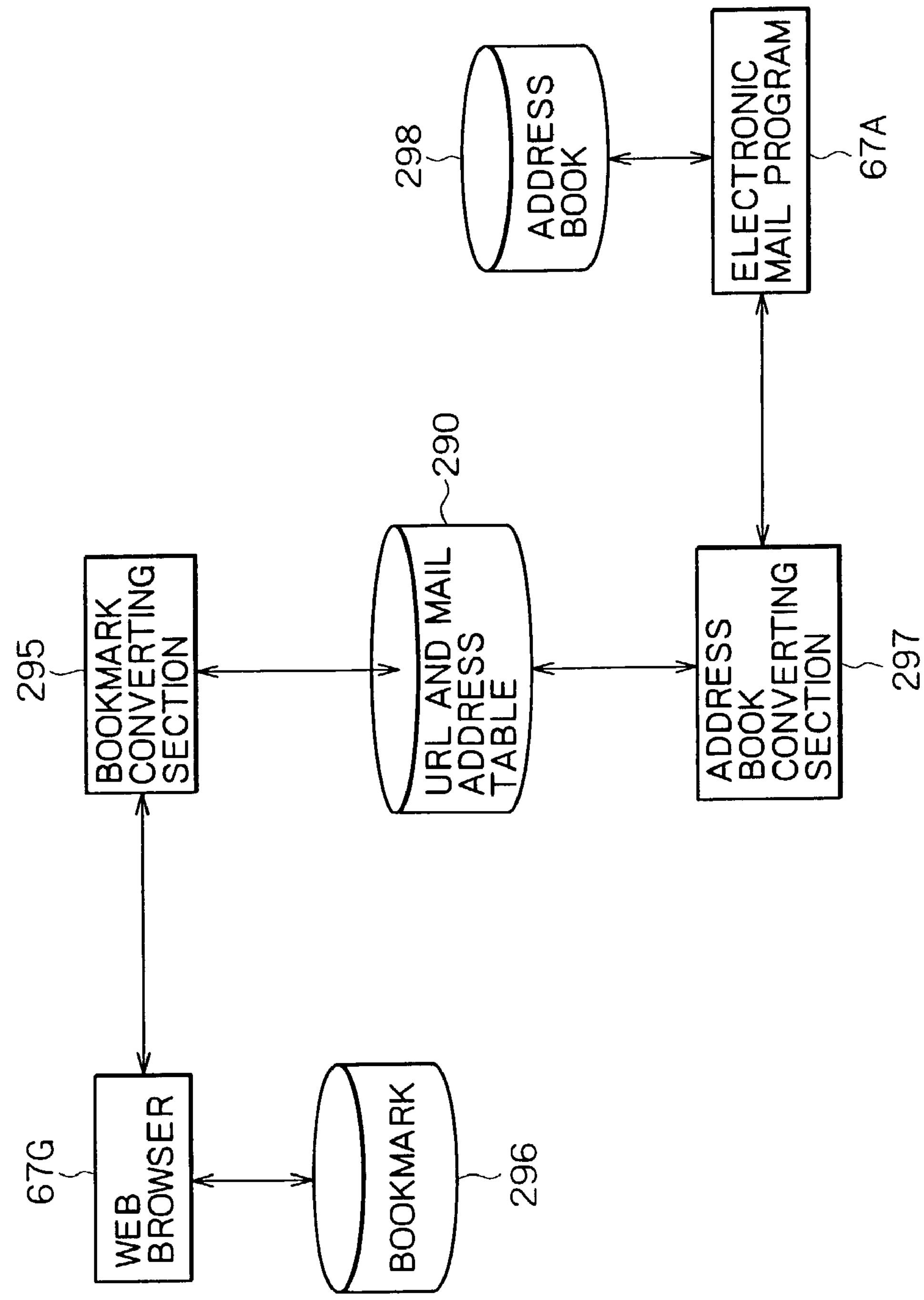
FIG. 21 is a block diagram illustrating functions for automatically registering data into a URL and mail address table.

Also, the registration of URLs and mail addresses may be automatically performed by use of the URLs registered in an application for browsing Web pages and the display names of these URLs or by use of electronic mail addresses registered in an application for transferring electronic mail and the display names of these mail addresses. FIG. 21 is a functional block diagram for describing the automatic registration of URLs and mail addresses.

A Web browser 67G outputs a file written with the user-registered URLs and their registration names from a bookmark 296 to a bookmark converting section 295.

FIG. 22 shows an example of a file indicative of the URLs registered as "favorites" when Internet Explorer (trademark) of Microsoft Corporation is used as the Web browser 67G. The bookmark converting section 295 reads from the entered "favorites" file the URLs registered as favorites and their registration names (in the example of FIG. 22, http://www.eeeclopedia.com/ and "Electronic Encyclopedia," http://www.*.com and "JITEN," and http://www.ss.net.or.jp// . . . and "Marine Dictionary." The bookmark converting section 295 registers the registration names corresponding to the URLs as their names into the URL and mail address table 290**.

The electronic mail program 67A outputs the electronic mail addresses registered in an address book 298 and their registration names to an address book converting section 297. The address book converting section 297 registers the registration names corresponding to the electronic mail addresses into the URL and mail address table 290 as the names for these electronic mail addresses.

Figure 20C:
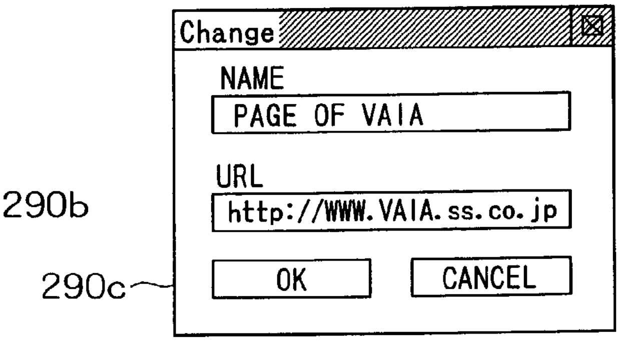

Thus, the contents of the automatically registered URLs or electronic mail addresses and their registration names may be changed manually by the user by use of the change window 290*c* described with reference to FIG. 20C.

Figure 23:
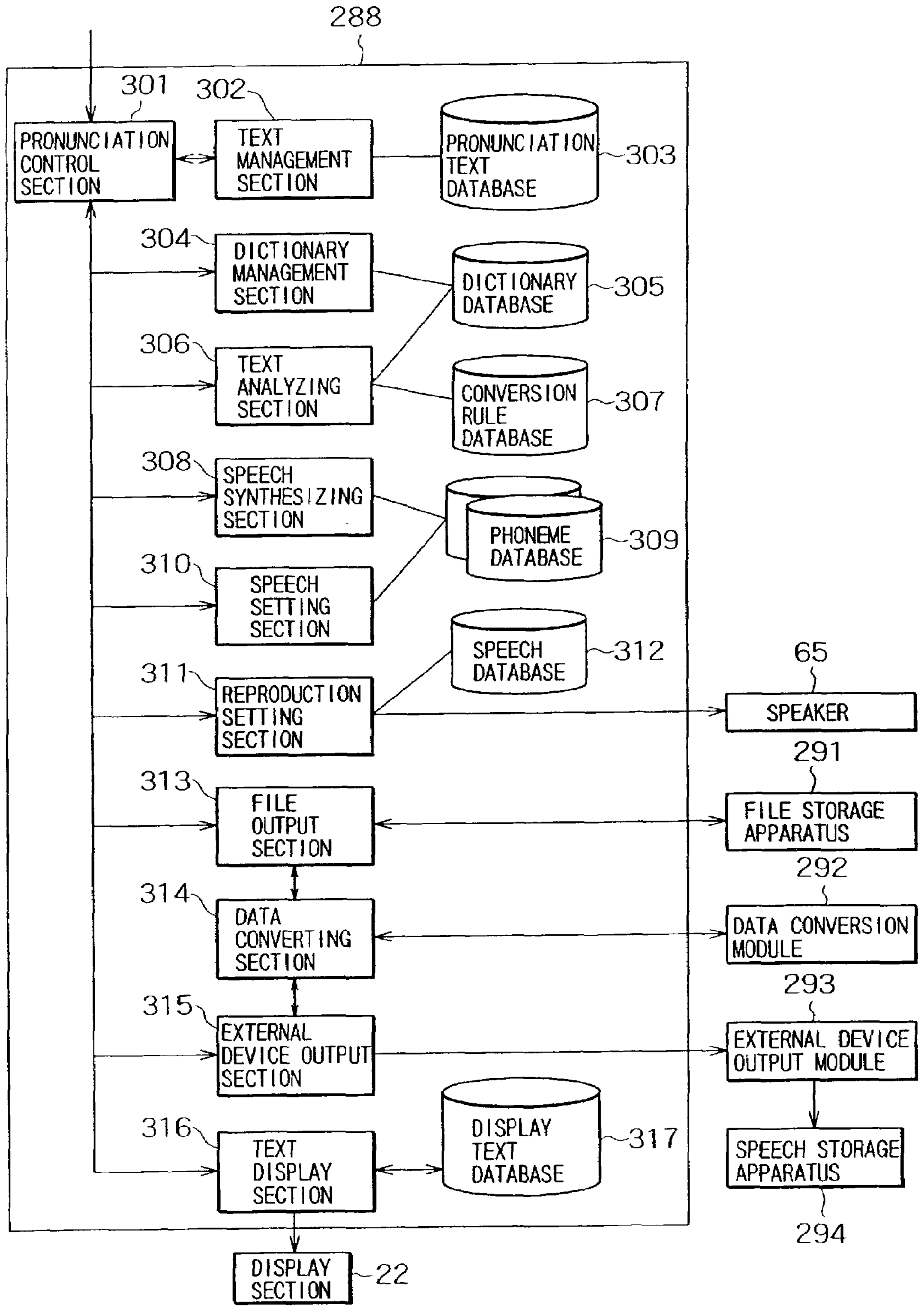
FIG. 23 is a detail block diagrams illustrating the functionality of a pronunciation management module shown in FIG. 15.

FIG. 23 is a functional block diagram illustrating the details of the pronunciation management module 288.

A pronunciation control section 301 controls the entire pronunciation management module 288 to supply inputted various signals and data to associated sections and execute predetermined processing.

A text management section 302 registers the text data for pronunciation supplied from the pronunciation control section 301 into a pronunciation text database 303 and reads the text data corresponding to an electronic mail message specified for pronunciation to output the text data to the pronunciation control section 301.

A dictionary management section 304 manages the dictionary data registered in a dictionary database 305 in accordance with the inputting of registration data of a user dictionary set by the user and the commands for updating or deleting dictionaries by use of the processing to be described later.

A text analyzing section 306 receives the input of the text data for an electronic mail message specified for pronunciation read from the pronunciation text database 303 by the pronunciation control section 301 through the text management section 302, refers to the dictionary database 305 and a conversion rule database 307, analyzes the text into words, generates meter information (or so-called pronunciation-symbolic tone information), and outputs the generated meter information to a speech synthesizing section 308. The conversion rule database 307 stores the rules for generating meter information.

On the basis of the meter information supplied from the text analyzing section 306, the speech synthesizing section 308 refers to a phoneme database 309 to generate synthetic speech data (by linking the supplied meter information to provide synthetic speech data). The phoneme database 309 may be prepared in plurality, in which phonemes are prepared for the prepared phoneme data and the phoneme data to be generated by the processing to be described later. The speech synthesizing section 308 selects user-specified phonemes to generate synthetic speech data.

A speech setting section 310 receives the information indicative of the speed and pitch of a voice signal set by the user at the processing to be described later and supplied from the pronunciation control section 301 and changes the phoneme data stored in the phoneme database 309 as required.

A reproduction control section 311 records the generated speech data to the speech database 312 and, if a command for speech data reproduction comes from the pronunciation control section 301, reads the corresponding speech data from the speech database 312 and outputs the speech data to the speaker 65 for sounding. The format of the speech data recorded in the speech database 312 is PCM (Pulse Code Modulation) for example and may be different from a format (for example, WAVE, ATRAC (Advanced Transform Acoustic Coding) 3, or ADPCM (Adaptive Differential Pulse Code Modulation) for use in the recording to an internal recording section (for example, the HDD 67), external devices, or external recording medium.

A file output section 313 receives a control signal for recording speech data to a file recording device 291 (for example, the HDD 67) in the apparatus and speech data from the speech database 312 via the reproduction control section 311, converts the data format in the data converting section 314 as required (from PCM data into ADPCM data for example), adds a header to the speech data, performs frequency change (for example, from 22 KHz to 11 KHz or 16 KHz), and outputs the resultant speech data to the file storage device 291 for recording.

The external device output section 315 receives a control signal for outputting speech data to an external device (a recording device or a recording medium) and the speech data from the speech database 312 via the reproduction control section 311, converts the data format as required (from PCM data to ADPCM data for example), adds a header to the speech data, performs frequency change (from 22 KHz to 11 KHz or 16 KHz for example), and outputs the resultant speech data to an external device output module.

A data converting section 314 receives data from the file output section 313 or the external device output section 315, converts the received data from PCM to ADPCM for example and, if the format after conversion is ATRAC3 for example and the conversion can be made from PCM to ATRAC3 by the data conversion module 292 outside the pronunciation management module 288, outputs the data to be converted to a data conversion module 292 and, after the conversion processing, receives the converted data.

If, in the case of conversion from the data of PCM format into that of ATRAC3 for example, the speech data recorded to the speech database 312 need to be converted into a data format which the data converting section 314 cannot covert, the data conversion module 292 receives speech data from the data converting section 314, converts the received speech data into the corresponding format, and outputs the converted data to the data converting section 314.

An external device output module 293 outputs speech data to an external device connected to the personal computer 2 via the USB interface 68 or the PC card slot interface 111 for example and execute a processing to record the speech data to a speech storage apparatus 294, that is, a loaded recording medium such as the Memory Stick 131, a memory internal to an external device such as the PDA 4, or a recording medium loaded on an external device.

The processing to be executed by the data conversion module 292 and the external device output module 293 may also be realized by such application software for executing music data conversion and data management as OpenMG (trademark) developed by Sony Corporation, the applicant hereof.

As long as speech data can be recorded, the speech storage apparatus 294 may be of any type; for example, the PDA 4, the camera-mounted digital mobile phone 5, or the mobile music reproducing apparatus 271 is available.

A text display section 316 receives the text to be displayed from the pronunciation control section 301, registers the received display text in a display text database 317, and, in accordance with the processing by the pronunciation control section 301, reads the text data corresponding to an electronic mail message specified for display to output the retrieved text data to the display section 22.

Figure 24:
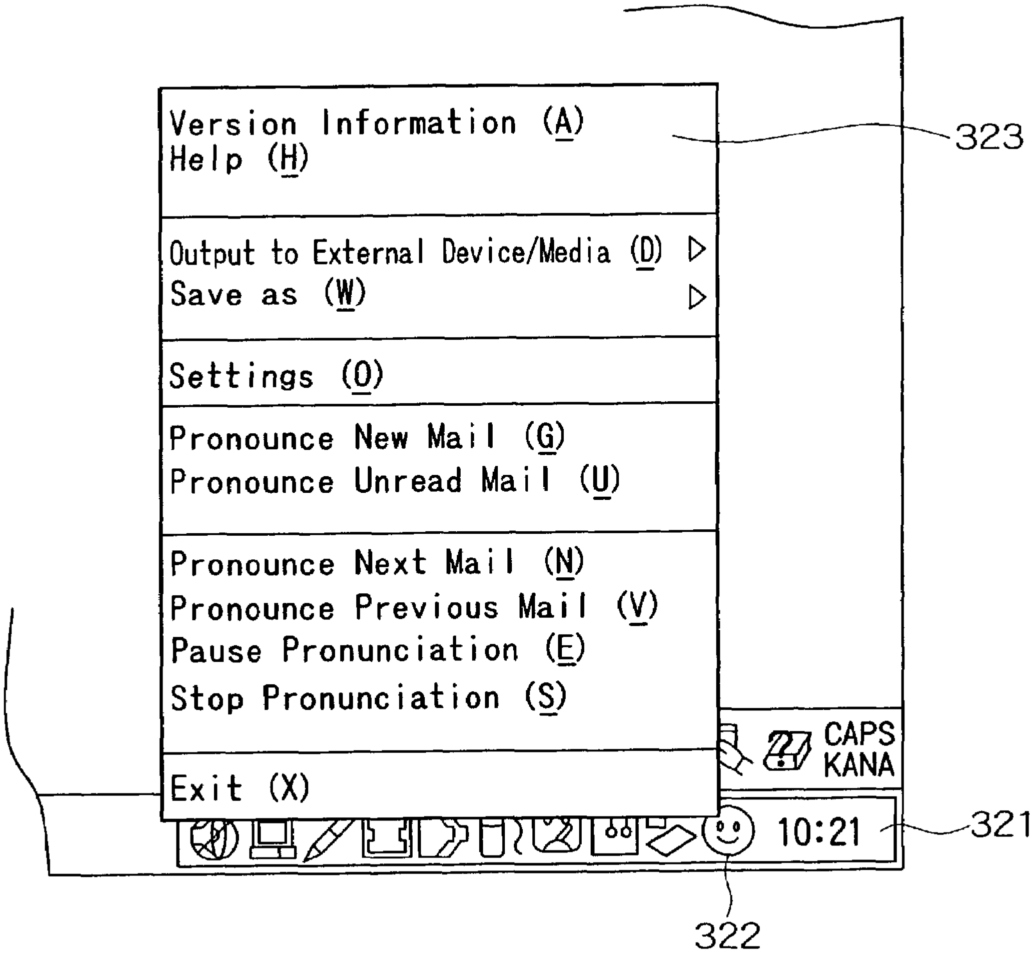
FIG. 24 is a diagram illustrating a command box of the mail watcher application.

For example, assume here that the mail watcher application be started at the same time of start up of the personal computer 2 (namely, the mail watcher application is made resident) and an icon 322 associated with the mail watcher application be displayed on a tool bar 321 as shown in FIG. 24. Then, the user can display a command box 323 by selecting the icon 322.

To perform various settings of the mail watcher application, the user selects item "Settings" from the command box 323. A signal indicative of the operation done by the user is supplied to the mail watcher application control section 281 from the GUI control section 283. The mail watcher application control section 281 receives the signal indicative of the selection of item "Settings" by the user from the command box 323, generates a control signal for displaying a setting window 331 shown in FIG. 25, and outputs the generated control signal to the GUI control section 283.

Figure 25:
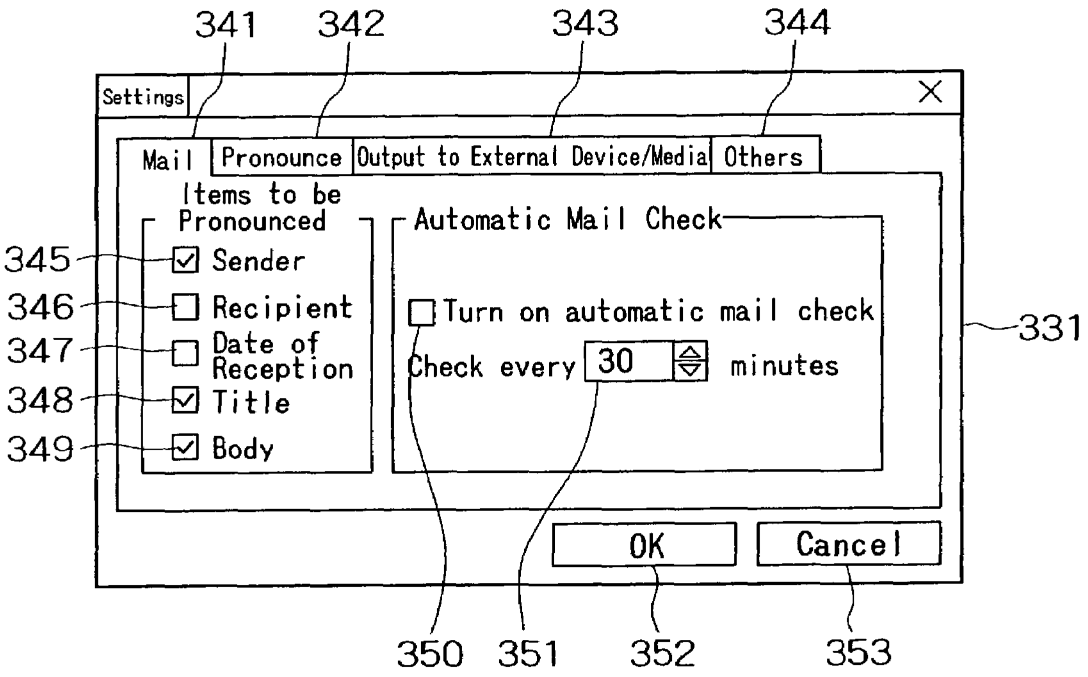
FIG. 25 is a diagram illustrating a setting window to be displayed when a mail tab is selected.

FIG. 25 shows the setting window 331 which is displayed with a mail tab 341 selected. In the setting window 331, tab selection allows to display several setting screens. The setting window 331 has, as setting screen switching tabs, a "Mail" tab 341, a "Pronounce" tab 342, a "Output to External Device/Media" tab 343, and "Others" tab 344.

The setting window 331 which is displayed with the mail tab 341 selected has check boxes 345 through 349 for the selection of pronunciation items for use in pronouncing electronic mail, a check box 350 for setting automatic mail checking, and a drop-down list box 351.

Of the check boxes 345 through 349, the contents of the items checked by the user are converted into speech data by the processing to be described later. Of the check boxes 345 through 348 (namely, the items other than text body), the contents of the items checked by the user are used to generate titles for use in outputting speech data to external devices for example by the processing to be described later. If no item other than text body is checked, namely, none of the check boxes 345 through 348 is checked, the title is set to a predetermined character string.

Also, the mail watcher application can make the MAPI mailer 282 automatically perform mail checking at predetermined time intervals (namely, the mailer can dialup-connect to a predetermined Internet service provider, access its mail server, and check to see whether or not the electronic mail addressed to itself is stored in the received mail server. When the check box 350 is checked, the mail watcher application control section 281 refers to the number written to the drop-down list box 351 to make the MAPI mailer 282 automatically perform mail checking every time the time indicated by the number comes.

In accordance with the result of the mail checking performed by the MAPI mailer 282, if there is no mail to receive, the mail watcher application control section 281 may be adapted to output a voice message "No new mail" or display a dialog box carrying a like message. In accordance with the result of the mail checking performed by the MAPI mailer 282, if there is electronic mail to receive, the mail watcher application control section 281 executes the processing for pronouncing the received electronic mail.

The setting window 331 has an OK button 352 which is selected when closing the setting window 331 after ensuring the setting and a cancel button 353 which is selected to close the setting window 331 after canceling the setting.

Figure 26:
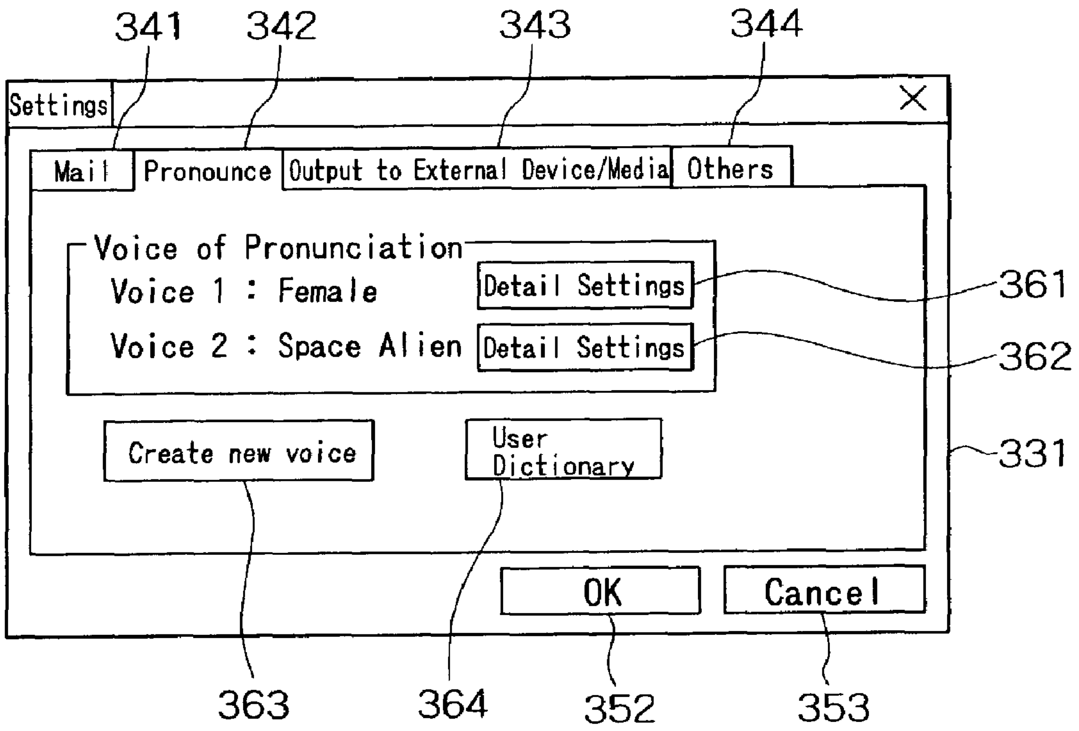
FIG. 26 is a diagram illustrating a setting window to be displayed when a "Pronounce" tab is selected.

FIG. 26 is an exemplary display of the setting window 331 which is displayed with the "Pronounce" tab 342 selected. The setting window 331 has a detail setting button 361 which is selected when setting details of voice 1, a detail setting button 362 when setting details of voice 2, a "Create new voice" button 363 which is selected when creating a new voice, and a "User Dictionary" button 364 which is selected when editing a user dictionary, in addition to the OK button 352 and the cancel button 353.

One of two types of voices, voice 1 and voice 2, may be set as a voice for pronouncing the text data of electronic mail. To change the setting of these voices, the user selects the "Detail Settings" button 361 or the "Detail Settings" button 362, whichever is corresponding, to display a voice setting window 371 shown in FIG. 27.

A voice setting window 371 has a drop-down list box 381 for setting the type of voice, a setting lever 382 for setting the speed of pronunciation, a setting lever 383 for setting the pitch of the voice for pronouncing, a setting lever 384 for setting the accent strength of the voice for pronouncing, a test button 385 for reproducing a sample voice based on the current settings, an OK button 386 for closing the voice setting window 371 after registering the settings, a cancel button 387 for and closing the voice setting window 371 after canceling the settings, and a help button 388 for displaying a help window displaying a help for operational procedure.

In addition to predetermined voices of male, female, child, robot, and space alien for example, the drop-down list box 381 displays for selection the names for phonemes created uniquely by the user by selecting the "Create new voice" button 363 and using a "Create Voice" window shown in FIG. 28 to be described later. For a voice selected by the drop-down list box 381, the speed of pronunciation, pitch, and accent strength of the selected voice are set by use of the setting levers 382 through 384.

In the above-mentioned example, the pronunciation speed, pitch, and accent strength are set by the setting levers 382 through 384. It will be apparent that other voice properties may also be set.

To check voice 1 or voice 2 set by use of the setting levers 382 through 384, the test button 385 is pressed. When the test button 385 is pressed, a predetermined text "The voice you have set sounds like this" for example is pronounced in accordance with the settings made by the user. To ensure the settings of the checked voice, the user presses the OK button 386; to cancel the settings, the user presses the cancel button 387.

Figure 28:
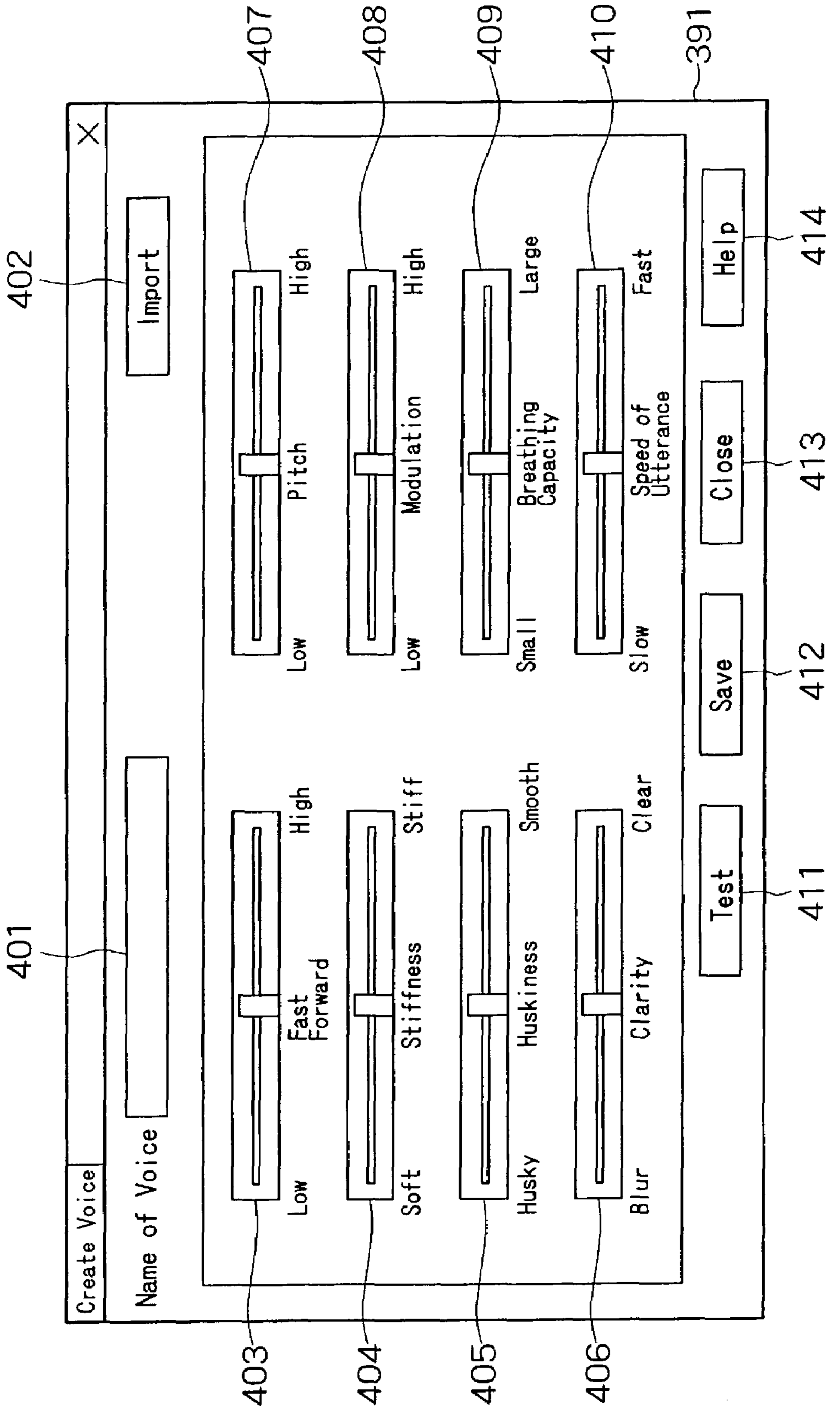
FIG. 28 is a diagram illustrating a speech creation window to be displayed when a speech newly create button is selected.

FIG. 28 shows a "Create Voice" window 391 which is displayed when the "Create new voice" button 363 is selected. The "Create Voice" window 391 has a text box 401 in which the name of a created voice is entered, an import button 402, setting levers 403 through 410, a test button 411, a save button 412, a close button 413, and a help button 414.

Figure 27:
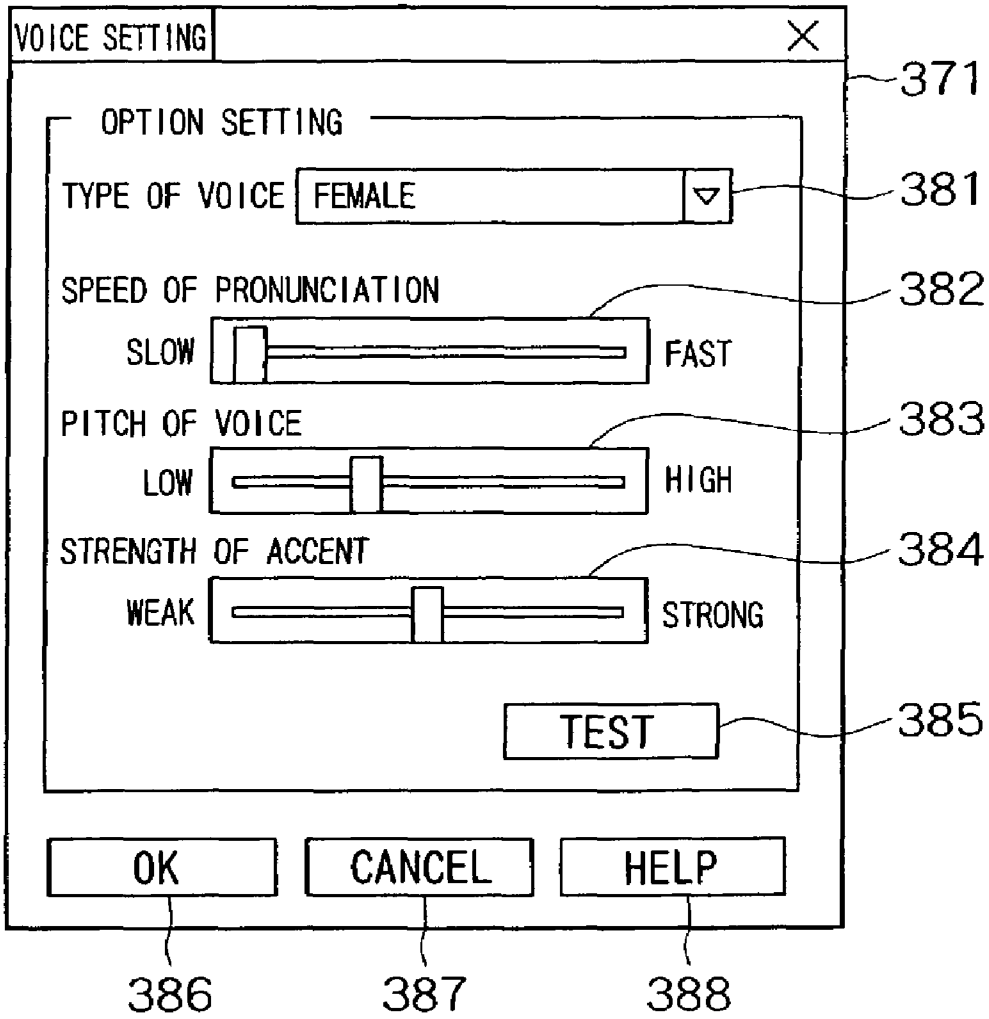
FIG. 27 is a diagram illustrating a voice setting window to be displayed when a detail button is selected.

The import button 402 is operated when reading the settings of an existing voice to create a new voice on the basis of the existing voice, thereby reflecting these settings to the setting levers 403 through 410. For example, when the import button 402 is operated, a list of existing voices like the drop-down list box 381 in FIG. 27 is displayed, from which the user can select a desired voice.

The setting lever 403 set the pitch of the selected voice by setting voice's fast feed speed. The setting lever 404 sets stiffness of voice. The setting lever 405 sets huskiness of voice. The setting lever 406 sets clarity of voice. The setting lever 407 sets the pitch of voice. The setting lever 408 sets the modulation of voice. The setting lever 409 sets the voice corresponding to breathing capacity. The setting lever 410 sets the utterance speed (the reproduction speed regardless of pitch) of voice.

In the above-mentioned example, the fast feed, stiffness, huskiness, clarity, pitch, modulation, breathing capacity, and utterance speed of voice are set by the setting levers 403 through 410. It will be apparent that other properties of voice may also be set. To check the voice set by the setting levers 403 through 410, the user operates the test button 411.

The user enters the name of the voice set as described above into the text box 401. When the text is entered in the text box 401, the save button 412 becomes active. To save the voice set as described above, the user operates the save button 412.

The close button 413 is operated when closing the "Create Voice" window 391 The help button 414 is operated when displaying a help window for helping understand the procedure of creating voices or using this application.

The newly set voice is set as a voice available for not only the mail watcher application but also a Web reader application, a mail reader application, and text pronunciation application to be described later, so that the mail watcher application control section 281 outputs the settings of the newly created voice to the pronunciation management module 288. The information about the newly created voice is registered in the phoneme database 309 by the pronunciation control section 301.

Figure 29:
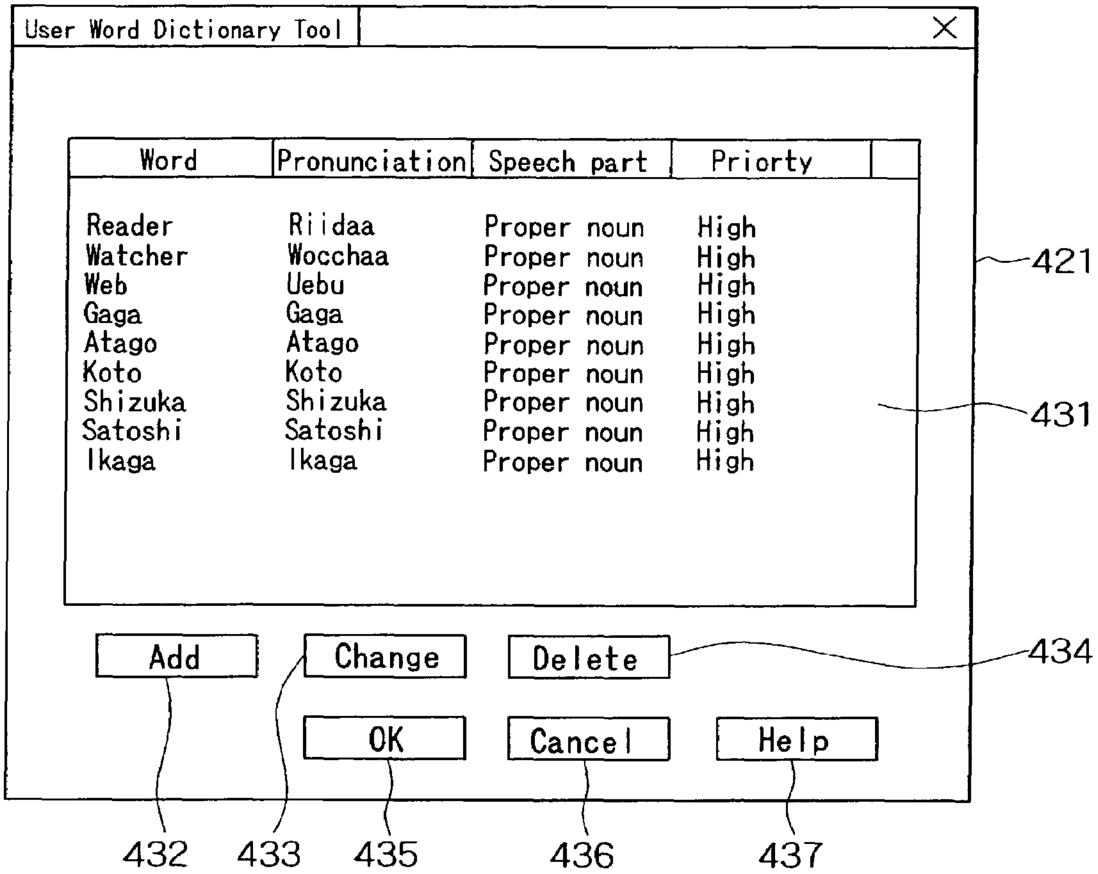
FIG. 29 is a diagram illustrating a "User Word Dictionary Tool" window to be displayed when a user dictionary button is selected.

When the user dictionary button 364 is operated in the setting window 331 shown in FIG. 26, a "User Word Dictionary Tool" window 421 shown in FIG. 29 is displayed.

The user "User Word Dictionary Tool" window 421 has a word display window 431, a add button 432, a change button 433, a delete button 434, an OK button 435, a cancel button 436, and a help button 437.

The word display window 431 displays registered words (or a text to be displayed), the pronunciation of these words, speech parts, and priority of reading of same words.

Figure 30:
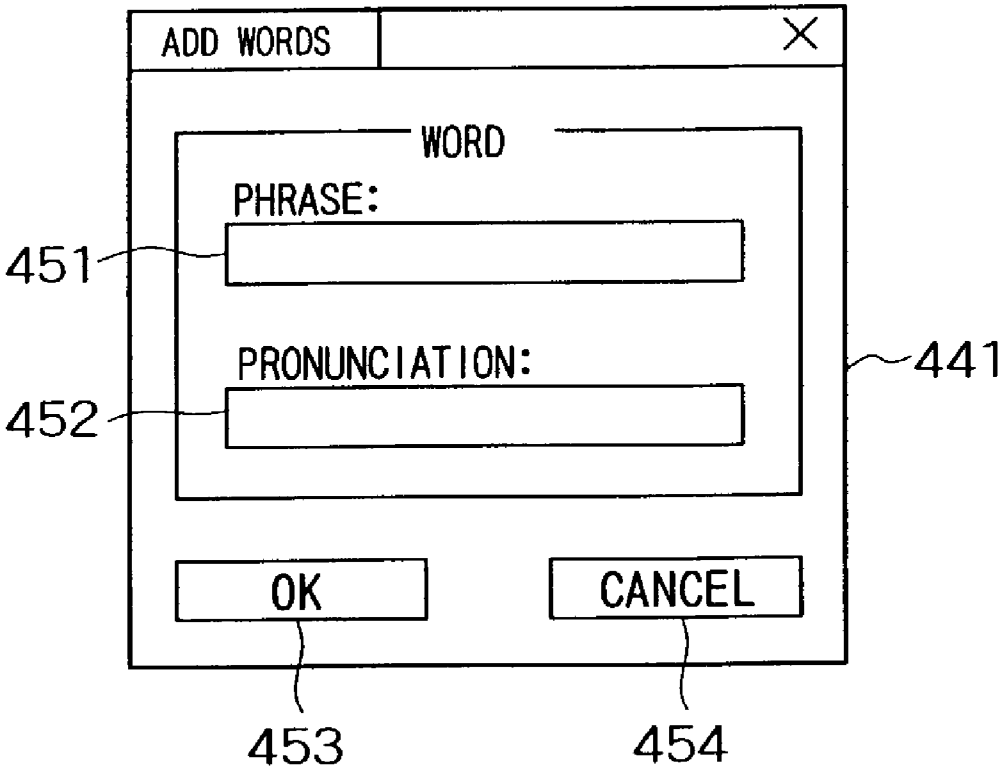
FIG. 30 is a diagram illustrating a word addition window to be displayed when a add button is selected.

When the add button 432 is operated, a "Add Words" window 441 shown in FIG. 30 is displayed. The "Add Words" window 441 has a text box 451 in which adding words are entered, a text box 452 in which the pronunciations of the words entered in the text box 451 are entered by use of such texts representative of sounds (having no different sound in the same text as with Kanji) as Hiragana or Katakana (Japanese syllabary characters) or Roman letters are entered, an OK button 453 which is operated when registering entered settings, and a cancel button 454 which is operated when canceling the registration of settings.

The "User Word Dictionary Tool" window 421 shown in FIG. 29 is described again. The change button 433 is operated when displaying a dictionary changing window, not shown, for changing the selected (in reverse display) word, speech part or priority of the words displayed in the word display window 431.

The delete button 434 is operated when deleting the registration of the selected (in reverse display) word among the words displayed in the word display window 431.

The OK button 435 is operated when registering a word set as shown in the word display window 431 and closing the "User Word Dictionary Tool" window 421. The cancel button 436 is operated when canceling a newly registered word or a word of which registered settings have been changed and closing the "User Word Dictionary Tool" window 421. The help button 437 is operated when displaying a help window, not shown, for helping understand the user dictionary registration procedure and so on.

The user dictionary thus set becomes available for not only the mail watcher application but also the Web reader application, the mail reader application, and the text pronunciation application to be described later, so that the mail watcher application control section 281 outputs the words newly registered in the user dictionary or the updated contents of the user dictionary to the pronunciation management module 288 to register these words into or updates the dictionary database 305 described with reference to FIG. 23.

Figure 31:
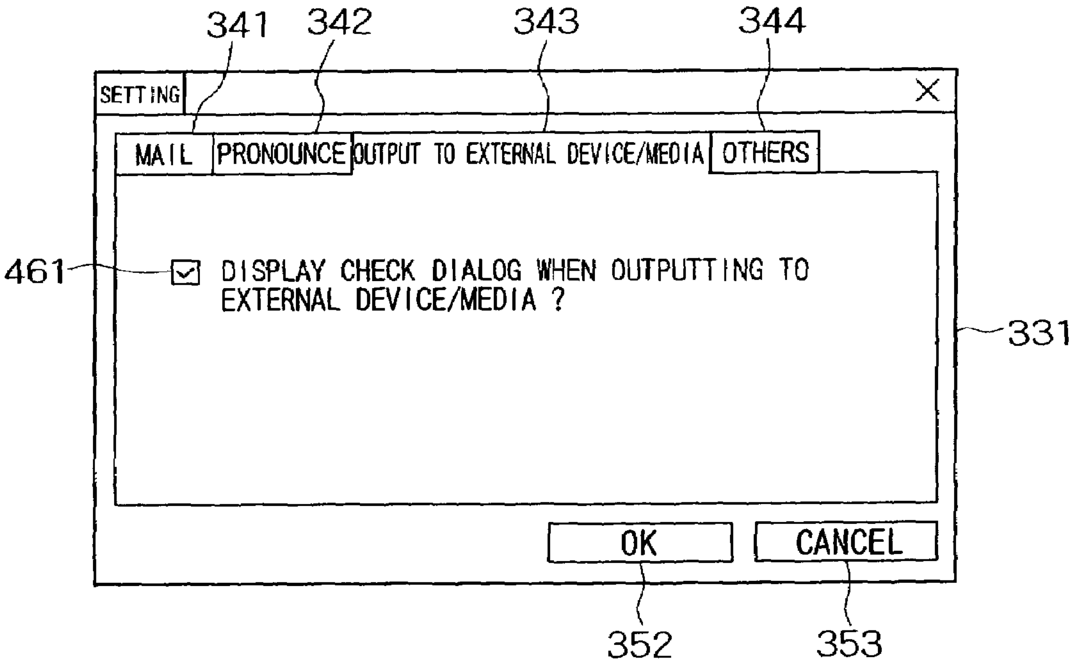
FIG. 31 is a diagram illustrating a setting window to be displayed when an output-to-"Output to External Device/Media" tab is selected.

FIG. 31 shows the setting window 331 to be displayed when the "Output to External Device/Media" tab 343 is selected.

A check box 461 is checked to display a confirmation dialog box to be described later with reference to FIG. 44 for example in order to prevent the data recorded on an external device or a medium (namely information recording medium) from being overwritten by the speech data outputted by the user to the external device or the recording medium. When the check box 461 is checked, the confirmation dialog box is displayed.

Figure 32:
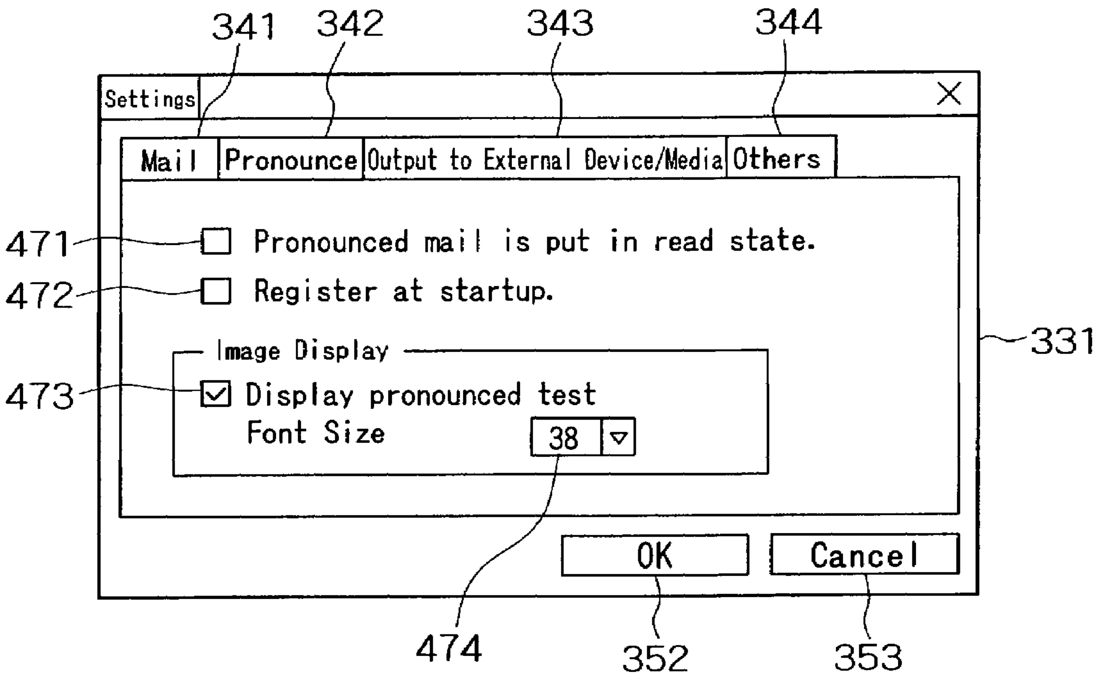
FIG. 32 is a diagram illustrating a setting window to be displayed when other tabs are selected.

FIG. 32 shows the setting window 331 with "Others" tab 344 selected.

A check box 471 is checked when handling already read electronic mail as read mail in the electronic mail program 67A installed in the personal computer 2, after completion of the pronunciation processing. A check box 472 is checked when registering the mail watcher application into the startup menu if the OS of the personal computer 2 has a startup capability as with Windows 98 (trademark) for example.

A check box 473 is checked when displaying text data by displaying a text display window to be described later at the same as the pronunciation of electronic mail. If the check box 473 is checked (namely, the setting is made to display text), the drop-down list box 474 becomes active (ready for operation), thereby allowing the setting of the font size of the text to be displayed.

As described, the mail watcher application control section 281 executes various processing operations on the basis of the settings made through the setting window 331 and, in accordance with the signals indicative of user operations entered through the GUI control section 283, executes the processing of pronouncing electronic mail (namely, performing text-to-speech conversion on electronic mail and sounding it).

Therefore, increasing the pronunciation speed allows the user to shorten the time required for the reproduction of electronic mail and decreasing the pronunciation speed allows the user to listen to the reproduction of electronic mail more surely. Further, if the user is aged person having hearing difficulties in which the user can listen easily in high-pitch area than the low-pitch area for example, the user can set the type of voice to female and set the high-pitch area in individual setting, lower the reproduction speed, and make the pronunciation clear for example, thereby setting the pronunciation of electronic mail to a phoneme easy to hear for the user.

For example, when the command box 323 described with reference to FIG. 24 is displayed and any one of the items is selected, the mail watcher application is started to execute the processing in accordance with user's input operations.

Figure 33:
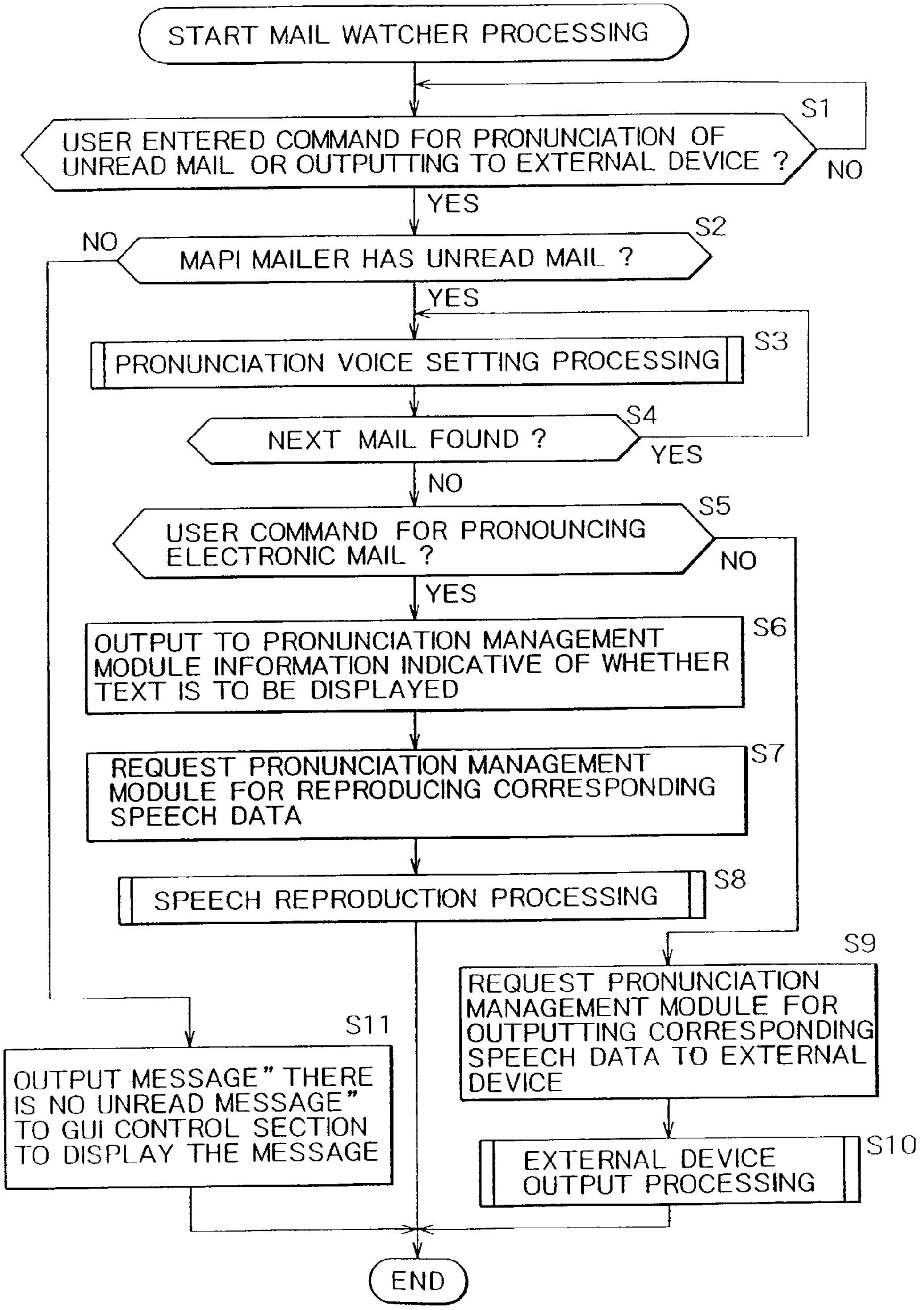
FIG. 33 is a flowchart describing the processing by the mail watcher.

The following describes the processing by the mail watcher program to be executed when a command is issued by the user for pronouncing unread mail or outputting it to an external device, with reference to the flowchart of FIG. 33.

In step S1, the mail watcher application control section 281 determines whether or not a signal has come from the GUI control section 283 indicating that the user has performed an operation corresponding to the pronunciation of unread mail or the outputting thereof to an external device. If, in step S1, the command for the pronunciation of unread mail or the outputting thereof to an external device is found not issued by the user, the process of step S1 is repeated until the command comes.

Figure 34:
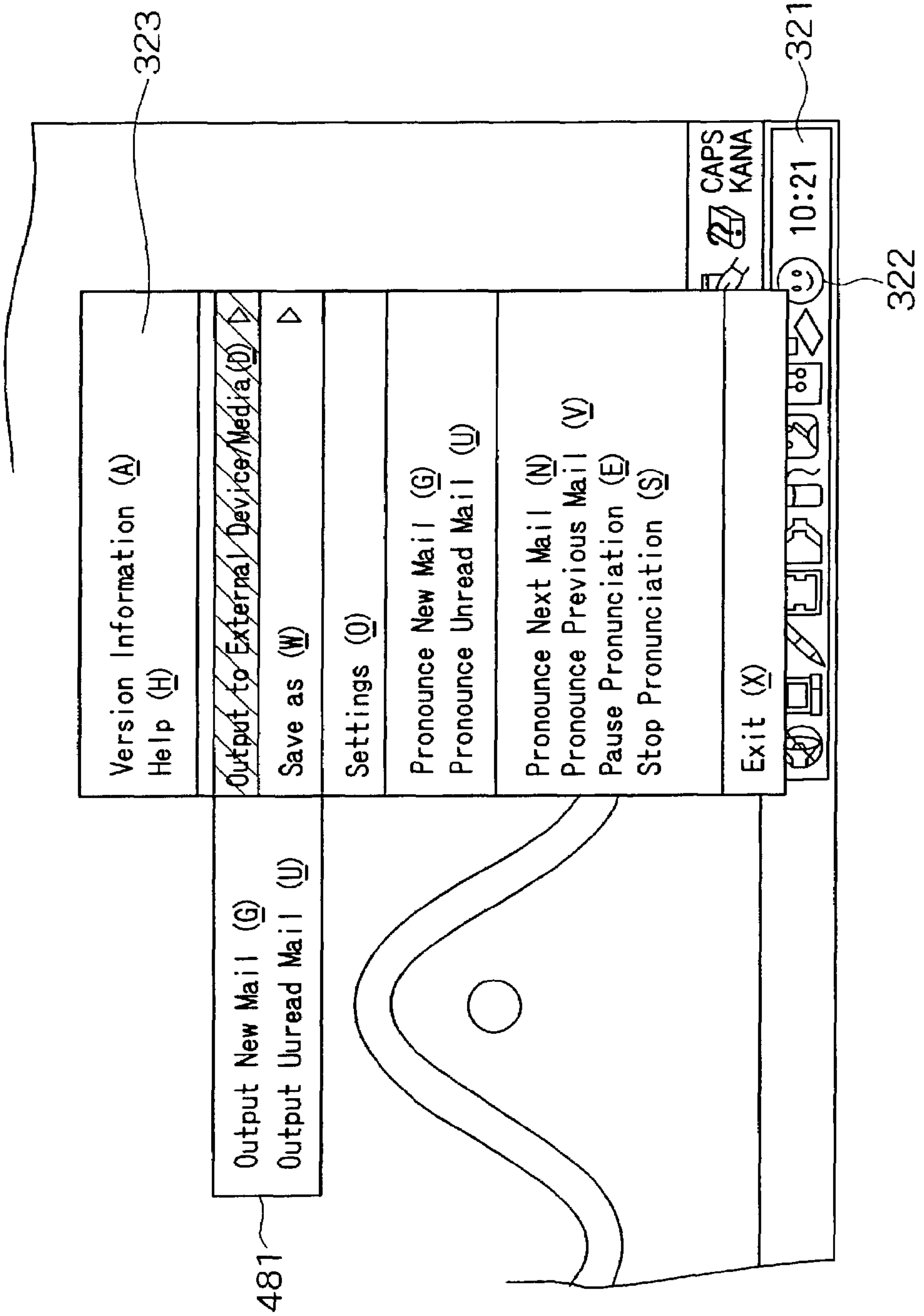
FIG. 34 is a diagram illustrating an operator input for issuing a command for outputting unread mail.

The operation for issuing the command for the pronunciation of unread mail is performed by selecting item "Pronounce Unread Mail" in the command box 323 described with reference to FIG. 24. The operation for issuing the command for the outputting unread mail to an external device is performed by selecting item "Output to External Device/Media" of the command box 323 described with reference to FIG. 24 and selecting item "Output Unread Mail" in the command box 481 indicated in FIG. 34. When item "Output New Mail" is selected in the command box 481, new mail is outputted to an external device or a connected recording medium to be recorded thereto. In what follows, the processing of unread mail will be described for the brevity of description.

When the command for pronouncing unread mail or outputting it to external device is found to be issued in step S1, then the mail watcher application control section 281 determines in step S2 whether or not unread mail is stored in the MAPI mailer 282.

The process of step S2 is also executed when a predetermined mail checking timing has reached with the check box 350 described with reference to FIG. 25 checked to set automatic mail checking.

Figure 36:
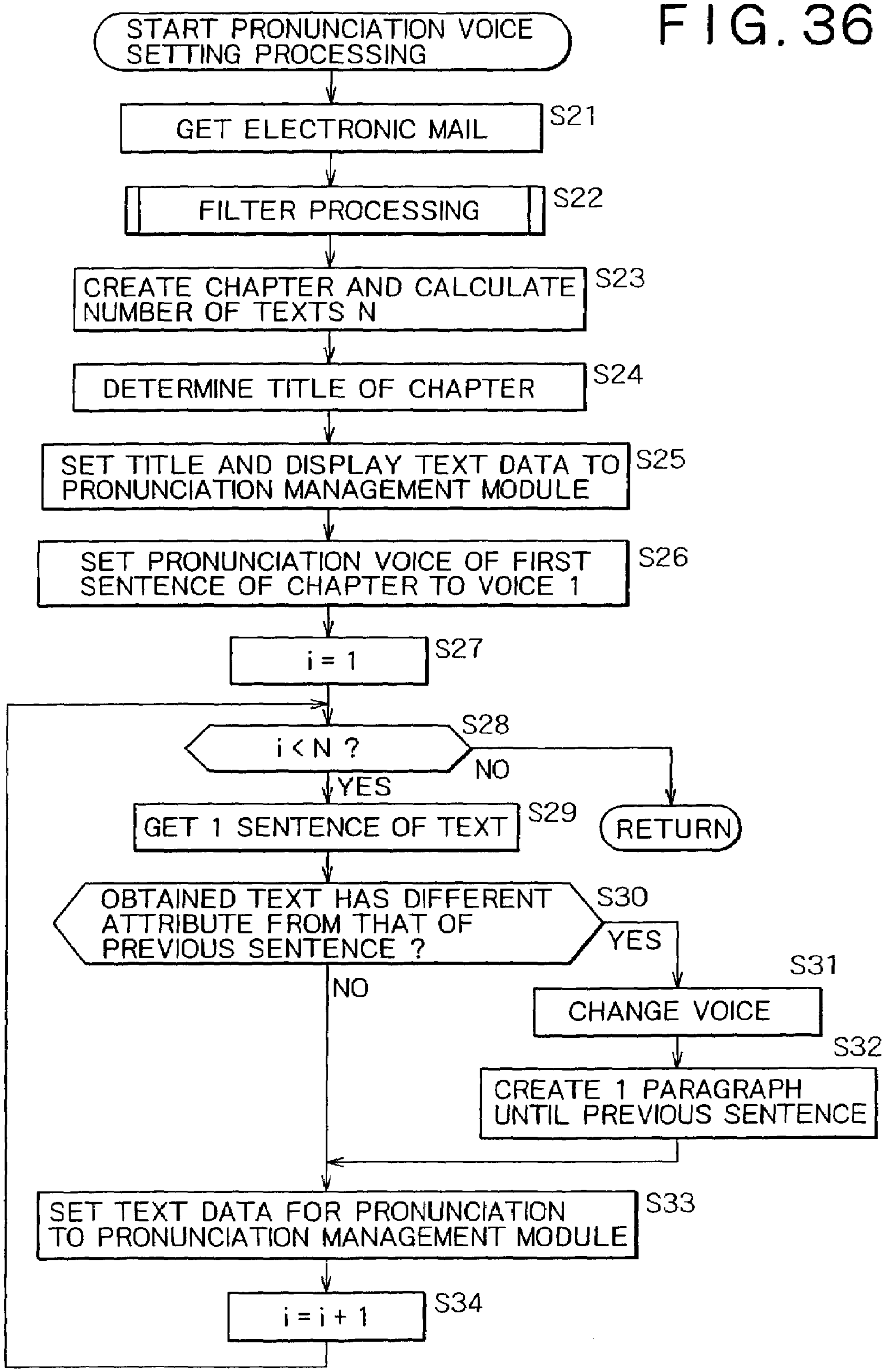
FIG. 36 is a flowchart describing pronunciation speech setting processing.

If unread mail is found stored in the MAPI mailer 282 in step S2, then a pronunciation voice setting process to be described later with reference to the flowchart of FIG. 36 is executed in step S3.

In step S4, the mail watcher application control section 281 determines whether or not a next mail message is stored in the MAPI mailer 282. If a next mail message is found stored, the procedure returns to step S3 to repeat the process thereof until there is no unread mail.

If no next mail message is found in step S4, namely all unread mail messages have been executed the pronunciation voice setting processing, then the mail watcher application control section 281 determines in step S5 on the basis of the signal supplied from the GUI control section 283 whether or not the command issued by the user is for reproduction of electronic mail in voice.

If the command issued by the user is found for the reproduction of electronic mail in voice in step S5, then mail watcher application control section 281 determines in step S6 whether or not the check box 473 described with reference to FIG. 32 is checked and, if this check box is found checked, outputs the information to the pronunciation management module 288 telling whether or not the text to be pronounced is to be displayed on the screen.

Figure 35:
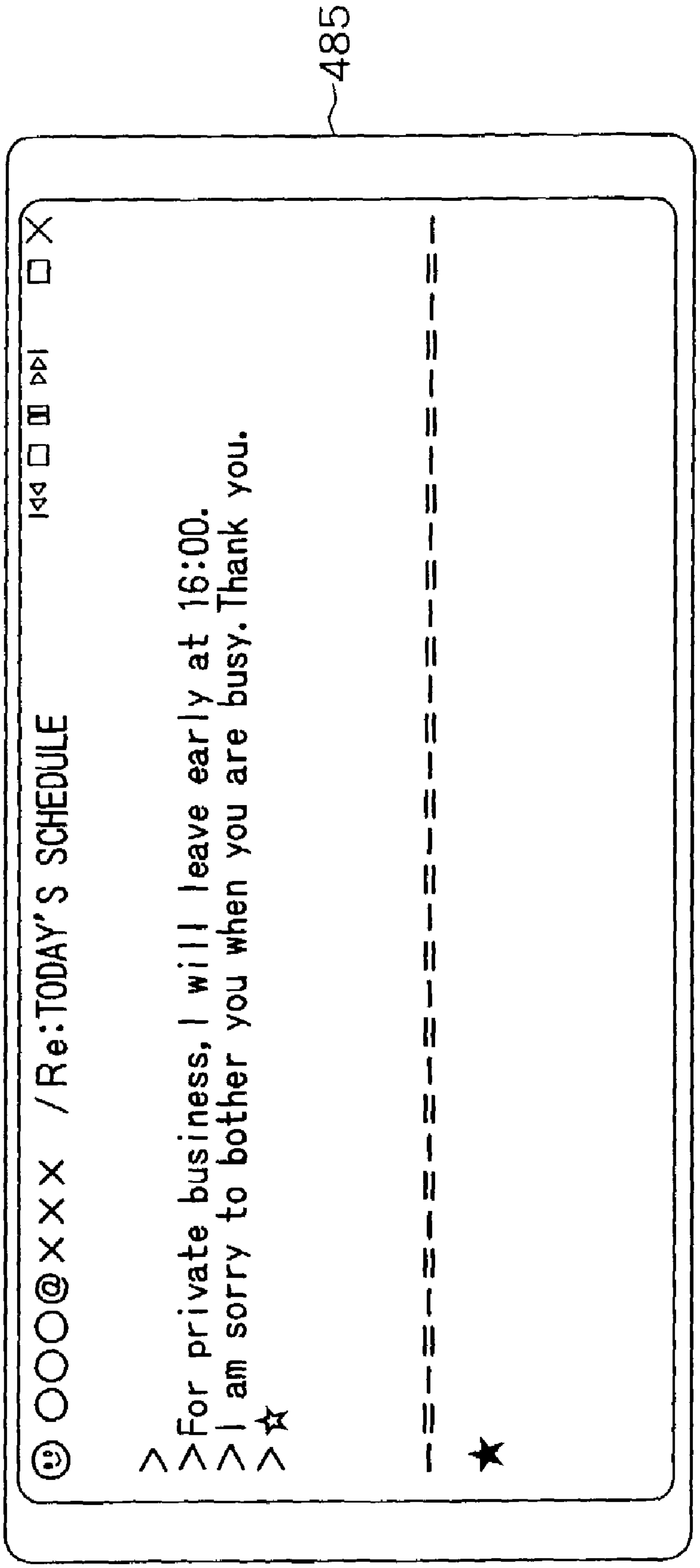
FIG. 35 is a diagram illustrating a text display window.

If the setting is made to display the text to be pronounced in the setting window 331 describe with reference to FIG. 32, the pronunciation control section 301 of the pronunciation management module 288 controls the text display section 316 on the basis of the signal supplied from the mail watcher application control section 281 to retrieve the corresponding text data from the display text database 317 and displays a text display window 485 as shown in FIG. 35.

In step S7, the mail watcher application control section 281 generates a signal for requesting the pronunciation management module 288 for reproducing the corresponding speech data and outputs the generated signal to the pronunciation management module 288.

Figure 42:
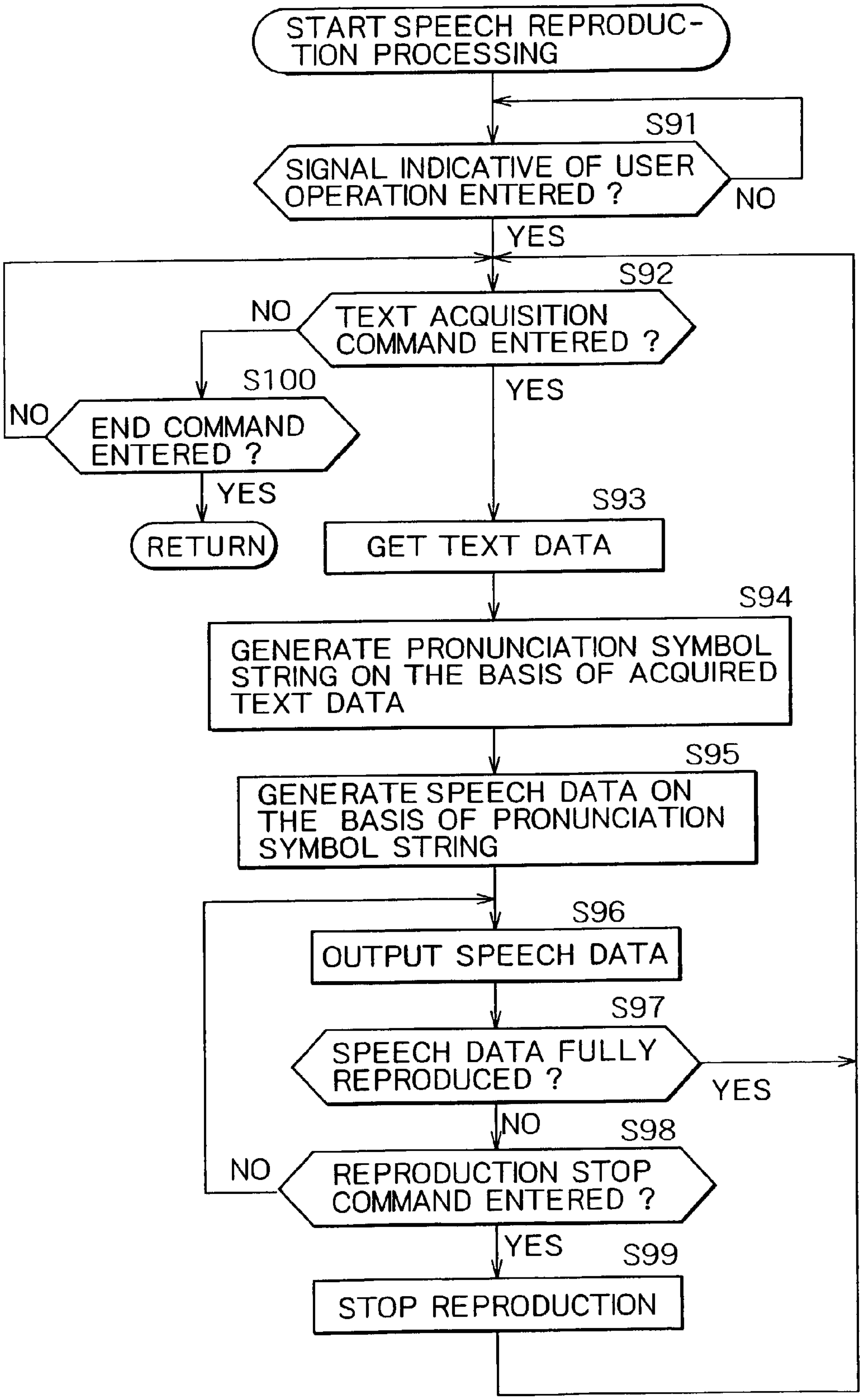
FIG. 42 is a flowchart describing speech reproduction processing.

In step S8, the speech reproduction processing to be described later with reference to FIG. 42 is executed and the procedure comes to an end.

If the command from the user is found not for the reproduction of electronic mail in voice in step S5, then the command from the user is for outputting of electronic mail to an external device, so that the mail watcher application control section 281 generates a signal for requesting the pronunciation management module 288 for outputting the corresponding speech data to an external device and outputs the generated signal to the pronunciation management module 288 in step S9.

Figure 43:
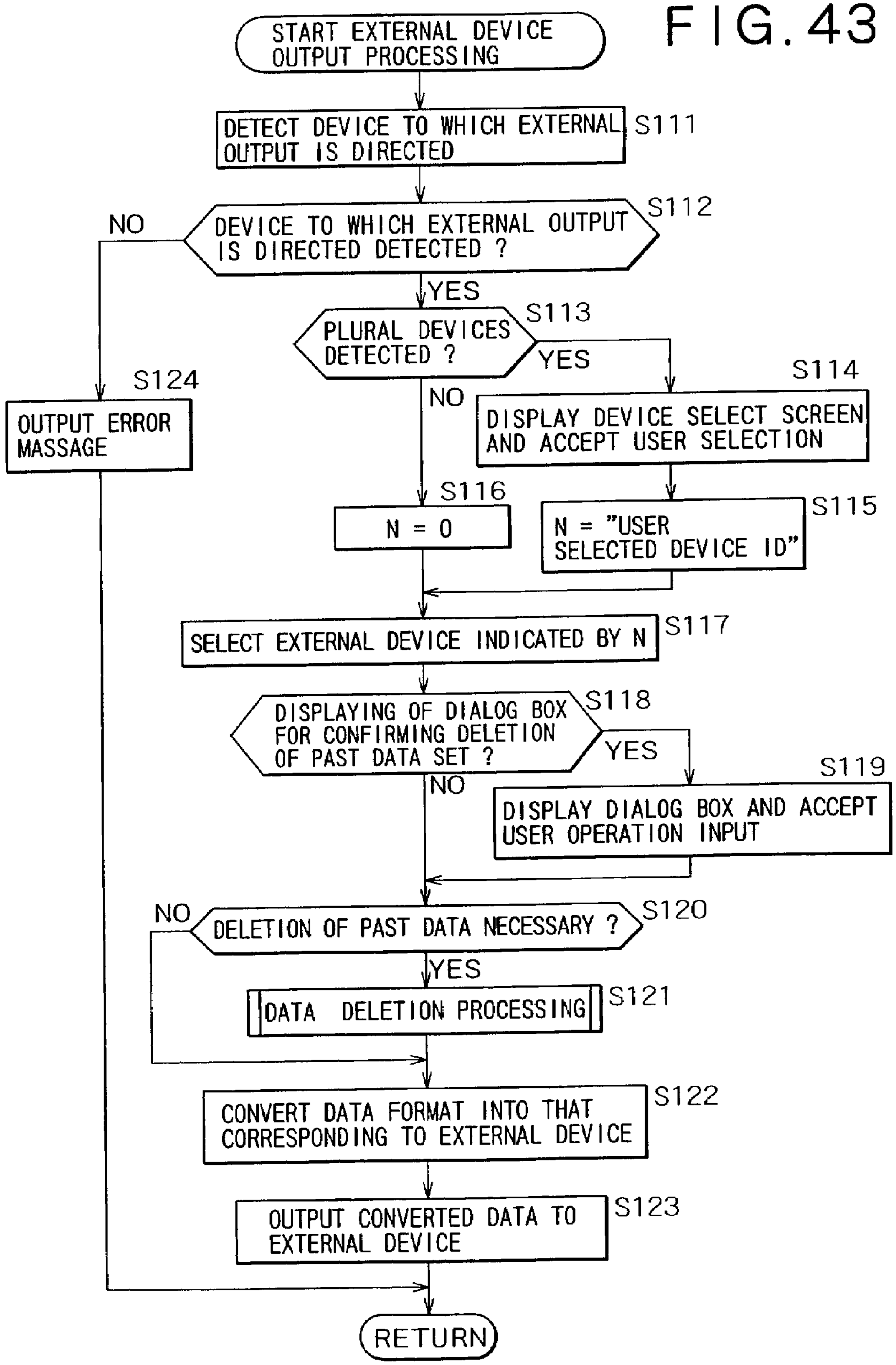
FIG. 43 is a flowchart describing external device output processing.

In step S10, external device output processing to be described later with reference to FIG. 43 is executed, upon which the procedure comes to an end.

If no unread mail is found stored in the MAPI mailer 282 in step S2, then the mail watcher application control section 281 generates a control signal for displaying message "There is no unread mail" and outputs the generated control signal to the GUI control section 283 in step S11. Then, the GUI control section 283 displays a message window, not shown, with message "There is no unread message" displayed on the LCD 25, upon which the procedure comes to an end.

In the above-mentioned example, the command from the user for pronouncing an unread mail or outputting it to an external device is received and the unread mail is retrieved from the MAPI mailer 282. If the command is for pronouncing a new mail or outputting it to an external device instead of unread mail, the basically the same processing as above is executed except for the type of mail, so that the description of this process will be skipped.

The following describes the pronunciation voice setting processing executed in step S3 of FIG. 33 will be described with reference to the flowchart of FIG. 36.

In what follows, the voice setting processing in which the mail watcher application control section 281 converts unread mail into speech data is described. For example, also in the mail reader processing to be described later with reference to FIG. 50, a mail reader application control section 531 to be described later with reference to FIG. 46 executes basically the same pronunciation setting processing.

In step S21, the mail watcher application control section 281 gets electronic mail (unread mail in this example) to be converted into speech data from the MAPI mailer 282.

Figure 38:
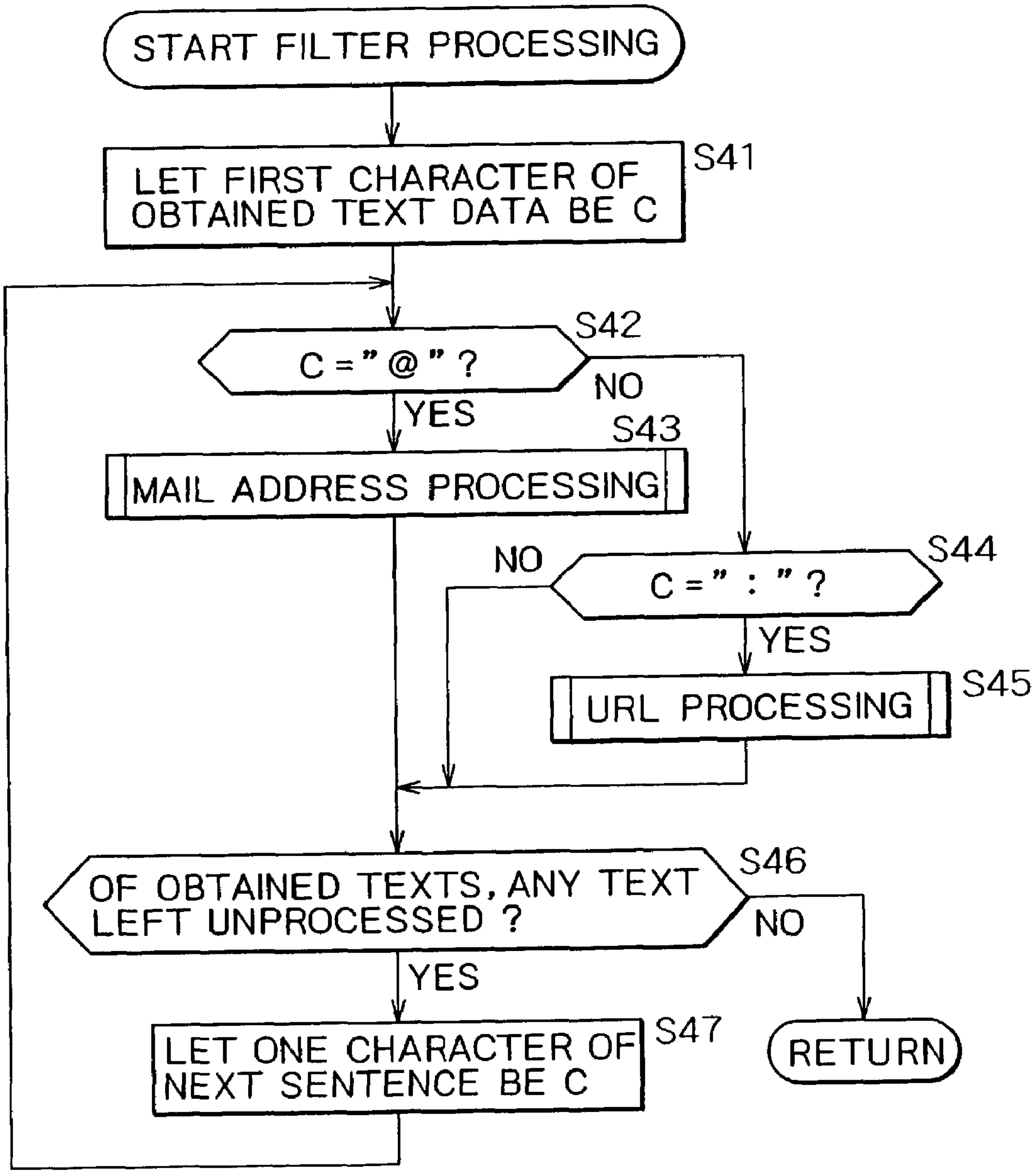
FIG. 38 is a flowchart describing filter processing.

In step S22, the filter processing to be described later with reference to FIG. 38 is executed.

In step S23, if the acquired electronic mail is of text format, the mail watcher application control section 281 outputs it to the mail filter 284; if the acquired electronic mail is of HTML format, the mail watcher application control section 281 outputs it to the HTML tag filter 286. The mail filter 284 refers to the conversion table database 285 and the HTML tag filter 286 refers to the conversion table database 287 to filter the supplied electronic mail message and outputs filtering results to the mail watcher application control section 281. On the basis of the filtering results, the mail watcher application control section 281 creates a chapter to count up the number of characters N. The chapter herein denotes an information unit providing one piece of speech data (equivalent to one file of speech data). One electronic mail message provides one chapter. Because an electronic mail message is divided into sentences by the filtering by the mail filter 284 or the HTML tag filter 286, the mail watcher application control section 281 can count up the number of characters N.

In step S24, on the basis of the filtering results, the mail watcher application control section 281 determines the title of the chapter, namely the music title of music data and the information corresponding to artist name. In this example, artist name is "ONSEI" to make distinction between other information and speech data created from text data by text-to-speech synthesis. However, it will be apparent that the artist name may be the name of an application which generated speech data from text data, namely any character string may be used as long as it can made distinction between other information and speech data.

The title is determined by referring to the header of electronic mail and the item which is checked among the check boxes 345 through 348 described with reference to FIG. 25. FIG. 37 shows an exemplary electronic mail header.

The header of electronic mail contains various information other than the body of electronic mail. For example, the main information written to the header of electronic mail includes an recipient address (text 491 shown in FIG. 37), transmission time (text 492), sender address (text 493), subject (text 494), format or information telling whether or not this electronic mail is of text format or HTML format (text 495). The title is generated by linking text portions corresponding to items checked among the check boxes 345 through 348 described with reference to FIG. 25 with "/" (slash) for example into one text.

If none of the check boxes 345 through 348 is checked, the title is set to a predetermined character string (for example, "ONSEI"). If the same character strings are set to a title, each piece of speech data can be distinguished from each other by adding a number to "AAA" to get "AAA2" and "AAA3" for example.

In this example, the mail watcher application control section 281 converts an unread mail message into speech data. It will be apparent that, because the filtering method depends on corresponding applications, another method of determining a chapter title may be used.

If the corresponding speech data is outputted to the mobile music reproducing apparatus 271 or other devices for reproduction, the title thus set is used for a display screen for speech data selection as with the title (music title) of general speech data (for example, music data).

In step S25, the mail watcher application control section 281 sets (or supplies) the title and display text data to the pronunciation management module 288. The pronunciation control section 301 of the pronunciation management module 288 records the supplied title and display text data to the display text database 317 via the text display section 316.

In step S26, the mail watcher application control section 281 sets the pronunciation voice of the first sentence of the chapter to voice 1.

In step S27, the mail watcher application control section 281 sets the value of register i for detecting which line of sentence is to be processed of the sentences included in the chapter, as i=0.

In step S28, the mail watcher application control section 281 determines whether or not value i of the register i is i< the number of chapter characters N.

In step S28, if value i of register i is i< the number of chapter characters N, then, in step S29, the mail watcher application control section 281 gets one sentence of subsequent text.

In step S30, the mail watcher application control section 281 refers to a marker attached as a result of the filtering to determine whether or not the acquired text has a different attribute than that of the previous sentence (namely, whether or not the acquired sentence is a quotation or quotation belongs to a different quotation layer).

If the acquired text is found having a different attribute than that of the previous sentence in step S30, then the mail watcher application control section 281 changes the voice from that of the previous sentence in step S31. Namely, if the voice before attribute change is voice 1, the voice of the acquired text is changed to voice 2; if the voice before attribute change is voice2, the voice of the acquired text is changed to voice 1.

In step S32, the mail watcher application control section 281 makes the text up to the previous sentence (namely the portion to be reproduced in the same voice until the voice is changed) the last sentence of the previous paragraph and makes the text acquired in step S29 the first sentence of a new paragraph, thereby creating the new paragraph.

If the acquired text is found not having a different attribute than that of the previous sentence in step S30 or after the completion of the processing in step S32, then the pronunciation text data generated by the processes of steps S29 through S32 are set to the pronunciation management module 288 in step S33. The pronunciation control section 301 of the pronunciation management module 288 records the supplied pronunciation text data to the pronunciation text database 303 via the text management section 302.

In step S34, the mail watcher application control section 281 sets value i of register i as i=i+1, upon which procedure returns to step S28 to repeat the above-mentioned processing therefrom.

If value i of register i is found not i<the number of chapter characters N in step S28, then the procedure goes to step S4 shown in FIG. 33 (if the pronunciation setting processing has been executed in step S154 shown in FIG. 50 to be described later, the procedure goes to step S155 shown in FIG. 50).

By the processing described above, the pronunciation voice of an electronic mail message is changed depending on the attribute (the quotation or quotation layer in this example) of the text of the electronic mail message and the resultant voice is sounded.

In the above-mentioned example, there are two types of voices in which an electronic mail message is pronounced. It will be apparent that more than two types of voices may be used.

Consequently, because quotations are often written by the user himself or have often the contents which were read before, the setting may be made to pronounce these quotation portions more quickly than other portions, thereby shortening the time necessary for pronouncing an entire electronic mail message while allowing the user to understand these other portions more surely.

The following describes the filter processing to be executed in step S22 shown in FIG. 33 with reference to the flowchart shown in FIG. 38.

In step S41, the URL and mail address filter 289 gets text data from the mail watcher application control section 281 (or a mail reader application control section 531 to be described later with reference to FIG. 46, a Web reader application control section 591 to be described later with reference to FIG. 51 or a text pronunciation application control section 641 to be described later with reference to FIG. 57) and sets the first character of the acquired text data to C.

In step S42, the URL and mail address filter 289 determines whether or not C=@ ("at" symbol).

If C is found @ in step S42, then the URL and mail address filter 289 executes, in step S43, mail address processing to be described later with reference to FIG. 39.

If C is found not @ in step S42, then the URL and mail address filter 289 determines in step S44 whether or not C is ":".

If C is found ":" in step S44, then the URL and mail address filter 289 executes, in step S45, URL processing 1 to be described later with reference to FIG. 40 or URL processing 2 to be described later with reference to FIG. 41.

If, after the end of the process of step S43 or the process of step S45, C is found not ":" in step S44, then the URL and mail address filter 289 determines, in step S46, whether or not there still remain any text not yet processed among those acquired texts.

If any text not yet processed is found in step S46, then the URL and mail address filter 289 sets the next character of the acquired text to C in step S47, upon which the procedure returns to step S42 to repeat the above-mentioned processing therefrom.

If all acquired texts are found processed in step S46, the procedure returns to step S23 shown in FIG. 36.

In the above-mentioned example, it is assumed that the filter processing was executed in step S22 of FIG. 36. If the filter processing is executed in the Web reader processing to be described later with reference to FIG. 55, the procedure returns to step S174 shown in FIG. 55; if the filter processing is executed in the text pronunciation processing to be described later with reference to FIG. 60, the procedure returns to step S193 shown in FIG. 60.

Figure 39:
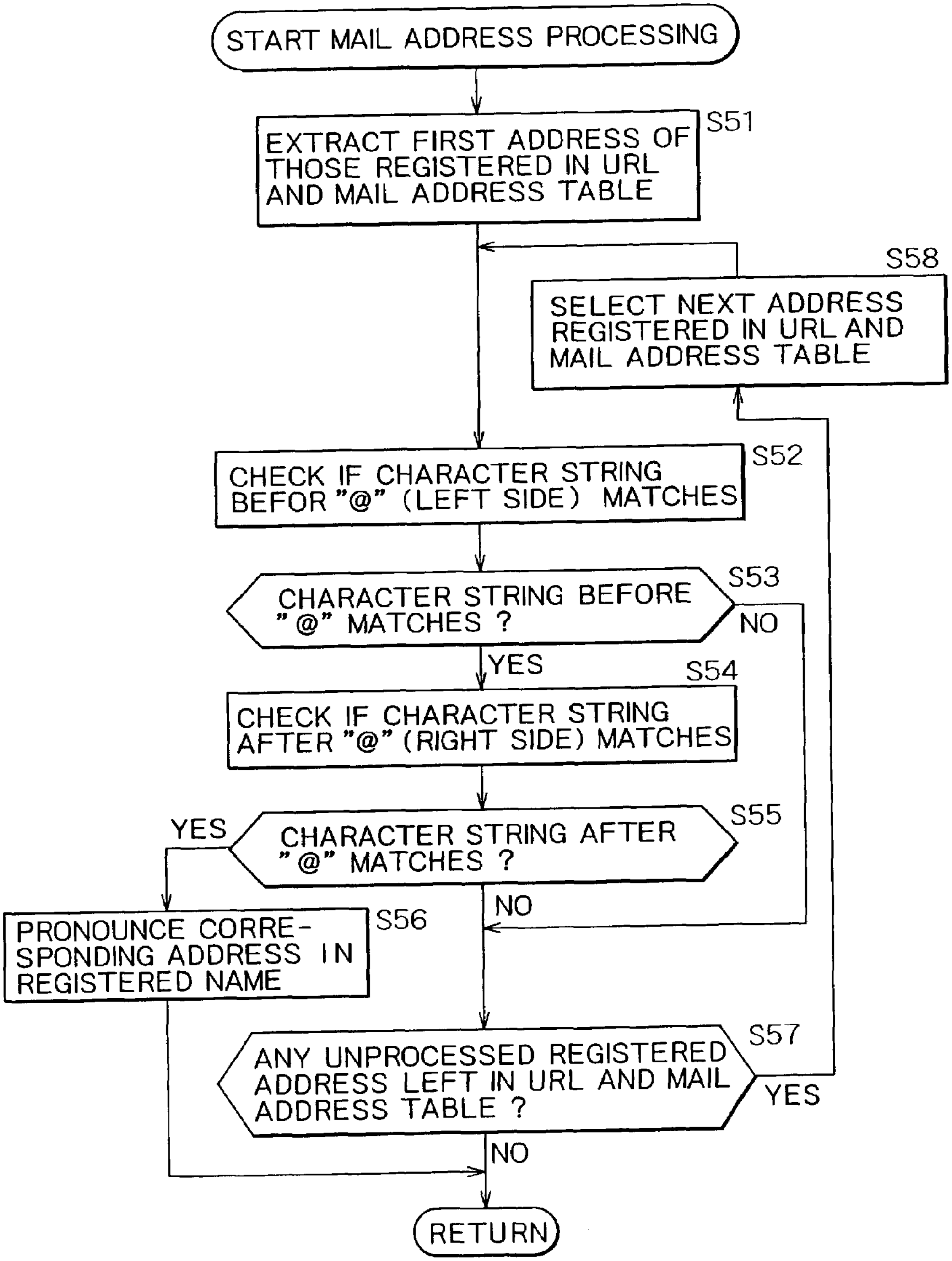
FIG. 39 is a flowchart describing mail address processing.

The following describes the mail address processing to be executed in step S43 shown in FIG. 38 with reference to the flowchart of FIG. 39.

In step S51, the URL and mail address filter 289 extracts a first electronic mail address from the electronic mail addresses registered in the URL and mail address table 290.

In step S52, the URL and mail address filter 289 checks if the character string before (left side of) "@" matches. In step S53, the URL and mail address filter 289 determines whether or not the character string before "@" matches.

If the character string before "@" is found matching in step S53, then the URL and mail address filter 289 checks if the character string after (right side of) "@" matches in step S54 and determines whether or not the character string after "@" matches in step S55.

If the character sting after "@" is found matching in step S55, then the URL and mail address filter 289 refers to the electronic mail addresses registered in the URL and mail address table 290 and their names and replaces the corresponding address with its registration name, upon which the procedure returns to step S46 of FIG. 38.

If the character string before "@" is found not matching in step S53 or the character string after "@" is found not matching in step S55, then the URL and mail address filter 289 determines in step S57 whether or not there still remain any registration addresses unprocessed in the URL and mail address table 290.

If there remain any unprocessed registration addresses in the URL and mail address table 290 in step S57, then the URL and mail address filter 289 selects a next address registered in the URL and mail address table 290 in step S58, upon which the procedure returns to step S52 to repeat the above-mentioned processing therefrom. If there is no unprocessed registered addresses in step S57, it indicates that no corresponding mail address name is registered in the URL and mail address table 290, so that the procedure returns to step S46 of FIG. 38.

In this example, the next processing is executed if the character string before "@" matches by use of the "@" included in each mail address as criterion. It is apparent that the determination of a registered address or not may be made by performing matching on each character from the beginning of the address.

Figure 40:
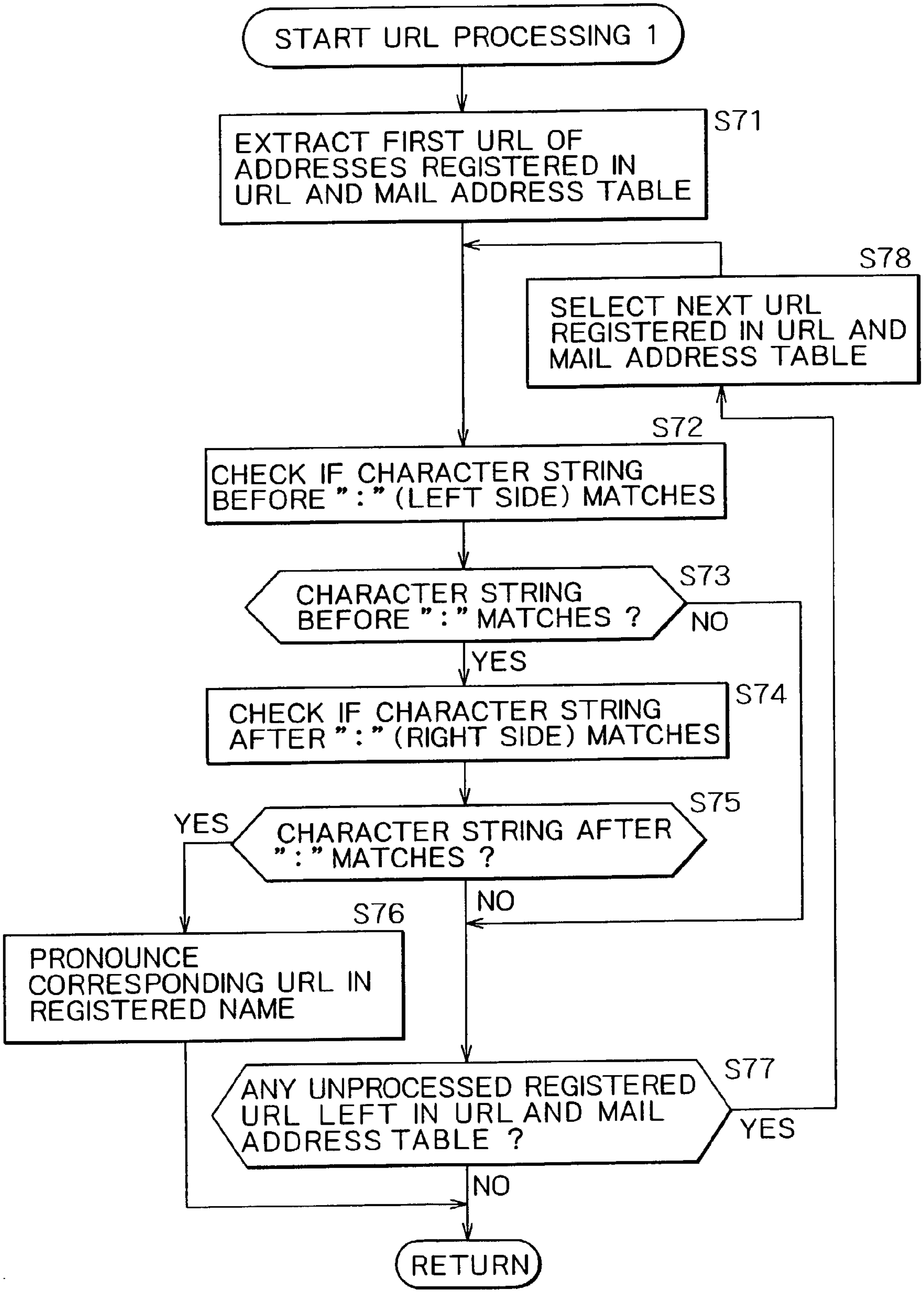
FIG. 40 is a flowchart describing URL processing 1.

The following describes URL processing 1 to be executed in step S45 of FIG. 38 with reference to the flowchart of FIG. 40.

In step S71 the URL and mail address filter 289 extracts a first URL from among the URLs registered in the URL and mail address table 290.

In step S72, the URL and mail address filter 289 checks if the character string before (left side of) ":" of the acquired text matches and, in step S73, determines whether or not the character string before ":" matches If the character string before ":" is found matching in step S73, the URL and mail address filter 289 checks in step S74 if the character string after (right side of) ":" matches and determines in step S75 whether or not the character string after ":" matches.

If the character string after (right side of) ":" is found matching in step S74, then the URL and mail address filter 289 replaces the corresponding URL with the registration name in step S76, upon which the procedure returns to step S46 of FIG. 38.

If the character string before ":" is found not matching in step S73 or the character string after (right side of) ":" is found not matching in step S75, then the URL and mail address filter 289 determines in step S77 whether or not there still remain any unprocessed registered URLs in the URL and mail address table 290.

If there remain any unprocessed registered URLs in step S77, then the URL and mail address filter 289 selects a next URL from among the URLs registered in the URL and mail address table 290 in step S78, upon which the procedure returns to step S72 to repeat the above-mentioned processing therefrom. If there remains no unprocessed registered URL in step S77, it indicates that the URL and mail address table 290 stores no more name corresponding to any entered URL, so that the procedure returns to step S46 of FIG. 38.

Like the case of electronic mail address processing, matching may be performed on each character from the beginning of the text to determine whether or not the URL is registered one.

It will also be apparent that, if the URLs are registered as classified by protocol in the URL and mail address table 290 as shown in FIG. 19C, protocol matching may be performed before determining whether or not the URL is stored in the corresponding protocol.

Figure 41:
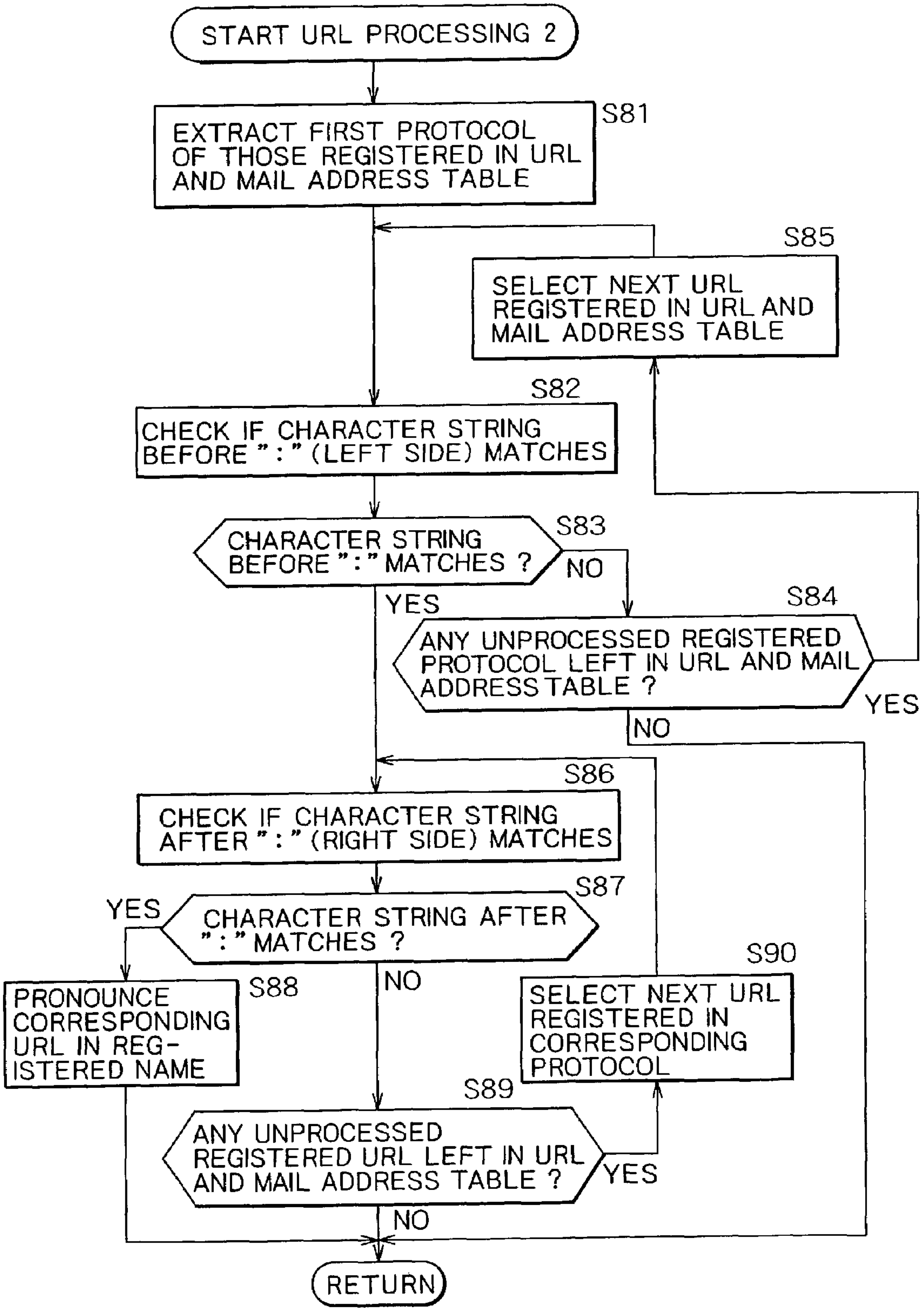
FIG. 41 is a flowchart describing URL processing 2.

The following describes URL processing 2 with reference to the flowchart of FIG. 41.

In step S81, the URL and mail address filter 289 extracts a first protocol ("http" in the case of FIG. 19C) from among the protocols registered in the URL mail address table.

In step S82, the URL and mail address filter 289 checks if the extracted protocol matches the character string before (left side of) ":" and determines, in step S83, whether or not the character string before ":" matches.

If the character string before ":" is found not matching in step S83, then the URL and mail address filter 289 determines in step S84 whether or not there remain any unprocessed registered protocols in the URL and mail address table 290.

If there remain any unprocessed registered protocols in step S84, then the URL and mail address filter 289 selects a next protocol registered in the URL and mail address table 290 in step S85, upon which the procedure returns to step S82 to repeat the above-mentioned processing therefrom.

If the character string before (left side of) ":" is found matching in step S83, then the same processing as in steps S74 through S76 is executed in steps S86 through S88.

If the character string after (right side of) ":" is found not matching in step S87, then the URL and mail address filter 289 determines whether or not there remain any unprocessed registered URLs in the URL group having the corresponding protocol in the URL and mail address table 290 in step S89.

If there remain any unprocessed registered URLs in step S89, then the URL and mail address filter 289 selects a next URL registered with the corresponding protocol in step S90, upon which the procedure returns to step S86 to repeat the above-mentioned processing therefrom.

If no unprocessed registered protocol is found remaining in step S84, then, if there remains no unprocessed registered URL in step S89 or after the end of processing of step S88, the procedure returns to step S46 of FIG. 38.

Consequently, the above-mentioned processing narrows the selection of registered URLs by protocol before performing URL matching, thereby saving the time required for performing the processing.

By the processing described above with reference to the flowcharts of FIGS. 38 through 41, if text data indicative of a URL or electronic mail address matching a registered URL or electronic mail address is supplied, the URL and mail address filter 289 replaces the URL or the electronic mail address with its registered name and outputs it to the mail watcher application control section 281. Therefore, the above-mentioned processing prevents the registered, or often used URLs or electronic mail addresses from being pronounced simply as strings of alphabetical letters, thereby eliminating the difficulties for the user to audibly understand pronounced speech data.

For example, if electronic mail address "info@abc.co.jp" written in the sender and body of the electronic mail message described with reference to FIG. 16 is converted into speech data and these speech data is pronounced letter by letter as "ai, en, ef, o, at, ei, bi, ci, . . . " for example, these speech data become meaningless (or difficult to understand) for the user. However, because this electronic mail address is registered in the mail address table described with reference to FIG. 19B, this electronic mail address is replaced with text data "abc Incorporated" as registered and then converted into speech data without pronouncing each of the letters of the mail address as it is or pronouncing the mail address in a plausible romanized manner. Consequently, the generated speech data become easily understandable for the user (not in reading but in listening).

In the above-mentioned example, the URLs or electronic mail addresses and their names are registered by the processing of the URL and mail address filter 289 into the URL and mail address table 290. Alternatively, by omitting the URL and mail address filter 289 and the URL and mail address table 290, the generally the same data as registered in the URL and mail address table 290 may be registered in the dictionary database 305 described with reference to FIG. 23 and generally the same processing as described above may be executed during the execution of a speech reproduction processing to be described later with reference to FIG. 42. In this case, the user can register URLs and electronic mail addresses by use of the "Add Words" window 441 described with reference to FIG. 30.

If the method of the text analysis used in the dictionary database 305 is a conventionally generally used matching of speech parts and the dictionary database 305 stores URLs or electronic mail addresses and their names as nouns and if a corresponding URL or electronic mail address is analyzed as another speech part, the speech data cannot be generated by registered names. To prevent such a problem from happening, if URLs or electronic mail addresses and their names are to be registered in the dictionary database 305, the items of URL or address for example may be used as speech parts at registration.

The following describes the speech reproduction processing to be executed in step S8 of FIG. 33 with reference to the flowchart shown in FIG. 42.

In this example, the speech reproduction processing is described in which the mail watcher application control section 281 reproduces speech data corresponding to electronic mail. It should be noted that basically the same speech reproduction processing is executed in step S158 of the mail reader processing to be described later with reference to FIG. 50, step s180 of the Web reader processing to be described later with reference to FIG. 55, and step S196 of the text pronunciation processing to be described with reference to FIG. 60.

In step S91, the pronunciation control section 301 of the pronunciation management module 288 determines whether or not a signal indicative of a user operation has been entered. If this signal is found not entered in step S91, the process of step S91 is repeated until the signal is entered.

In this example, the speech reproduction processing to be executed in step S8 of FIG. 33 is described, so that the signal indicative of user operation is entered from the mail watcher application control section 281. If the speech reproduction processing is executed in step S158 of the mail reader processing to be described later with reference to FIG. 50, the signal indicative of a user operation is entered from the mail reader application control section 531 to be described later with reference to FIG. 46. Likewise, if the speech reproduction processing is executed in step S180 of the Web reader processing to be described later with reference to FIG. 55 or in step S196 of the text pronunciation processing to be described later with reference to FIG. 60, the signal indicative of a user operation is entered from the Web reader application control section 591 to be described later with reference to FIG. 51 or the text pronunciation application control section 641 to be described later with reference to FIG. 57.

If the signal indicative of a user operation is found entered in step S91, then the pronunciation control section 301 determines on the basis of this signal whether or not a text acquisition command has been entered in step S92.

If the text acquisition command is found entered in step S92, then the pronunciation control section 301 generates a control signal for acquiring text data from the pronunciation text database 303 in step S93 and outputs the generated control signal to the text management section 302. The text management section 302 gets text data from the pronunciation text database 303 and outputs them to the pronunciation control section 301.

In step S94, the text analyzing section 306 receives the text data from the pronunciation control section 301 to analyze the received text data into words and refers to the dictionary data registered in the dictionary database 305 and the conversion rules registered in the conversion rule database 307 to generate a pronunciation symbol sequence (or meter information), outputting it to the speech synthesizing section 308.

In step S95, in accordance with the pronunciation symbol sequence supplied from the text analyzing section 306, the speech synthesizing section 308 generates synthetic speech data on the basis of the phoneme data registered in the phoneme database 309 and outputs the generated synthetic speech data to speech setting section 310. The speech setting section 310 adjusts the received synthetic speech data in accordance with the voice detail settings set by use of the setting levers 382 through 394 described with reference to FIG. 27 and generates the speech data to be used for reproduction. The generated speech data is supplied to the reproduction control section 311 to be stored in the speech database 312.

In step S96, the reproduction control section 311 sequentially retrieves the speech data from the speech database 312 and outputs the retrieved speech data to the speaker 65.

In step S97, the reproduction control section 311 determines whether or not the speech data have all been reproduced by checking if the speech data of the same chapter as that of the speech data under reproduction of these speech data stored in the speech database 312 still remain. If the speech data under reproduction are found all reproduced in step S97, the procedure returns to step S92 to repeat the above-mentioned processing therefrom.

If the speech data under reproduction are found not all reproduced in step S97, then the reproduction control section 311 determines on the basis of the control signal corresponding to the user operation entered from the pronunciation control section 301 whether or not a reproduction stop command has been issued in step S98. If a reproduction stop command is fount not issued in step S98, the procedure returns to step S96 to repeat the above-mentioned processing therefrom.

If the reproduction stop command is found issued in step S98, then the reproduction control section 311 stops the reproduction in step S99, namely stops the outputting of the speech data recorded to the speech database 312 to the speaker. After the end of the process in step S99, the procedure returns to step S92 to repeat the above-mentioned processing therefrom.

If the text acquisition command is found not issued in step S92, then the pronunciation control section 301 determines whether or not an end command has been issued in step S100.

In this example too, the speech reproduction processing to be executed in step S8 of FIG. 33 is described, so that an end command is issued from the mail watcher application control section 281 in accordance with the signal indicative of a user operation supplied from the GUI control section 283. If the speech reproduction processing is executed in step S158 of the mail reader processing to be described later with reference to FIG. 50, the signal indicative of a user operation is entered from the mail reader application control section 531 to be described later with reference to FIG. 46. Likewise, if the speech reproduction processing is executed in step S180 of the Web reader processing to be described later with reference to FIG. 55 or step S196 of the text pronunciation processing to be described with reference to FIG. 60, the signal indicative of a user operation is entered from the Web reader application control section 591 to be described later with reference to FIG. 51 or the text pronunciation application control section 641 to be described later with reference to FIG. 57.

If the end command is found not issued in step S100, then the procedure returns to step S92 to repeat the above-mentioned processing therefrom. If the end command is found issued in step S100, then the procedure comes to an end (the procedure comes to an end if the speech reproduction processing is executed in step S158 of FIG. 50 to be described later, the procedure comes to an end if the speech reproduction processing is executed in step S180 of FIG. 55 to be described later, and the procedure goes to step S197 of FIG. 60 if the speech reproduction processing is executed in step S196 of FIG. 60 to be described later).

By the above-mentioned processing, the speech data obtained from text data is reproduced in accordance with a user operation.

Alternatively, URLs or mail addresses and their names may be registered in the dictionary database 305, the registration of a particular URL or mail address may be determined during speech reproduction processing, and the URL or mail address found registered may be replaced with its name by the text analyzing section 306. In this case, the filter processing described with reference to FIG. 38 is executed in step S94.

The following describes the external device output processing to be executed in step S10 of FIG. 33 with reference to the flowchart of FIG. 43.

In this example, the mail watcher application control section 281 outputs the speech data corresponding to electronic mail to an external device will be described. Basically the same external device output processing is executed in step S160 of the mail reader processing to be described with reference to FIG. 50, step S182 of the Web reader processing to be described with reference to FIG. 55, and step S199 of the text pronunciation processing to be described with reference to FIG. 60, for example.

In step S111, the pronunciation control section 301 generates a control signal for detecting an external output device (including an external storage device such as the Memory Stick 131) in a state communicable with the personal computer 2 and outputs the generated control signal to the external device output section 315. The external device output section 315 searches for the speech storage apparatus 294 (for example, the Memory Stick 131, the PDA 4, the camera-mounted digital mobile phone 5, or the mobile music reproducing apparatus 271) which is ready for transferring data with the external device output module 293 and outputs a search result to the pronunciation control section 301.

In step S112, the pronunciation control section 301 determines on the basis of the signal supplied from the external device output section 315 whether or not an external device to which speech data is to be outputted has been detected in step S111.

If an external output device is found detected in step S112, then the pronunciation control section 301 determines in step S113 whether or not two or more external output devices have been detected.

If the number of external devices detected in step S111 is found plural in step S113, then the pronunciation control section 301 generates a control signal for displaying a selection screen for selecting the detected external devices and outputs the control signal to the GUI control section 283 via the mail watcher application control section 281 in step S114. The GUI control section 283 outputs the external device selecting screen to the LCD 25 for display, receives a signal indicative of a user operation done on the jog dial 23, the keyboard 24, or the touchpad 26 for example to select the devices, and outputs the received user operation signal to the mail watcher application control section 281.

In this example, it is assumed that the external device output processing be executed in step S10 shown in FIG. 33, so that the control signal for displaying the external device selecting screen is outputted to the GUI control section 283 via the mail watcher application control section 281 in step S113. If the external device output processing is executed in step S160 of FIG. 50 to be described later, the control signal for displaying the external device selecting screen is outputted to a GUI control section 533 via the mail reader application control section 531 to be described later with reference to FIG. 46; if the external device output processing is executed in step S182 of FIG. 55 to be described later, the control signal for displaying the external device selecting screen is outputted to a GUI control section 593 via the Web reader application control section 591 to be described later with reference to FIG. 51; and if the external device output processing is executed in step S199 of FIG. 60 to be described later, the control signal for displaying the external signal selecting screen is outputted to a GUI control section 642 via the text pronunciation application control section 641 to be described later with reference to FIG. 57.

In step S115, the pronunciation control section 301 sets value N of its internal register for external device selection to N="ID of user selected device."

If the number of devices detected in step S111 is determined not plural but only one in step S113, then the pronunciation control section 301 sets value N of its internal register for external device selection to N=0. If register value N=0, it indicates that there is only one external device to which speech data can be outputted.

After the end of the processing in step S115 or step S116, the pronunciation control section 301 selects the external device indicated by register value N in step S117.

In step S118, the pronunciation control section 301 determines whether or not the display of a dialog box for making confirmation of the deletion of past data is set, namely whether or not the check box 461 was checked in the setting screen 331 described with reference to FIG. 31.

Figure 44:
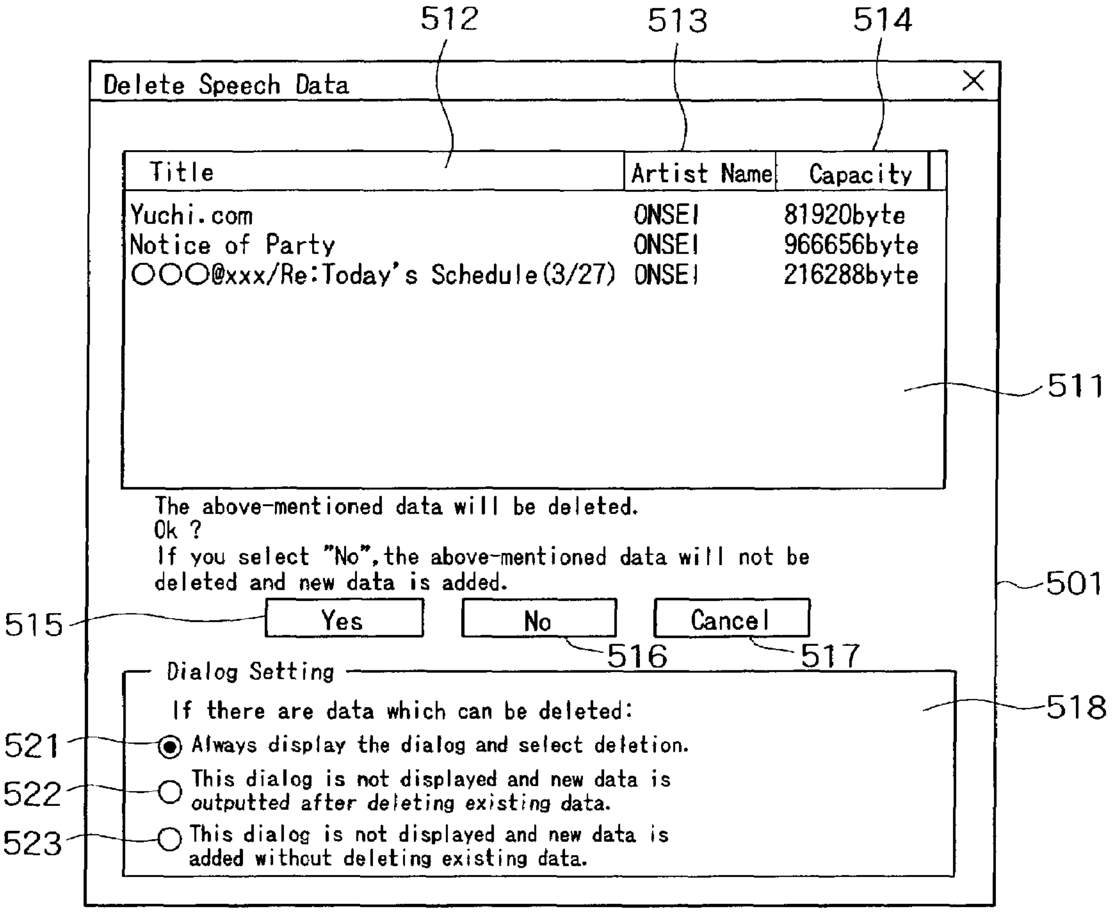
FIG. 44 is a diagram illustrating a dialog box.

If the dialog box for making confirmation of the display of the deletion of past data is found set in step S118, then the pronunciation control section 301 displays a dialog box 501 shown in FIG. 44 in step S119 to receive a user operation signal.

FIG. 44 shows an exemplary display of the dialog box 501. A display area 511 displays a list of data with artist name being "ONSEI" of the information recorded to a music data output external device or a recording medium. The display area displays three items of title 512, artist name 513, and capacity 514.

The data with the artist name 513 being "ONSEI" are not only the speech data generated by the mail watcher application processing but also the speech data generated by the mail reader application processing, the Web reader application processing or the text pronunciation application processing to be described later. The title 512 shows titles determined in steps S24 of the pronunciation voice setting processing described with reference to FIG. 36.

When the user selects "YES" button 515, the data with the artist name being "ONSEI" displayed in the display area 511 are deleted from the corresponding speech storage apparatus 294 and new speech data is recorded instead.

When the user selects "NO" button 516, the data with the artist name being "ONSEI" are not deleted from the corresponding speech storage apparatus 294 and new speech data is recorded to a free area of this apparatus.

When the user selects "CANCEL" button 517, the command for outputting speech data to the external device is canceled and the dialog box 501 is deleted.

A dialog setting area 518 has radio buttons 521 through 523 for making the settings for the display of the dialog box 501. Only one of the radio buttons can be selected.

When the radio button 521 is selected, the dialog box 501 is always displayed if the speech storage apparatus 294 has the data which can be deleted in the next external device output processing and it is determined whether or not deletable data is deleted by a user operation. When the ratio button 522 is selected, if the speech storage apparatus 294 has the deletable data, the dialog box 501 is not displayed and new speech data is recorded after deleting the deletable data in the next external device output processing. When the radio button 523 is selected, the dialog box 501 is not displayed even if the speech storage apparatus 294 has deletable data and new speech data is additionally recorded without deleting the deletable data.

If the display of the dialog box for making confirmation of the deletion of past data is found not set in step S118 or after the end of the process of step S119, the pronunciation control section 301 determines on the basis of the setting by the dialog setting area 518 in the dialog box 501 described with reference to FIG. 44 or user input operation entered in step S119 whether or not it is necessary to delete past data in step S120.

Figure 45:
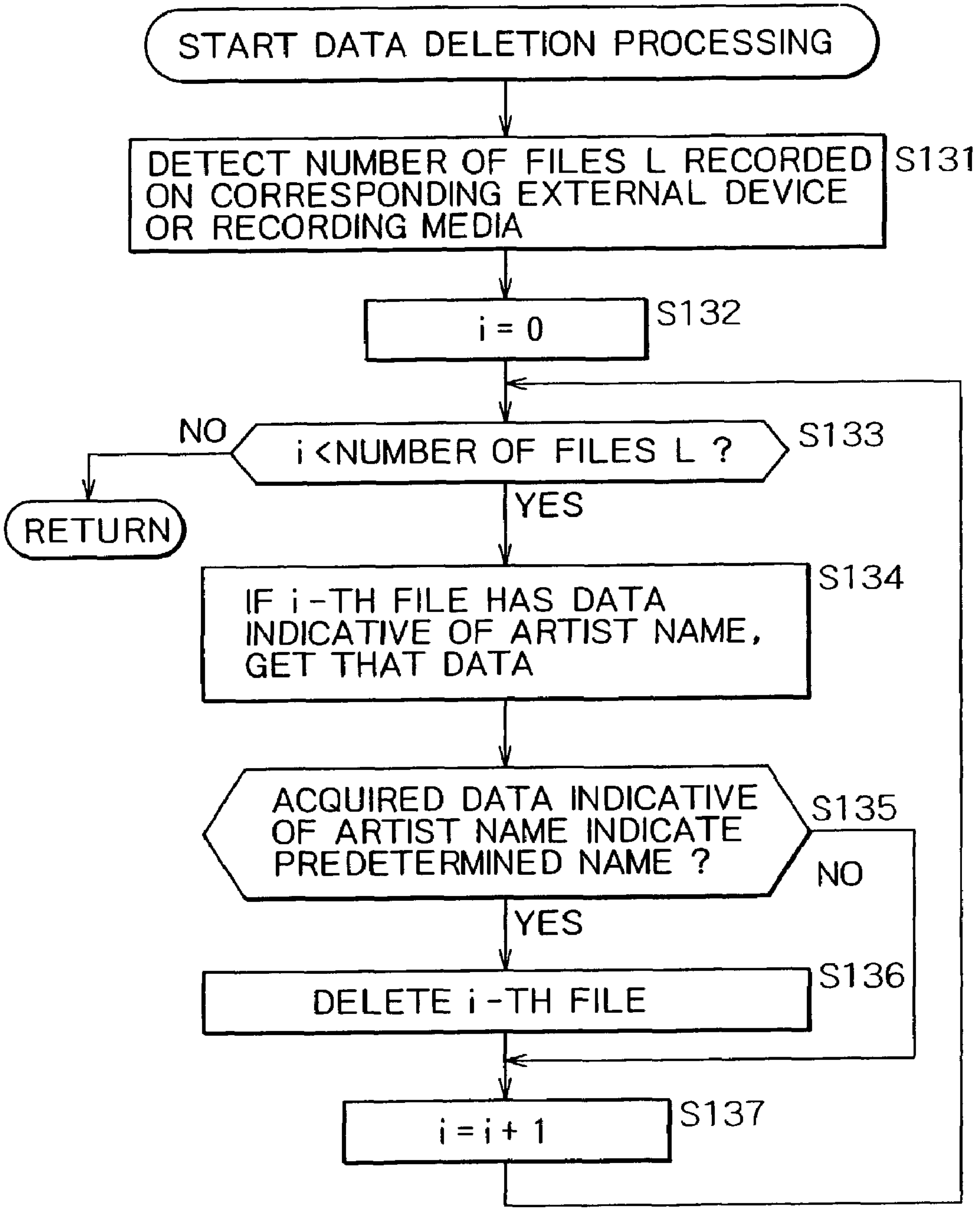
FIG. 45 is a flowchart describing data deletion processing.

If the deletion of past data is found necessary in step S120, then the data deletion processing to be described later with reference to FIG. 45 is executed in step S121.

If the deletion of past data is found unnecessary in step S120 or after the end of the process of step S121, the pronunciation control section 301 converts, in step S122, the format of the speech data into the format of the speech storage apparatus 294, which is an external device to which the speech data is outputted.

Namely, the pronunciation control section 301 generates a control signal for outputting the speech data specified for outputting and recorded in the speech database 312 to the data converting section 314 via the external device output section 315, outputs the generated control signal to reproduction control section 311, generates a control signal for converting the format of the speech data into the format of the speech storage apparatus 294, and outputs this control signal to the data converting section 314. In accordance with the supplied control signal, the reproduction control section 311 retrieves the speech data from the speech database 312 and outputs the retrieved speech data to the data converting section 314 via the external device output section 315. The data converting section 314 transfers information with the external device output module 293 as required and converts the format of the supplied speech data into the corresponding data format, outputting the resultant speech data to the external device output section 315.

In step S123, the external device output section 315 outputs the converted speech data to the external device, namely the speech storage apparatus 294 via the external device output module 293, upon which the procedure comes to an end.

If an external output device is found not detected in step S112, then the pronunciation control section 301 generates a control signal for outputting an error message and outputs this control signal to the GUI control section 283 via the mail watcher application control section 281 in step S124. The GUI control section 283 displays the error message on the LCD 25, upon which the procedure comes to an end.

In this example, the external device output processing is executed in step S10 of FIG. 33, so that the control signal for displaying an error message in step S124 is outputted to the GUI control section 283 via the mail watcher application control section 281. If the external device output processing is executed in step S160 of FIG. 50 to be described later, the control signal for displaying an error message is outputted to the GUI control section 533 via the mail reader application control section 531 to be described later with reference to FIG. 46. If the external device output processing is executed in step 182 of FIG. 55 to be described later, the control signal for displaying an error message is outputted to the GUI control section 593 via the Web reader application control section 591 to be described later with reference to FIG. 51. If the external device output processing is executed in step S199 of FIG. 60 to be described later, the control signal for displaying an error message is outputted to the GUI control section 642 via the text pronunciation application control section 641 to be described later with reference to FIG. 57.

In this example, the external device output processing is executed in step S10 of FIG. 33, so that the procedure comes to an end after the process of step S123 or S124. If the external device output processing is executed in step S160 of FIG. 50, step S182 of FIG. 55, or step S199 of FIG. 60 to be described later, the procedure also comes to an end.

Consequently, the speech data generated from text data is outputted to an external device or recording medium such as the speech storage apparatus 294, namely the Memory Stick 131, the PDA 4, the camera-mounted digital mobile phone 5 or mobile music reproducing apparatus 271 to be recorded therein.

The following describes data deletion processing to be executed in step S121 of FIG. 43 with reference to the flowchart shown in FIG. 45.

In step S131, the external device output section 315 detects the number of files L recorded to an external device or a recording medium such as the speech storage apparatus 294, namely the Memory Stick 131, the PDA 4, the camera-mounted digital mobile phone 5, or the mobile music reproducing apparatus 271 via the external device output module 293.

In step S132, the external device output section 315 sets value i of the register indicative of the number of music titles being deleted to i=0 and, in step S133, determines whether or not register value i is i<the number of files L.

If register value i is found i<the number of files L in step S133, then, if i-th file has data indicative of artist name, the external device output section 315 gets these data in step S134.

In step S135, the external device output section 315 determines whether or not the data indicative of artist name acquired in step S134 indicate a predetermined name (in this example, "ONSEI").

If the data indicative of artist name are found having a predetermined name in step S135, then the external device output section 315 deletes the i-th file in step S136.

If the data indicative of artist name are found not having a predetermined name in step S135 or after the end of the process of step S136, the external device output section 315 sets register value i to i=i+1, upon which the procedure returns to step S133 to repeat the above-mentioned processing therefrom.

If register value i is found not i<the number of files L in step S133, namely if the processing has been completed on all files, the procedure returns to step S122 of FIG. 43.

Figure 46:
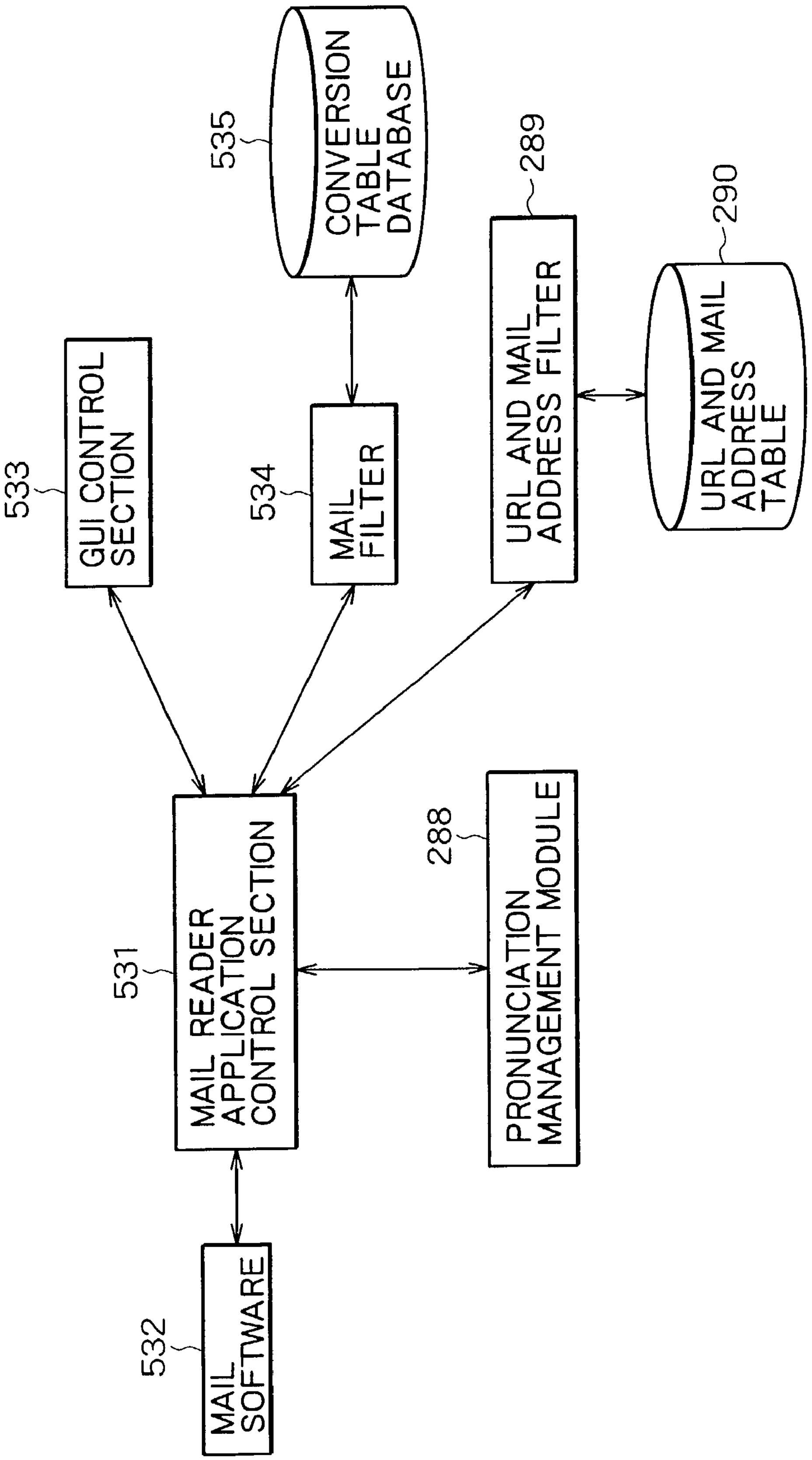
FIG. 46 is a block diagram illustrating functional relationship when a mail reader application is operating.

FIG. 46 shows a functional block diagram illustrating the processing to be executed by the CPU 51 when the mail reader application of the application programs 67H stored in the HDD 67 is loaded in the RAM 54 as described with reference to FIG. 6.

If the mail software 532 (may not be a MAPI-compliant mailer) corresponding to the electronic mail program 67A is active, the mail reader application control section 531 reads in electronic mail data as specified by the user and, on the basis of user settings supplied from the GUI control section 533, and executes various processing operations.

It should be noted that, before the mail reader application control section 531 executes various processing operations, the mail software 532 must be in the active state (namely, the electronic mail program 67A must have been loaded in the RAM 54 and executed by the CPU 51).

Under the control of the mail reader application control section 531, the GUI control section 533 controls the display of GUI such as the dialog boxes and display windows for making various settings of the mail reader application to be described later, generates a signal indicative of a user operation done for the displayed GUI, and supplies the generated signal to the mail reader application control section 531.

A mail filter 534 executes generally the same processing as the mail filter of the mail watcher application control section 281 described with reference to FIG. 15 to filter the body of electronic mail having text format on the basis of the conversion table written to a conversion table database 535.

The conversion table database 535 stores such symbols to be added, when returning received electronic mail or transferring electronic mail, to indent portions in order to indicate quotations in the body of electronic mail as ">", "|", and ":" for example. The information stored in the conversion table database 535 may be the same as or different from the information stored in the conversion table database 285. Namely, the information stored in the conversion table database 535 and the conversion table database 285 is determined by the types of symbols which can be used for indent setting in return mail in the setting of the mail software 352 corresponding to these databases.

The mail filter 534 executes basically the same processing as the mail filter of the mail watcher application control section 281 described with reference to FIG. 15. To be more specific, on the basis of the symbols to be added to each line of supplied electronic mail body and the number of symbols, the mail filter 534 classifies the received mail body (by marking for example) into portions written by the same person. For example, if an electronic mail message shown in FIG. 16 is supplied, the mail filter 534 divides the body into text A which is the first portion (in this example, a portion written by the sender) of the electronic mail body, text B (a quoted sentence) different from text A, text C (the number of quotations is different from that of text B) different from text B, text D (the number of quotations is different from that of text C) different from text C, and text E (in this example, a portion written by the sender) different from text D.

The pronunciation management module 288, the URL and mail address filter 289, and URL and mail address table 290 are the same as those described with reference to FIG. 15, so that their descriptions will be skipped.

Figure 47:
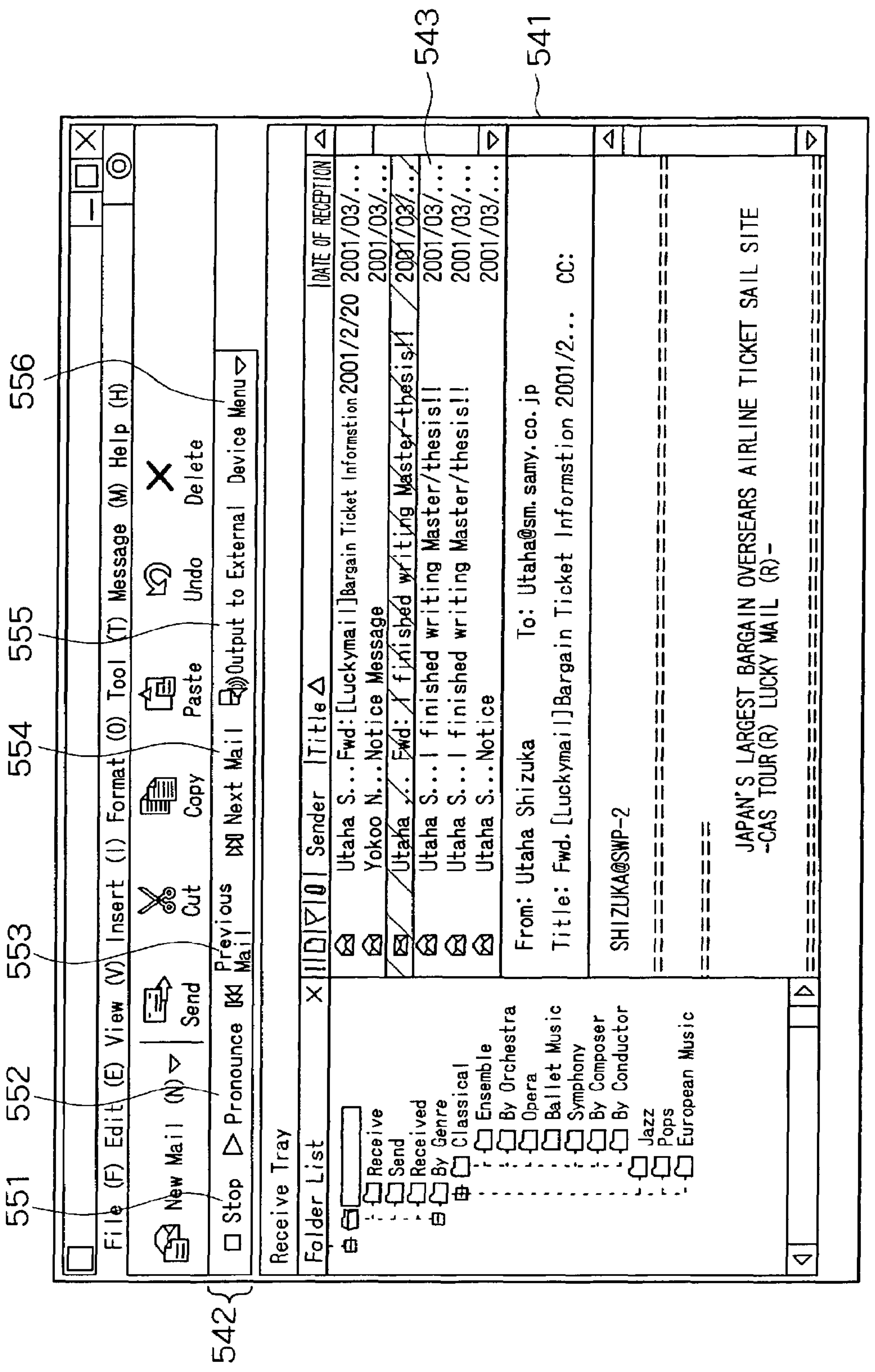
FIG. 47 is a diagram illustrating a mail software display screen with a mail reader tool bar displayed.

A display screen to be displayed when the mail software 532 and the mail reader application are in the active state is shown in FIG. 47.

In addition to the normal display screen components of the mail software 532, the display screen 541 has a mail reader too bar 542 which contains various buttons for audibly reproducing an electronic mail message (one or more mail messages) of the electronic mail messages shown in the electronic mail list display area 543 in the folder or various buttons for outputting speech data to external devices.

A stop button 551 is selected to stop reproducing speech data. A pronounce button 552 is operated to pronounce the selected electronic mail message. Namely, this button is selected when reproducing speech data. A previous mail button 553 is operated to reproduce an electronic mail message preceding to the currently reproduced or paused mail. A next mail button 554 is operated to reproduce an electronic mail message subsequent to the currently reproduced or paused mail.

An "Output to External Device" button 555 is operated to output the speech data corresponding to a selected electronic mail message to the speech storage apparatus 294 for recording therein by the same processing as described with reference to FIG. 43. A menu button 556 is operated to display a list box including various menus for specifying operations for displaying a setting window 561 to be described with reference to FIG. 48.

When the menu button 556 is selected, a list box containing various menus including "Settings" item is displayed. When the user selects "Settings" item, a signal indicative of the user operation is supplied from the GUI control section 533 to the mail reader application control section 531. The mail reader application control section 531 generates a control signal for displaying the setting window 561 shown in FIG. 48 and outputs the generated control signal to the GUI control section 533 to display the setting window 561.

Unlike the setting window 331 described with reference to FIGS. 25 through 32, the setting window 561 shown in FIG. 48 has only two types of display screens, so that there are only two tabs, a "Pronounce" tab 571 and an "Output to External Device/Media" tab 572.

Figure 48:
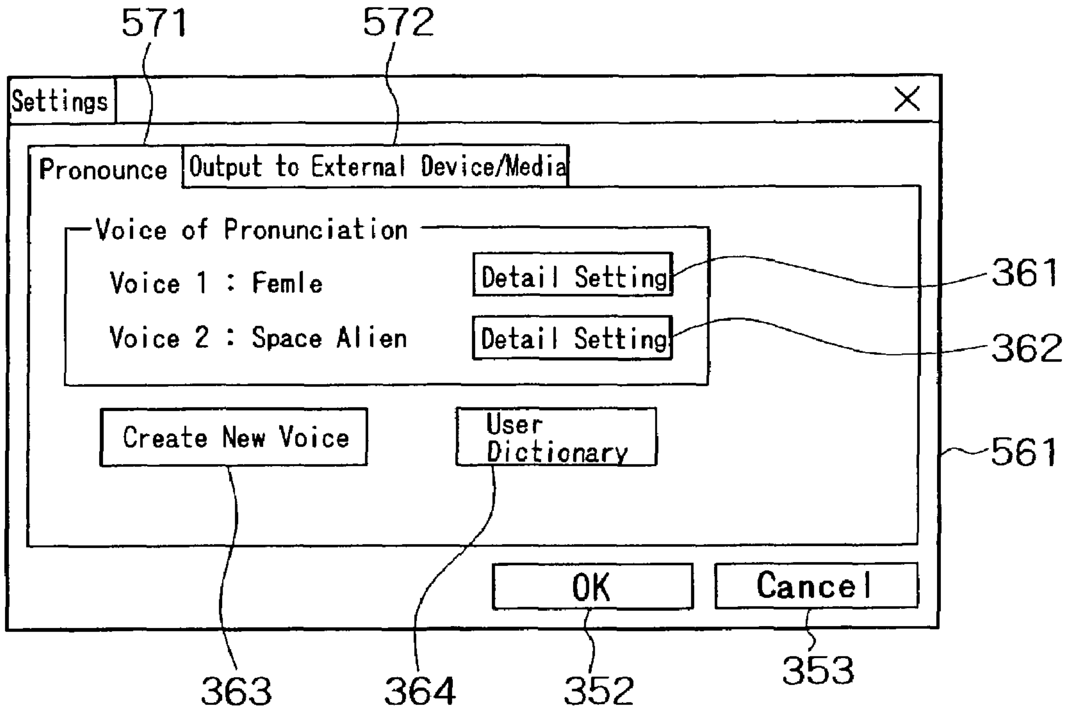
FIG. 48 is a diagram illustrating a setting window to be displayed when the "Pronounce" tab is selected.

FIG. 48 shows the setting window 561 with the "Pronounce" tab 571 selected. An OK button 352, a cancel button 353, detail setting buttons 361 and 362, a create new voice button 363, and a user dictionary button 364 are basically the same as those described with reference to FIG. 26, so that their descriptions will be skipped.

Figure 49:
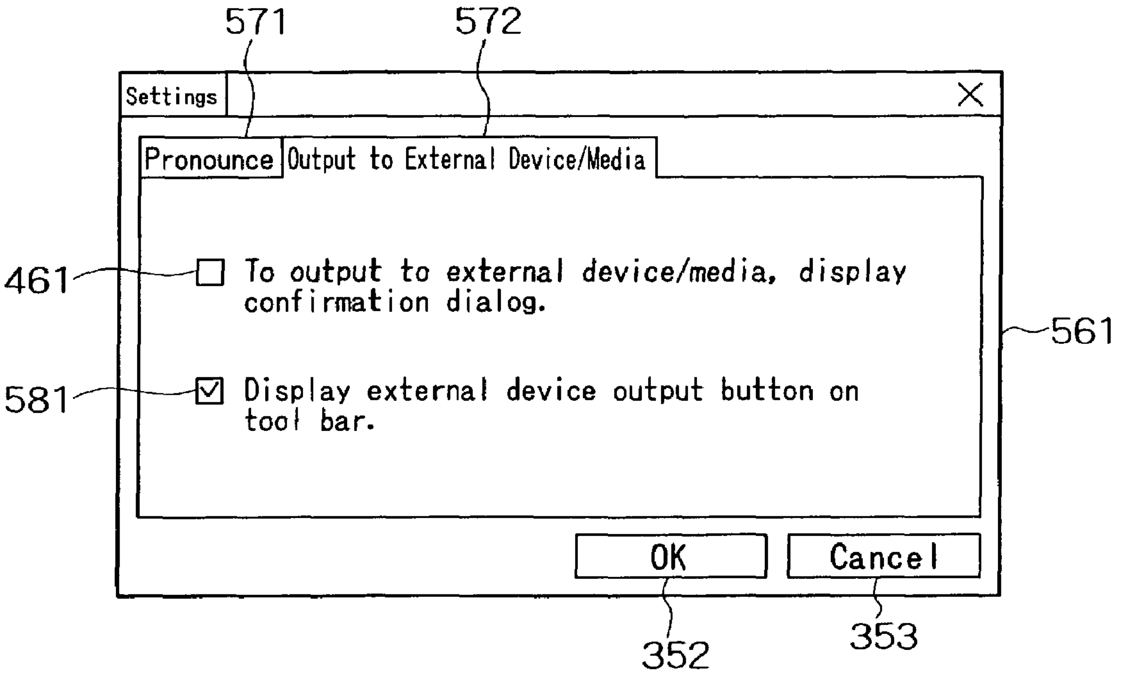
FIG. 49 is a diagram illustrating a setting window to be displayed when the output-to-external-device/media tab is selected.

FIG. 49 shows the setting window 561 with the "Output to External Device/Media" tab 572 selected. A check box 461 displayed in this case is basically the same as described with reference to FIG. 31, so that its description will be skipped. When the check box 581 is checked, the "Output to External Device" button 555 described with reference to FIG. 47 is displayed in the tool bar 542; if this check box is not checked, the "Output to External Device" button 555 is not displayed in the tool bar 542.

The following describes the processing to be executed by the CPU 51 when the mail reader application is loaded in the RAM 54 with reference to the flowchart shown in FIG. 50.

In step S151, the mail reader application control section 531 determines on the basis of a signal indicative of user operation supplied from the GUI control section 533 whether or not a command for audibly reproducing electronic mail or a command for outputting speech data to an external device has been issued by the user, namely whether or not the pronunciation button 552, the previous mail button 553, the next mail button 554, or the "Output to External Device" button 555 has been operated by the user. If none of these commands is found not issued in step S151, the process of step S151 is repeated until any of these commands is issued.

If any of these commands is found issued in step S151, then the mail reader application control section 531 counts, in step S152, on the basis of the signal indicative of user operation supplied from the GUI control section 533, the number of selected electronic mail messages M of the electronic mail messages displayed in the list display area 543 of the mail software display screen 541 and records M to its internal register. For example, in the state shown in FIG. 47, the number of selected electronic mail messages is M=1.

In step S153, the mail reader application control section 531 determines whether or not register value M is M>0.

If register value M is found M>0 in step S153, then the pronunciation setting processing described with reference to the flowchart of FIG. 36 is executed in step S154.

In step S155, the mail reader application control section 531 sets register value M to M=M−1, upon which the procedure returns to step S153.

If register value M is found not M>0 in step S153, then the mail reader application control section 531 determines in step S156 whether or not the command issued by the user in step S151 is for reproduction of electronic mail in voice.

If the command from the user is found to be for the reproduction of electronic mail in voice in step S156, then the mail reader application control section 531 generates a control signal for requesting the reproduction of speech data and outputs the generated control signal to the pronunciation management module 288 in step S157.

In step S158, the speech reproduction processing described with reference to the flowchart of FIG. 41 is executed, upon which the procedure comes to an end.

If the command from the user is found not for the reproduction of electronic mail in voice in step S156, it indicates that the command is for outputting speech data to an external device, so that, in step S159, the mail reader application control section 531 generates a control signal for requesting the outputting of corresponding speech data to an external device and outputs this control signal to the pronunciation management module 288.

In step S160, the external device output processing described with reference to the flowchart of FIG. 43 is executed, upon which the procedure comes to an end.

As described with reference to FIG. 50, the information of an electronic mail message of the electronic mail messages received by the mail software 532 by the processing of the mail application is converted into speech data to be reproduced or outputted to an external device.

At this moment, in the filter processing to be executed in the pronunciation voice setting processing in step S154, a text matching a registered URL or electronic mail address is replaced with a predetermined name and the resultant text is converted into speech data.

In this processing also, the title of the speech data to be outputted to an external device is not set by the user but it is set as a title by selecting predetermined information such as a title of the electronic mail. It should be noted that in this case also, likewise the processing of the mail watcher application described above, the user may select the information for determining the title.

Figure 51:
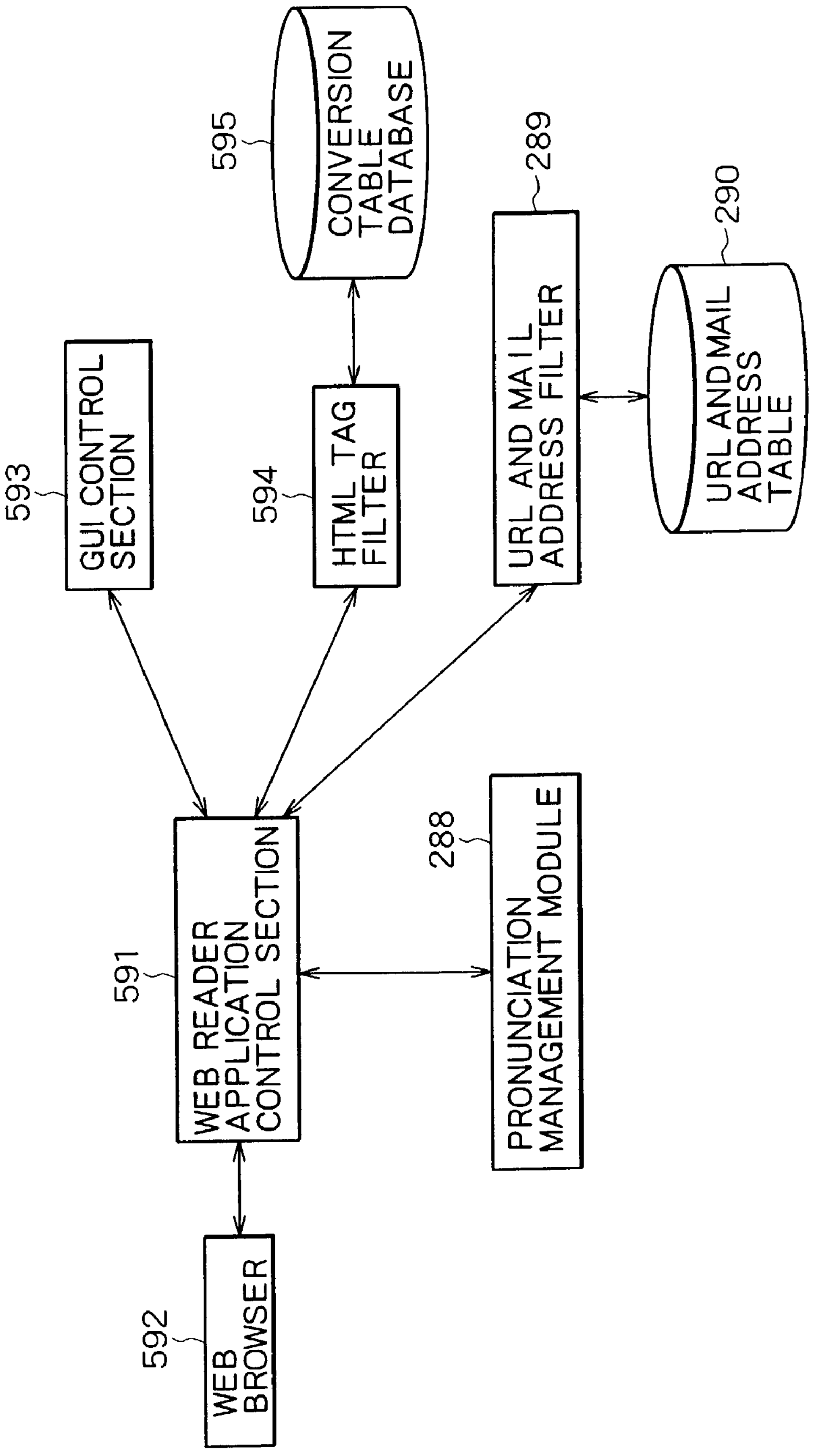
FIG. 51 is a block diagram illustrating functional relationship when a Web reader application is operating.

FIG. 51 shows a functional block diagram illustrating the processing by the CPU 51 when the Web reader application of the application programs 67 stored in the HDD 67 described with reference to FIG. 6 is loaded in the RAM 54 in the personal computer 2.

If a Web browser 592 (the Web browser 67G of FIG. 6) is active, the Web reader application control section 591 reads in the data of the displayed Web page (the data written in a markup language such as HTML) as specified by the user and executes various processing operations on the basis of user settings supplied from the GUI control section 593.

It should be noted that the Web browser 592 must be active for the Web reader application control section 591 to execute processing (namely, the Web browser 67G must have been loaded in the RAM 54 and executed by the CPU 51).

Under the control of the Web reader application control section 591, the GUI control section 593 controls the GUI displaying of dialog boxes and display windows necessary for performing various settings of the Web reader application to be described later, generates a signal indicative of user operations done for the displayed GUI, and outputs this signal to the Web reader application control section 591.

A HTML tag filter 594 filters the HTML data supplied from the Web reader application control section 591 on the basis of the conversion table stored in a conversion table database 595.

FIG. 52 shows an exemplary Web page data (a Web page source) written in HTML.

In the Web page source shown in FIG. 52, a portion enclosed by <HTML> and </HTML> indicates the entire source written in HTML. A portion enclosed by <HEAD> and </HEAD> (a portion indicated by L in the figure) indicates the header of this Web page.

Although abbreviated in FIG. 52, a portion enclosed by <body bgcolor="#BDFFFF" link="#0000FF" vlink="#800080"> and </body> indicates a main body of a Web page, and a portion enclosed by <p align="display position"> indicates a paragraph in the body. Each tag is indicated as enclosed by < >, so that a portion not enclosed by < > indicate a text data portion.

On the basis of the conversion table stored in the conversion table database 595, the HTML tag filter 594 refers to the HTML tags (the description enclosed by < >), separates the body from the header for example, divides the body into paragraphs, and executes the processing for converting the data into those which can be processed by the pronunciation management module 288. Another conversion method may be used by changing the conversion table stored in the conversion table database 595.

In this example, the Web page is written in HTML. It will be apparent that any Web page written in another markup language may also be processed in the same manner by preparing a corresponding conversion table in the conversion table database 595.

The pronunciation management module 288, the URL and mail address filter 289, and URL and mail address table 290 are the same as those described with reference to FIG. 15, so that their descriptions will be skipped.

Figure 53:
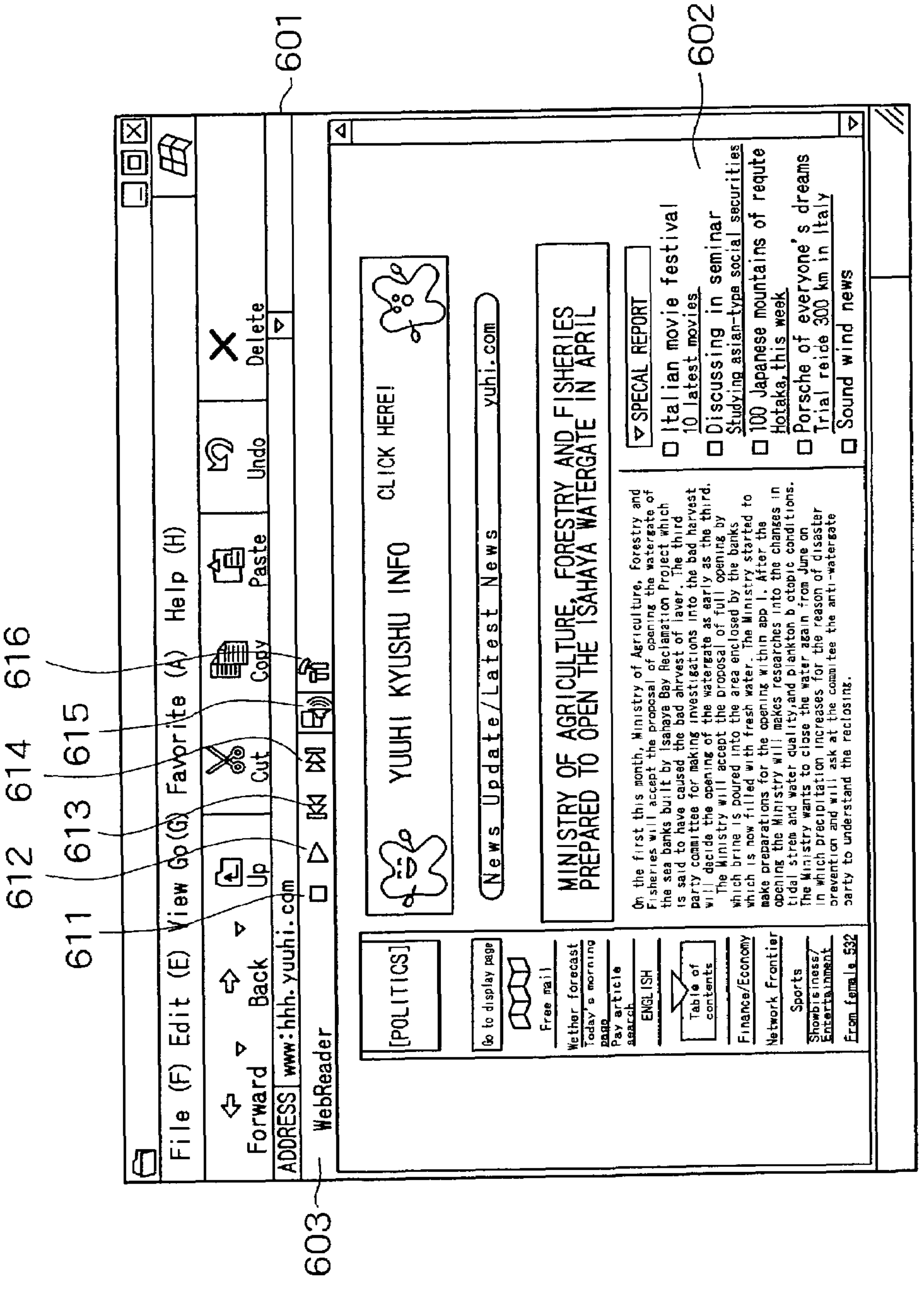
FIG. 53 is a diagram illustrating a Web browser display window with a Web reader tool bar displayed.

FIG. 53 shows a display screen with the Web browser 592 in the active state.

A Web browser display window 601 has a display area 602 for displaying a Web page and a Web reader tool bar 603 in addition to the normal tool bar of the Web browser. If voice reproduction is not being executed, the Web reader tool bar 603 has a stop button 611, a play button 612, a rewind button 613, a fast-forward button 614, an "Output to External Device" button 615, and a setting button 616.

If the play button 612 is selected by the user with none of the text data displayed in the display area 602 selected, the text data displayed in the display area are sequentially reproduced until the text data have all been reproduced or the stop button 611 is operated. When the user selects the text data displayed in the display area 602 and operates the play button 612, only the selected text is reproduced as speech data.

When the rewind button 613 or the fast-forward button 614 is selected, the reproduction position of the speech data is changed. When the "Output to External Device" button 615 is selected, the corresponding speech data is outputted to the speech storage apparatus 294 such as the Memory Stick 131 for example to be recorded therein.

Figure 54:
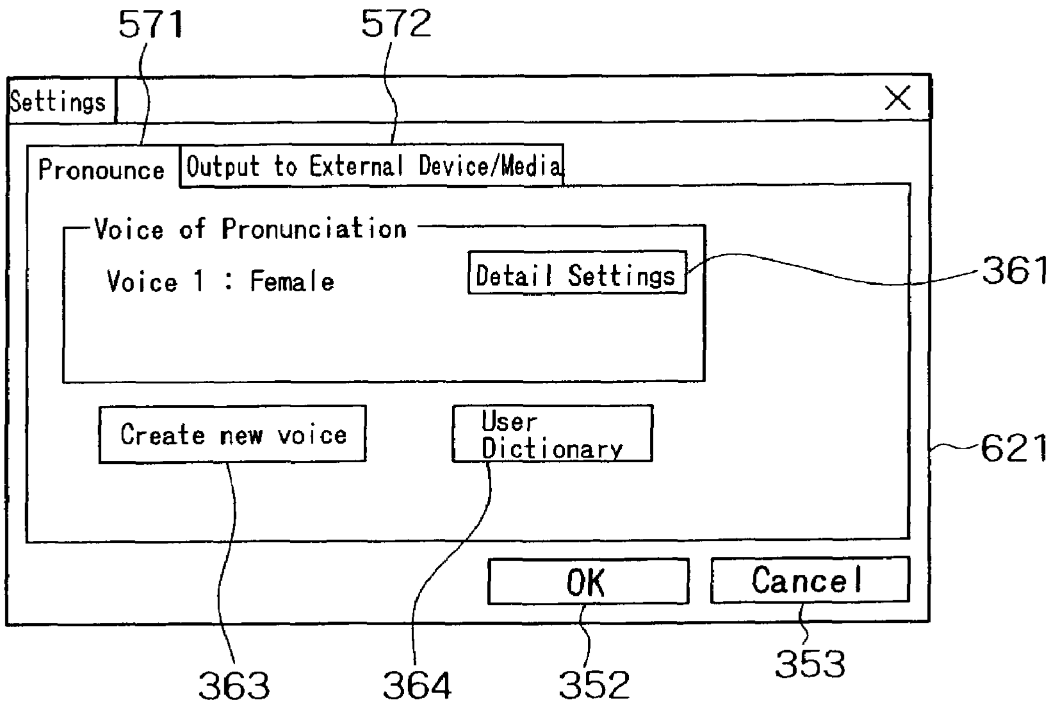
FIG. 54 is a diagram illustrating a setting window to be displayed when the "Pronounce" tab is selected.

When the setting button 616 is selected, a setting window 621 shown in FIG. 54 is displayed. FIG. 54 shows the setting window 621 displayed when the "Pronounce" tab 571 is selected. An OK button 352, a cancel button 353, a detail setting button 361, a create new voice button 363, and a user dictionary button 364 are the same as those described with reference to FIG. 26, so that their descriptions will be skipped. Namely, when the text data of a Web page are converted into the speech data by the Web reader application, the type of voice of the speech data is converted only into one type that is set, so that voice 2 is not set. The setting window 621 when the output to "Output to External Device/Media" tab 572 is selected is basically the same as the setting window 561 described with reference to FIG. 49, so that its description will be skipped.

Figure 55:
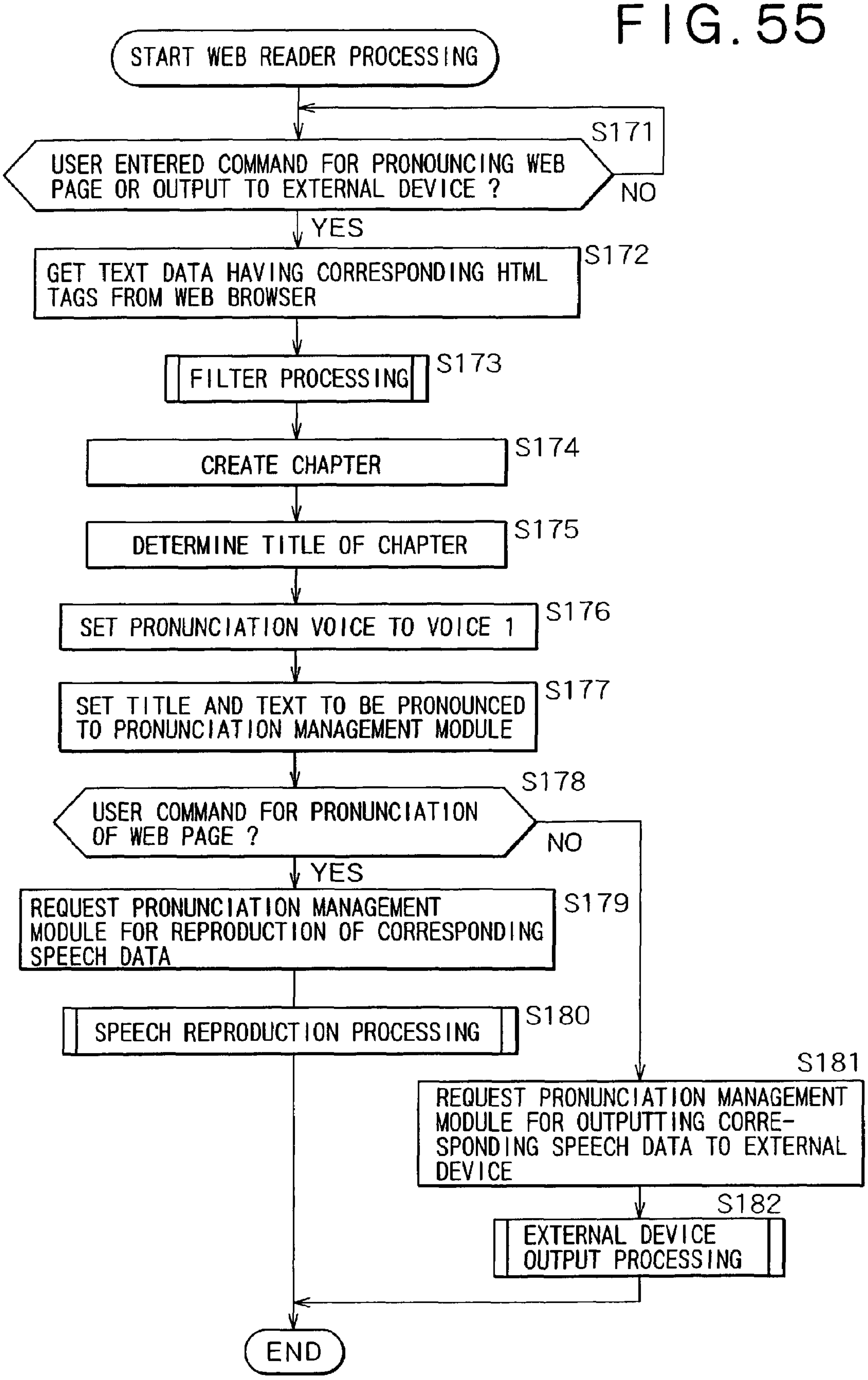
FIG. 55 is a flowchart describing Web reader processing.

The following describes the processing to be executed by the CPU 51 when the Web reader application is loaded in the RAM 54 with reference to the flowchart shown in FIG. 55.

In step S171, on the basis of a signal indicative of a user operation entered from the GUI control section 593, the Web reader application control section 591 determines whether or not the user has selected the play button 612 or the "Output to External Device" button 615, namely whether or not the user has issued a command for reproducing voice of Web page or outputting speech text to an external device. If the command for the reproduction or the outputting is found not issued in step S171, the process of step S171 is repeated until this command is issued.

If the above-mentioned command is found issued in step S171, then the Web reader application control section 591 gets the corresponding HTML-tagged text data from the Web browser in step S172.

In step S173, the filter processing described with reference to FIG. 38 is executed.

In step S174, the Web reader application control section 591 outputs the acquired data to the HTML tag filter 594. The HTML tag filter 594 filters the received data and outputs the filtered data to the Web reader application control section 591. Namely, on the basis of the HTML tags of the Web page described with reference to FIG. 52, the HTML tag filter 594 extracts as a Web page title the text enclosed by <title> and </title> from the header data (a portion indicated by L in FIG. 52) and outputs the extracted portion to the Web reader application control section 591. On the basis of the filtered data supplied from the HTML tag filter 594, the Web reader application control section 591 creates a chapter. A chapter is one unit of information providing one piece of speech data (equivalent to one file of speech data) and one chapter is created by one Web page.

In step S175, on the basis of the filtered data, the Web reader application control section 591 determines a chapter title, namely a music title in music data, and information corresponding to an artist name. In this example, the artist name is "ONSEI" to make distinction between other information and the speech data created by the mail watcher application. The title is determined by referring to the corresponding Web page title.

In step S176, the Web reader application control section 591 sets the pronunciation voice set by the setting window 621 described with reference to FIG. 54 to voice 1. In step S177, the Web reader application control section 591 sets (namely outputs) the determined title and pronunciation text to the pronunciation management module 288.

In step S178, the Web reader application control section 591 determines whether or not the command from user detected in step S171 is for the reproduction of Web page in voice.

If the command from the user is found for the reproduction of Web page in voice in step S178, then the Web reader application control section 591 generates a signal for requesting the pronunciation management module 288 to reproduce the speech data and outputs this signal to the pronunciation management module 288 in step S179.

In step S180, the speech reproduction processing described with reference to FIG. 36 is executed, upon which the procedure comes to an end.

Figure 56:
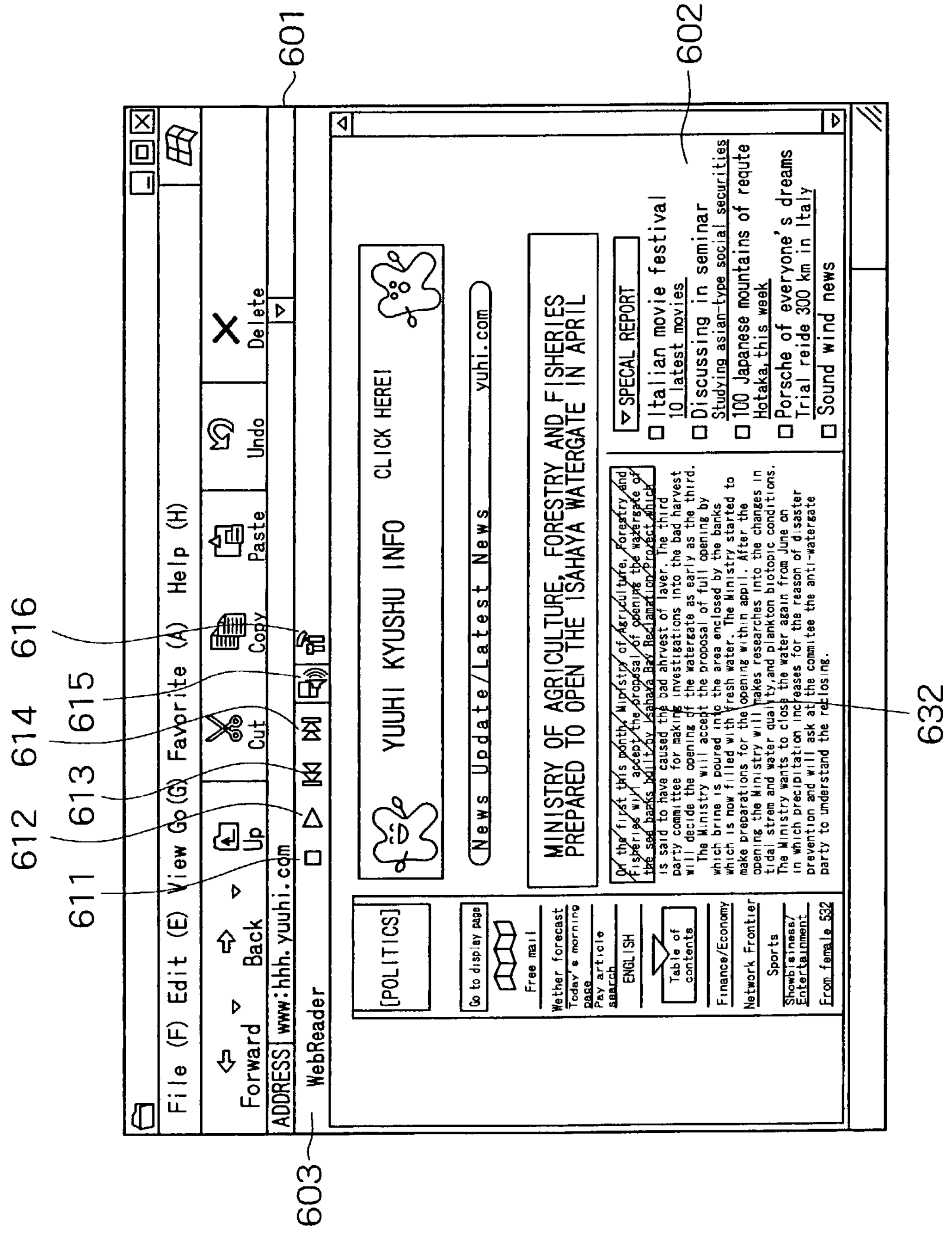
FIG. 56 is a diagram illustrating a Web browser display window during a speech output operation.

FIG. 56 shows an exemplary display screen of the Web browser 592 to be displayed when speech data is being reproduced. Because speech data is being reproduced in FIG. 56, a pause button 631 is arranged in place of the play button 612 which is displayed in the tool bar 603 of the Web browser 592 for other than reproduction described with reference to FIG. 53. The stop button 611 is active and therefore operational, while the "Output to External Device" button 616 is inactive and therefore not operational. The display of the currently pronounced text as with a text 632 is changed to the selected state (in reverse display).

For example, if "For details, refer to http://www.yuhi.com" is written to the currently pronounced text, this URL is replaced with text "Yuhi Shinbun" by the filter processing of step S173 because this URL is registered in the URL table described with reference to FIG. 19A. Therefore, this URL is not pronounced as a meaningless sound of a sequence of alphabets like "eich, tee, tee, pee, colon, slash . . . " but as a sound of a word "Yuhi Shinbun" meaningful to the user.

If the command from the user is found not the reproduction of Web page in voice in step S178, it indicates that the command from the user is for outputting speech data to an external device, so that, in step S181, the Web reader application control section 591 generates a control signal for requesting the pronunciation management module 288 for outputting speech data to an external device and outputs this control signal to the pronunciation management module 288.

In step S182, the external device output processing described with reference to FIG. 43 is executed, upon which the procedure comes to an end.

Thus, as with the case of electronic mail, the above-mentioned processing allows the conversion of the information written to a Web page matching a registered URL or electronic mail address into a predetermined name and the conversion of the resultant text data into speech data, thereby reproducing the speech data or outputting the speech data to the speech storage apparatus 294 such as the Memory Stick 131 for example.

Figure 57:
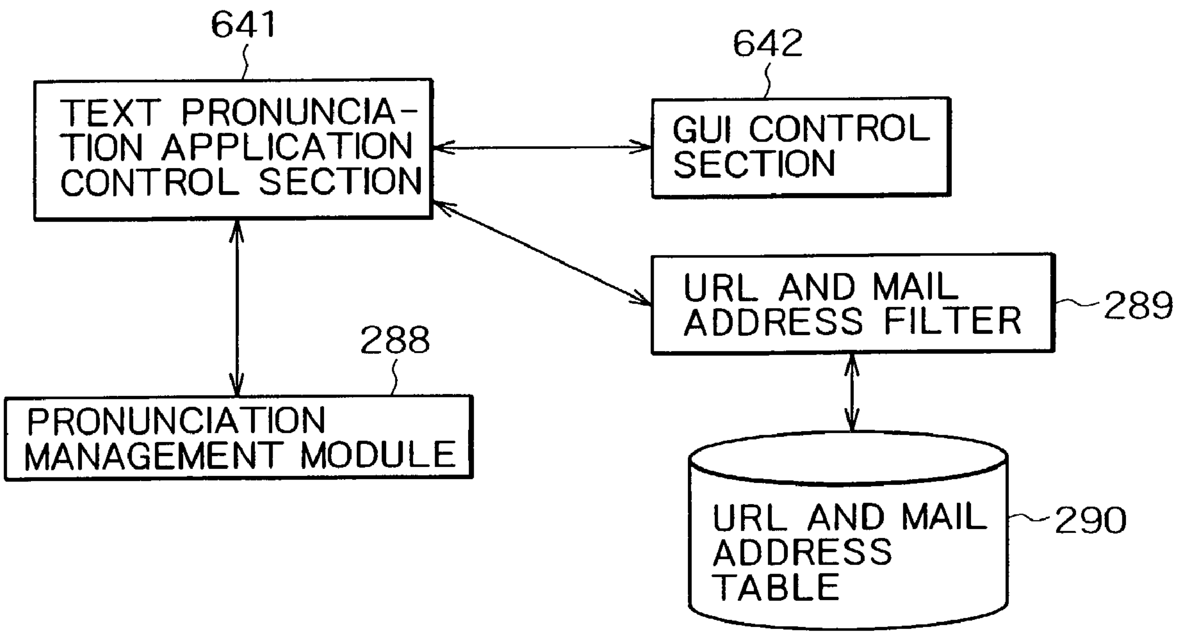
FIG. 57 is a block diagram illustrating functional relationship when a text pronunciation application is operating.

FIG. 57 shows a functional block diagram illustrating the processing to be executed by the CPU 51 when the text pronunciation application of the application program 67 stored in the HDD 67 described with reference to FIG. 6 in the personal computer 2.

Figure 58:
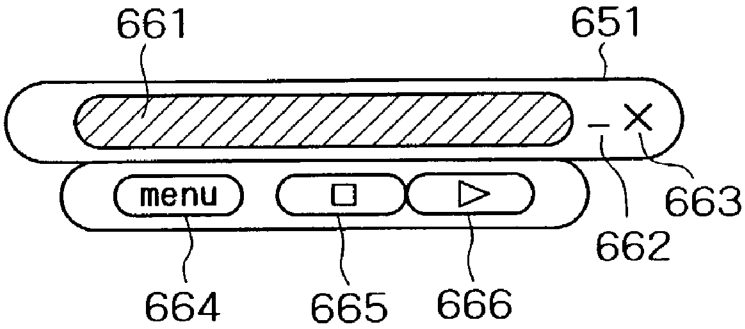
FIG. 58 is a diagram describing an operator panel.

At the same time the text pronunciation application is started, the text pronunciation application control section 641 generates a control signal for displaying an operator panel 651 shown in FIG. 58 and outputs this control signal to the GUI control section 642. On the basis of a signal indicative of user operation supplied from the GUI control section 642, the text pronunciation application control section 641 executes various settings and supplies the entered text data to the pronunciation management module 288, for example.

The URL and mail address filter 289 and the URL and mail address table 290 are the same as those described with reference to FIG. 15, so that their descriptions will be skipped.

FIG. 58 shows an operator panel 651 which is displayed when the text pronunciation application is started.

The operator panel 651 has a text box 661, a minimize button 662, a close button 663, a menu button 664, a stop button 665, and a play button 666.

The text box 661 is used to enter text data which are outputted in voice. In the text box 661, the user can enter text from the keyboard 24 or enter data by cutting and pasting (dragging and dropping) a predetermine file or a selected text by operating the touchpanel 25 or a mouse, not shown.

The GUI control section 642 outputs the text data entered in the text box 661 to the text pronunciation application control section 641.

The minimize button 662 minimizes the display of the operator panel 651 without closing the text pronunciation application and displays the minimized operator panel 651 in the tool bar at the bottom of the screen as an icon for example. The close button 663 ends the text pronunciation application and close the operator panel 651.

Figure 59:
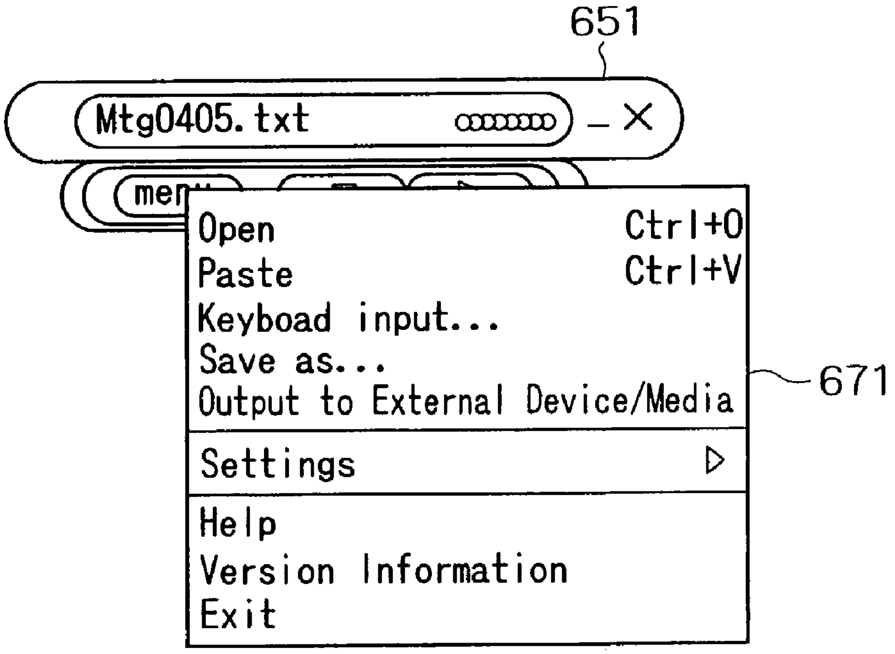
FIG. 59 is a diagram illustrating a menu.

When the menu button 666 is selected, a command box 671 as shown in FIG. 59 is displayed.

By selecting various commands listed in the command box 671, the user can execute various operations. For example, to output speech data corresponding to the text data entered by the user to an external device, the user selects item "Output to external device/media" to output the corresponding speech data to the Memory Stick 131 for example.

If item "Settings" is selected in the command box 671, a dialog box 621 identical to that shown in FIG. 54. In the dialog box 621, a display screen to be displayed when the output to external device/media tag 572 is selected may display the check box 581 as shown in FIG. 49 or may not display it as shown in FIG. 31. For example, if the check box 581 is displayed and selected, the output to external device/media button may be added to the side of the play button 666 shown in FIG. 58 to allow the user to directly issue a command for outputting speech data to an external device.

Figure 60:
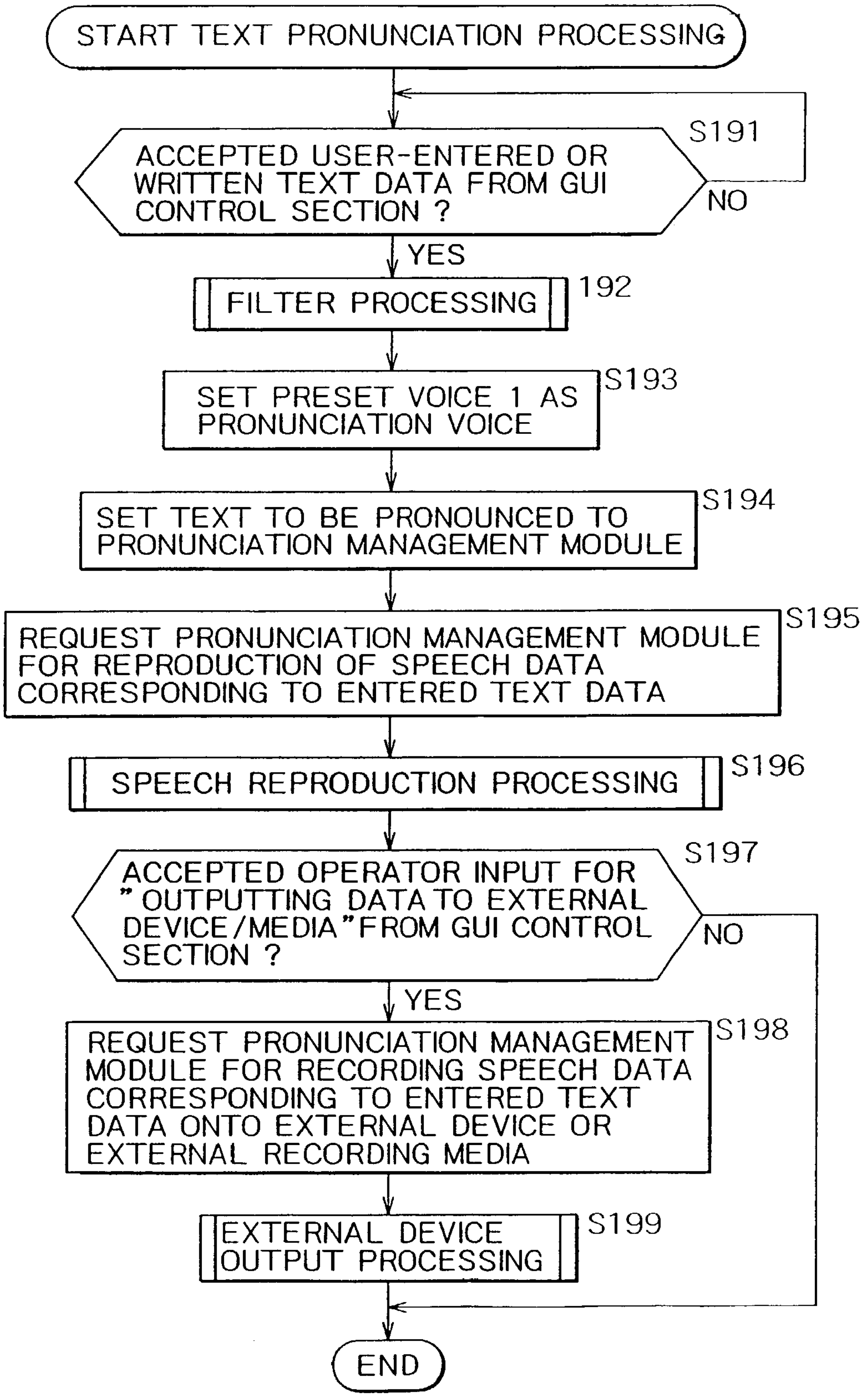
FIG. 60 is a flowchart describing text pronunciation processing.

The following describes the processing to be executed by the CPU 51 when the text pronunciation application is loaded in the RAM 54 with reference to the flowchart shown in FIG. 60.

In step S191, text pronunciation application control section 641 determines whether or not text data have been supplied from the GUI control section 642 by user's entering a text (by drag and drop) into the text box 661 or writing a text by the keyboard into the text box 661. If text data is found not supplied in step S191, the text pronunciation application control section 641 repeats the process of step S191 until text data is supplied.

If text data is found supplied in step S191, then the filter processing described with reference to FIG. 38 is executed in step S192.

In step S193, the text pronunciation application control section 641 sets selected voice 1 as a pronunciation voice.

In step S194, the text pronunciation application control section 641 sets (or outputs) the pronunciation text entered in the text box 661 to the pronunciation management module 288.

In step S195, the text pronunciation application control section 641 generates a control signal for requesting the reproduction of the speech data corresponding to the entered text data and outputs this control data to the pronunciation management module 288.

In step S196, the speech reproduction processing described with reference to FIG. 42 is executed.

In step S197, on the basis of a signal indicative of user operation supplied from the GUI control section 642, the text pronunciation application control section 641 determines whether or not the user has performed an operation for outputting speech data to external device/media.

If the user operation for outputting the speech data to external device/media is found performed in step S197, then the text pronunciation application control section 641 generate a control signal for requesting the pronunciation management module 288 for recording the speech data corresponding to the entered text data to an external device or an external recording medium and outputs this control signal to the pronunciation management module 288 in step S198.

In step S199, the output to external device processing described with reference to FIG. 43 is executed, upon which the procedure comes to an end.

If the user operation for outputting the speech data to external device/media is found not performed in step S197, the procedure comes to an end.

Thus, the above-mentioned processing allows the user to convert the desired text data of which URL or electronic mail address match registered one into a predetermined name and then convert these text data into speech data, thereby reproducing these speech data in voice or outputting these speech data to the external speech storage apparatus 294.

As described and according to the invention, of the text data in a plurality of application programs, the text data of which URL or electronic mail address match registered one are converted into a predetermined name and then these text data is speech-synthesized by use of the same mechanism (in the present invention, the functionality of the pronunciation management module 288), thereby pronouncing the resultant text data or outputting them to an external device.

Consequently, the novel configuration allows the conversion of data which are meaningless as speech data into data which are meaningful as speech data by pronouncing the data on a word basis rather than on a single character basis. In addition, the novel configuration allows the automatic registration of URLs and electronic mail addresses from a bookmark and an address book or the manual resignation by the user by entering necessary data.

In the present invention, the four application programs are used for example. It will be apparent that the present invention is applicable to all application programs that handle text data.

The above-mentioned novel configuration also significantly enhance not only the convenience as application programs but also their entertainment because of the provision of easy-to-understand GUIs for facilitating setting operations by the user.

It should be noted that the present invention can be realized by not only the personal computer 2 but also the PDA 4 or camera-mounted digital mobile phone 5. In this case, the CPU 171 of the PDA 4 or the main control section 251 of the camera-mounted digital mobile phone 5 executes the same processing as the processing described above (executed by the mail watcher application, the Web reader application, the mail reader application, and text pronunciation application).

Further, the present invention is applicable to any such devices that can send/receive electronic mail, browse Web pages, or at least process text data and output speech data as desktop personal computers, PHS (Personal Handyphone System) terminals, digital mobile phones having no imaging functionality, and car navigation systems for example.

The above-mentioned sequence of processes may be executed by hardware as well as by software. To execute the above-mentioned processing by software, the programs constituting the software are installed from recording media into a computer assembled in a dedicated hardware device or a general-purpose personal computer which can execute various capabilities by installing various programs.

The recording media are constituted by package media such as the magnetic disc 121 or 191 (including a flexible disc), the optical disc 122 or 192 (including CD-ROM (Compact Disc-Read Only Memory) and a DVD (Digital Versatile Disc)), and the magneto-optical disc 123 or 193 (including MD (Mini Disc) (trademark), and the semiconductor memory 124 or 194 (including Memory Stick) which are distributed to users to provide programs independently of computers as shown in FIG. 6 or FIG. 10.

It should be noted that the steps for describing programs to be recorded in recording media include not only the processing operations which are executed in a time series manner in the order described, but also the processing operations which are executed in parallel to each other or discretely from each other.

It should also be noted that term system as used herein denotes an entire apparatus constituted by two or more components.

According to the information processing apparatus and method and a program, text data is entered, at least one piece of first information and second information corresponding to each piece of the first information are recorded, text matching the recorded first information are detected from the entered text data, the recorded first information and second information are referenced to replace the detected first information with the second information, and text-to-speech synthesis is executed by use of the text data with the first information replaced with the second information to generate speech data corresponding to the text data. Consequently, the speech data of which meaning is easy to understand for the user who listens to the speech corresponding to the speech data which are obtained by performing voice conversion after replacing the URL or electronic mail address contained in the text data with registered, predetermined words easily understandable to the user.

While the preferred embodiments of the present invention have been described using specific terms, such description is for illustrative purposes only, and it is to be understood that changes and variations may be made without departing from the spirit or scope of the appended claims.

What is claimed is:

1. An information processing apparatus comprising:

text input means for entering text data;

recording means for recording at least one piece of first information and second information corresponding to each piece of said first information;

first detecting means for detecting a text matching said first information recorded in said recording means from said text data entered through said text input means;

replacing means for replacing said first information detected by said first detecting means with said corresponding second information by referring to said first information and said second information recorded by said recording means; and speech data generating means for generating speech data corresponding to said text data by performing text-to-speech synthesis on said text data with said first information replaced with said second information by said replacing means, said speech generating means generating speech in a first voice for text data with a first attribute and generating speech in a second voice for text data with a second attribute, wherein the text data is an electronic mail message, the first attribute and the second attribute are determined based on the symbols and number of symbols added to each line of the electronic mail message, and a portion of the electronic mail message is classified as having the first attribute if written by a recipient of the electronic mail message and a portion of the electronic mail message is classified as having the second attribute if written by others, and said first voice speaks at a faster rate than the second voice.

2. The information processing apparatus according to claim 1, further comprising:

second detecting means for detecting predetermined third information from said text data entered through said text data input means;

wherein, on the basis of text data before and after said third information detected by said second detecting means, said first detecting means detects from said text data said first information recorded to said recording means.

3. The information processing apparatus according to claim 2, wherein said third information is an "at" sign and said first information is an electronic mail address.

4. The information processing apparatus according to claim 2, wherein said third information is a colon sign and said first information is a URL (Uniform Resource Locator) of a Web site.

5. The information processing apparatus according to claim 1,. wherein said first information is a URL of a Web site, said recording means records said first information for each protocol in a distinguishable manner, and, if a text matching said protocol is detected from said text data, said first detecting means refers to said first information having said corresponding protocol to execute detection processing.

6. The information processing apparatus according to claim 1, further comprising:

registration means for registering said first information and second information corresponding to said first information into said recording means.

7. The information processing apparatus according to claim 6, further comprising:

a display control means for controlling a display window for a user to enter said first information and said second information corresponding to said first information;

wherein said registration means registers said first information and said second information entered by said user by referring to said display window to said recording means.

8. The information processing apparatus according to claim 6, further comprising:

transferring means for sending and receiving electronic mail;

wherein said transferring means records at least one electronic mail address and a registered name corresponding thereto and said registration means registers into said recording means said electronic mail address recorded in said transferring means as said first information and said registered name as said second information.

9. The information processing apparatus according to claim 6, further comprising:

Web page browsing means for browsing a Web page; wherein said Web page browsing means records at least one URL and a registered name corresponding thereto and said registration means registers into said recording means said URL recorded in said transferring means as said first information and said registered name corresponding thereto as said second information.

10. An information processing method comprising: entering text data;

controlling the recording of at least one piece of first information and second information corresponding to each piece of said first information;

detecting a text matching said first information of which recording is controlled by said recording control step from said text data entered through said text input step;

replacing said first information detected by said first detecting step with said corresponding second information by referring to said first information and said second information of which recording is controlled by said recording control step; and generating speech data corresponding to said text data by performing text-to-speech synthesis on said text data with said first information replaced with said second information by said replacing step, said speech generating including generating speech in a first voice for text data with a first attribute and generating speech in a second voice for text data with a second attribute, wherein the text data is an electronic mail message, the first attribute and the second attribute are determined based on the symbols and number of symbols added to each line of the electronic mail message, and a portion of the electronic mail message is classified as having the first attribute if written by a recipient of the electronic mail message and a portion of the electronic mail message is classified as having the second attribute if written by others, and said first voice speaks at a faster rate than the second voice.

11. A recording medium recording a computer-readable program, wherein the program, when executed by a processor, cause the processor to perform a method comprising:

entering text data;

controlling the recording of at least one piece of first information and second information corresponding to each piece of said first information;

detecting a text matching said first information of which recording is controlled by said recording control step from said text data entered through said text input step;

replacing said first information detected by said first detecting step with said corresponding second information by referring to said first information and said second information of which recording is controlled by said recording control step; and generating speech data corresponding to said text data by performing text-to-speech synthesis on said text data with said first information replaced with said second information by said replacing step, said speech generating including generating speech in a first voice for text data with a first attribute and generating speech in a second voice for text data with a second attribute, wherein the text data is an electronic mail message, the first attribute and the second attribute are determined based on the symbols and number of symbols added to each line of the electronic mail message, and a portion of the electronic mail message is classified as having the first attribute if written by a recipient of the electronic mail message and a portion of the electronic mail message is classified as having the second attribute if written by others, and said first voice speaks at a faster rate than the second voice.

12. An information processing apparatus comprising:

a text input device configured to enter text data;

a memory configured to save at least one piece of first information and second information corresponding to each piece of said first information;

a first detector configured to detect a text matching said first information recorded in said memory from said text data entered through said text input device;

a replacing device configured to replace said first information detected by said first detector with said corresponding second information by referring to said first information and said second information recorded by said memory; and a speech data generator configured to generate speech data corresponding to said text data by performing text-to-speech synthesis on said text data with said first information replaced with said second information by said replacing device, said speech generator generating speech in a first voice for text data with a first attribute and generating speech in a second voice for text data with a second attribute, wherein the text data is an electronic mail message, the first attribute and the second attribute are determined based on the symbols and number of symbols added to each line of the electronic mail message, a portion of the electronic mail message is classified as having the first attribute if written by a recipient of the electronic mail message and a portion of the electronic mail message is classified as having the second attribute if written by others, and said first voice speaks at a faster rate than the second voice.

13. The information processing apparatus according to claim 12, further comprising:

a second detector configured to detect predetermined third information from said text data entered through said text input device, wherein on the basis of text data before and after said third information detected by said second detector, said first detector detects from said text data said first information recorded to said memory.

14. The information processing apparatus according to claim 13, wherein said third information is an "at" sign and said first information is an electronic mail address.

15. The information processing apparatus according to claim 13, wherein said third information is a colon sign and said first information is a URL (Uniform Resource Locator) of a Web site.

16. The information processing apparatus according to claim 12, wherein said first information is a URL of a Web site, said memory saves said first information for each protocol in a distinguishable manner, and, if a text matching said protocol is detected from said text data, said first detector refers to said first information having said corresponding protocol to execute detection processing.

17. The information processing apparatus according to claim 12, further comprising:

a registration device configured to register said first information and second information corresponding to said first information into said memory.

18. The information processing apparatus according to claim 17, further comprising:

a display controller configured to control a display window for a user to enter said first information and said second information corresponding to said first information; wherein said registration device registers said first information and said second information entered by said user by referring to said display window to said memory.

19. The information processing apparatus according to claim 17, further comprising:

a transferring device configured to send and receive electronic mail; wherein said transferring device records at least one electronic mail address and a registered name corresponding thereto and said registration device stores into said memory said electronic mail address recorded in said transferring device as said first information and said registered name as said second information.

20. The information processing apparatus according to claim 17, further comprising:

a Web page browser configured to browse a Web page;

wherein said Web page browser records at least one URL and a registered name corresponding thereto and said registration device stores into said memory said URL recorded in said transferring device as said first information and said registered name corresponding thereto as said second information.

21. An information processing apparatus comprising:

a text input device configured to enter text data;

a memory configured to save at least one piece of first information and second information corresponding to each piece of said first information;

a first detector configured to detect a text matching said first information recorded in said memory from said text data entered through said text input device;

a replacing device configured to replace said first information detected by said first detector with said corresponding second information by referring to said first information and said second information recorded by said memory;

a classifier configured to classify a portion of the electronic mail message as having the first attribute if written by a recipient of the electronic mail message and a portion of the electronic mail message is classified as having the second attribute if written by others; and a speech data generator configured to generate speech data corresponding to said text data by performing text-to-speech synthesis on said text data with said first information replaced with said second information by said replacing device, said speech generator generating speech in a first voice for text data with the first attribute and generating speech in a second voice for text data with the second attribute, wherein the text data is an electronic mail message, and the first attribute and the second attribute are determined based on the symbols and number of symbols added to each line of the electronic mail message.

* * * * *